United States Patent [19]
Feeney et al.

[11] Patent Number: 6,072,781
[45] Date of Patent: Jun. 6, 2000

[54] MULTI-TASKING ADAPTER FOR PARALLEL NETWORK APPLICATIONS

[75] Inventors: James William Feeney, Endicott; Howard Thomas Olnowich; George William Wilhelm, Jr., both of Endwell, all of N.Y.

[73] Assignee: International Business Machines Corporation, Armonk, N.Y.

[21] Appl. No.: 08/734,946

[22] Filed: Oct. 22, 1996

[51] Int. Cl.[7] .................................................. G06F 9/00
[52] U.S. Cl. ......................... 370/282; 370/229; 709/215
[58] Field of Search .................................. 370/282, 276, 370/229, 417, 400; 710/22, 28; 709/215, 212, 234

[56] References Cited

U.S. PATENT DOCUMENTS

| | | | |
|---|---|---|---|
| 4,200,930 | 4/1980 | Rawlings et al. | 709/212 |
| 4,787,027 | 11/1988 | Prugh et al. | 710/65 |
| 4,933,846 | 6/1990 | Humphrey et al. | 710/107 |
| 4,949,333 | 8/1990 | Gulick et al. | 370/282 |
| 4,965,721 | 10/1990 | Holtey et al. | 709/212 |
| 5,065,343 | 11/1991 | Inoue | 345/512 |
| 5,155,810 | 10/1992 | McNamara | 710/52 |
| 5,218,680 | 6/1993 | Farrell et al. | 709/215 |
| 5,276,681 | 1/1994 | Tobagi et al. | 370/229 |
| 5,285,528 | 2/1994 | Hart et al. | 710/200 |
| 5,412,782 | 5/1995 | Hausman et al. | 709/250 |
| 5,434,976 | 7/1995 | Tan et al. | 709/234 |
| 5,655,151 | 8/1997 | Bowes et al. | 710/22 |

OTHER PUBLICATIONS

IBM TDB (Aug. 1989) p. 247–249 RS Svec, Synchronous Buffered Maintenance Adapter.
IBM TDB (Jan. 1995) p. 325–328 GT Davis, Multi–Channel Basic I/O Interface for ISDN.
IBM TDB (Oct. 1989) p. 155–157 MG Polan, High Speed X.21 Circuit Switched Call Establishment.
IBM TDB (Jul. 1993) p 225–226 OG Koufopavlou, Normalized Multiprotocol Packet Processor.
Dr. Dobb's Journal, vol. 15 No. 10, p. 28, 30, 32, 34, 36, 38, (Oct. 1990) A. Schulman, Opening OS/2's Backdoor (In Spec abstract).

*Primary Examiner*—Zarni Maung
*Assistant Examiner*—Khanh Quang Dinh
*Attorney, Agent, or Firm*—Shelley M Beckstrand

[57] ABSTRACT

A communications apparatus is provided comprising a plurality of FIFO buffers, each with independent control and priority logic under software control for supporting different types of message traffic, both send and receive, such as comprise a multimedia server system. Processor software directs messages to specific, optimized FIFO buffers. Further, a system is provided including a plurality of nodes wherein a sending node specifies the communications path through the system, selecting specific FIFO buffers in each node for buffering its messages.

43 Claims, 35 Drawing Sheets

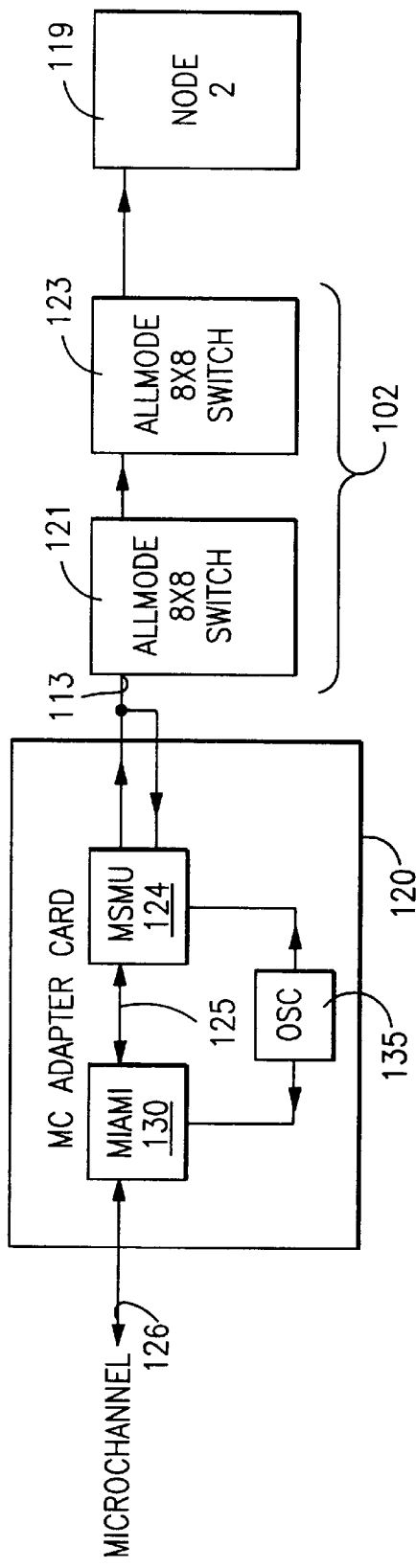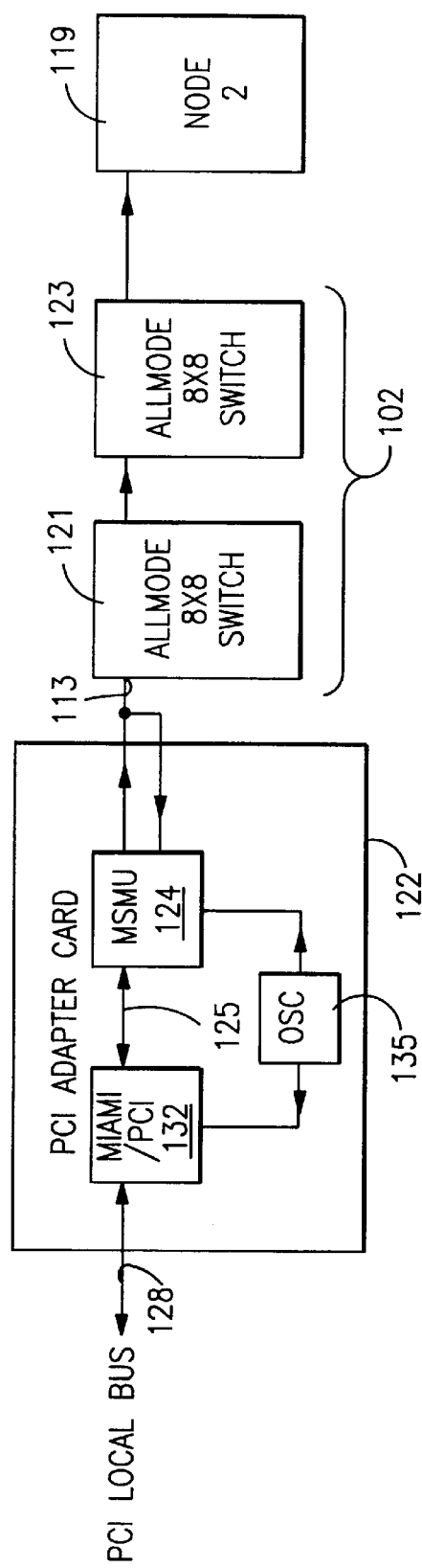

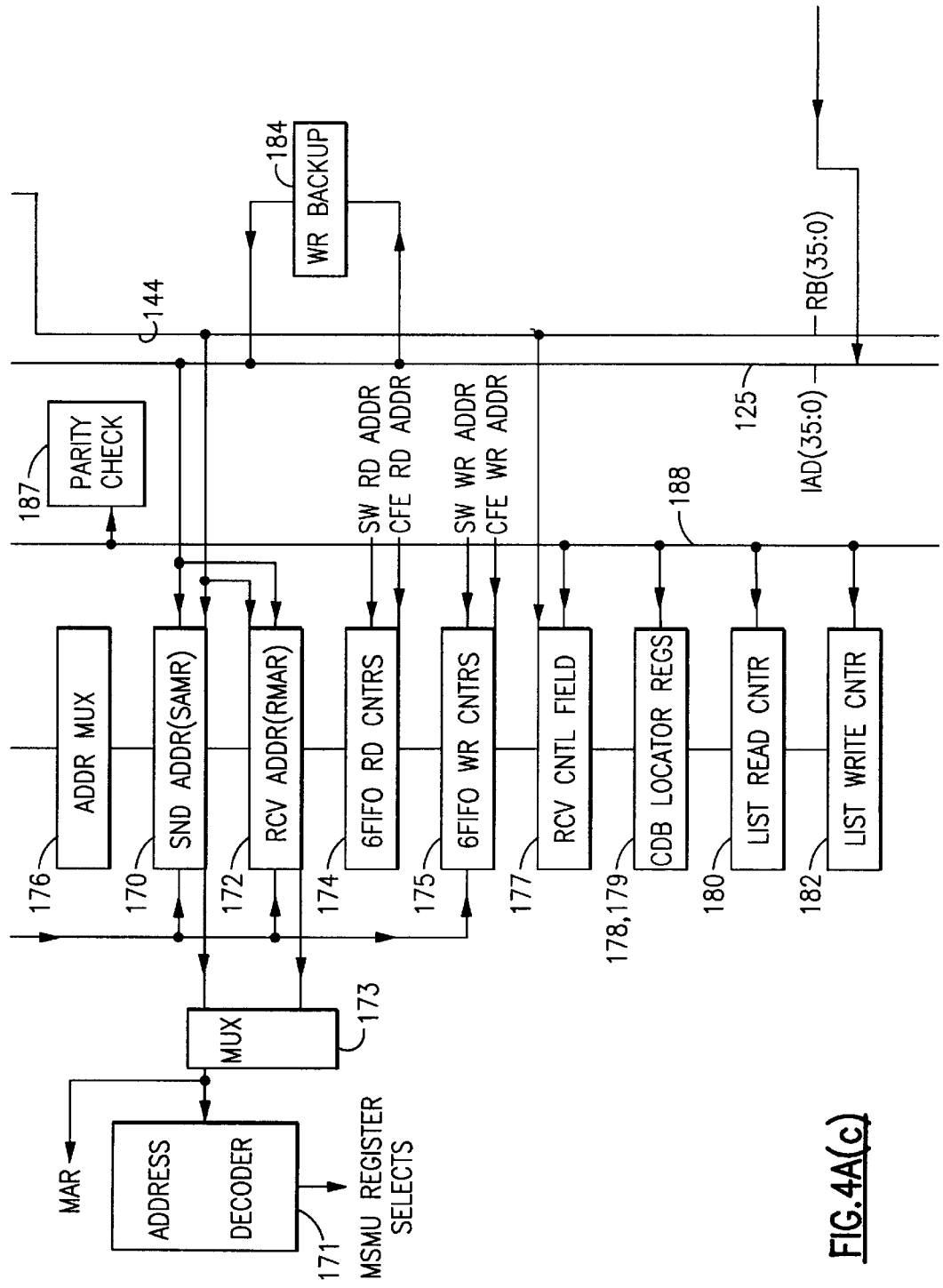

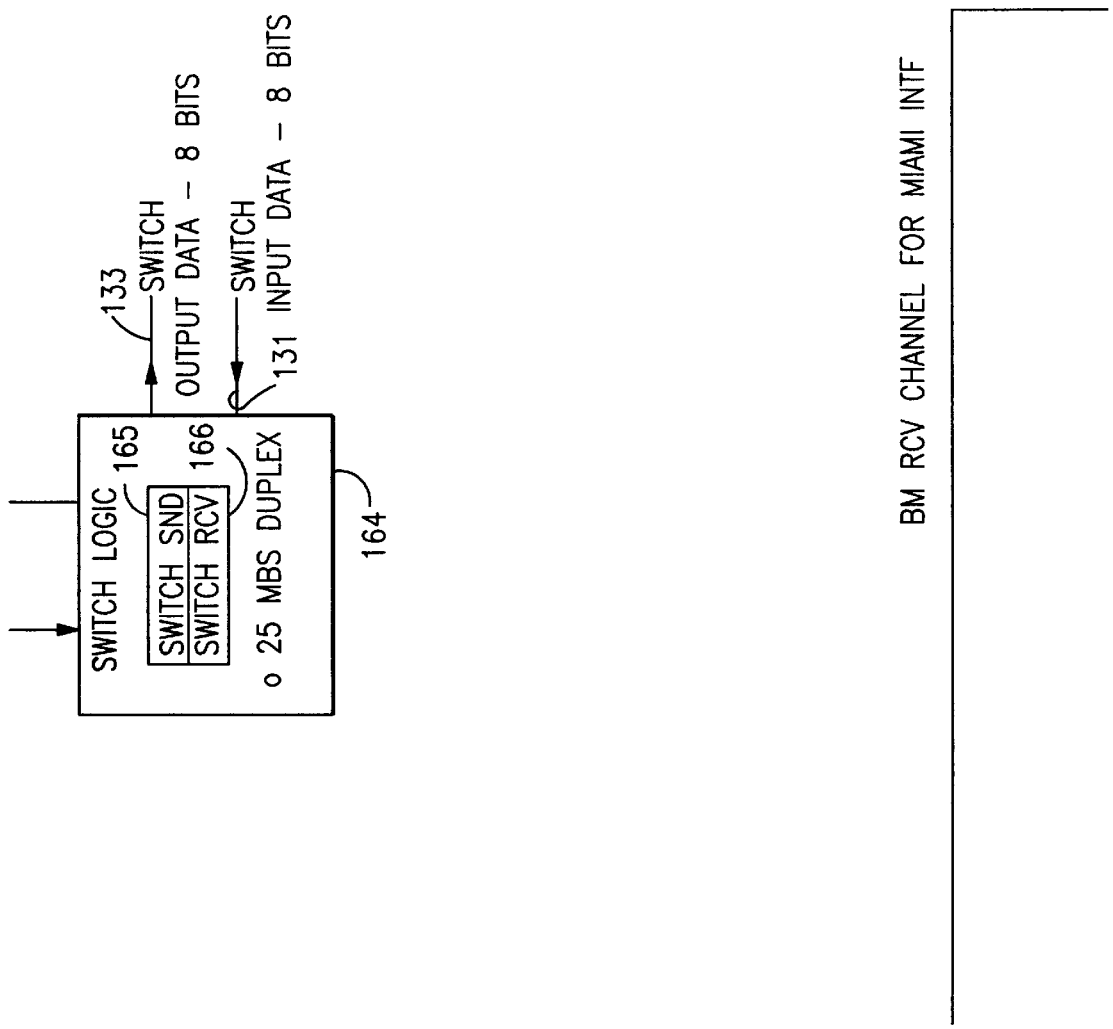

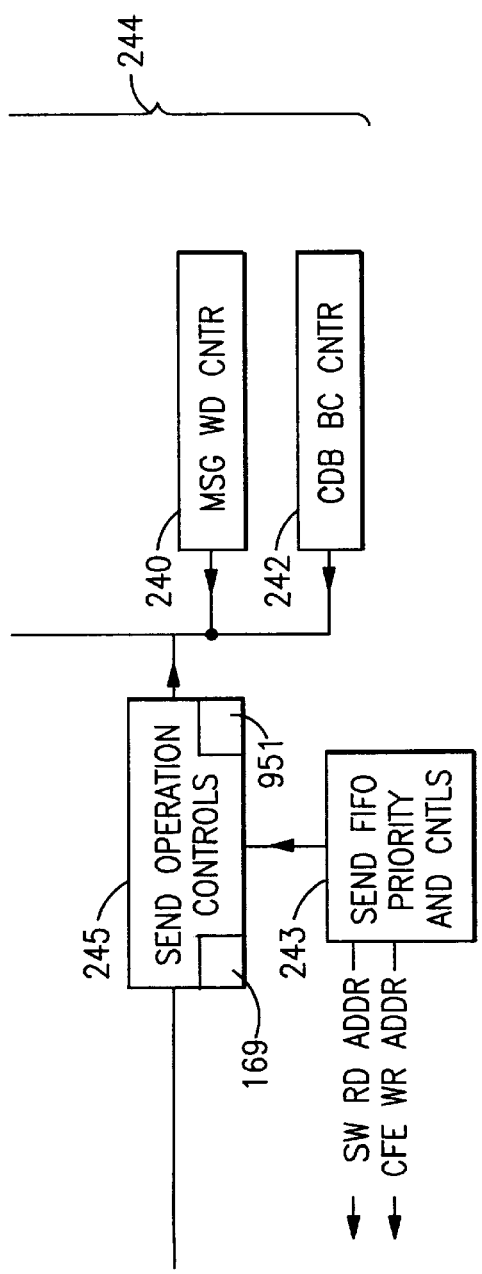

UNIQUE ADDRESS OF FIFO REGISTERS

| SND FIFO 201 | SND FIFO 202 | SND FIFO 203 | REC FIFO 211 | REC FIFO 212 | REC FIFO 213 | |
|---|---|---|---|---|---|---|
| 040 | 000 | 0C0 | 140 | 180 | 1C0 | FIFO LOCK REGISTER — 250 |
| 044 | 084 | 0C4 | 144 | 184 | 1C4 | FIFO STATUS REGISTER — 251 |
| 048 | 088 | 0C8 | 148 | 188 | 1C8 | READ POINTER AND ERROR STATUS REGISTER — 252 |
| 04C | 08C | 0CC | 14C | 18C | 1CC | WRITE POINTER REGISTER — 253 |
| 050 | 090 | 0D0 | 150 | 190 | 1D0 | BUCKET INTERRUPT STATUS A REGISTER — 254 |
| 054 | 094 | 0D4 | 154 | 194 | 1D4 | BUCKET INTERRUPT STATUS B REGISTER — 255 |
| 058 | 098 | 0D8 | 158 | 198 | 1D8 | FIFO OPTIONS REGISTER — 256 |
| 05C | 09C | 0DC | 15C | 19C | 1DC | READ COUNTER REGISTER — 257 |
| 060 | 0A0 | 0E0 | 160 | 1A0 | 1E0 | WRITE COUNTER REGISTER — 258 |
| 064 | 0A4 | 0E4 | 164 | 1A4 | 1E4 | CDB POINTER R/W COUNTER REG (SEND ONLY) — 259 |

FIG.5C

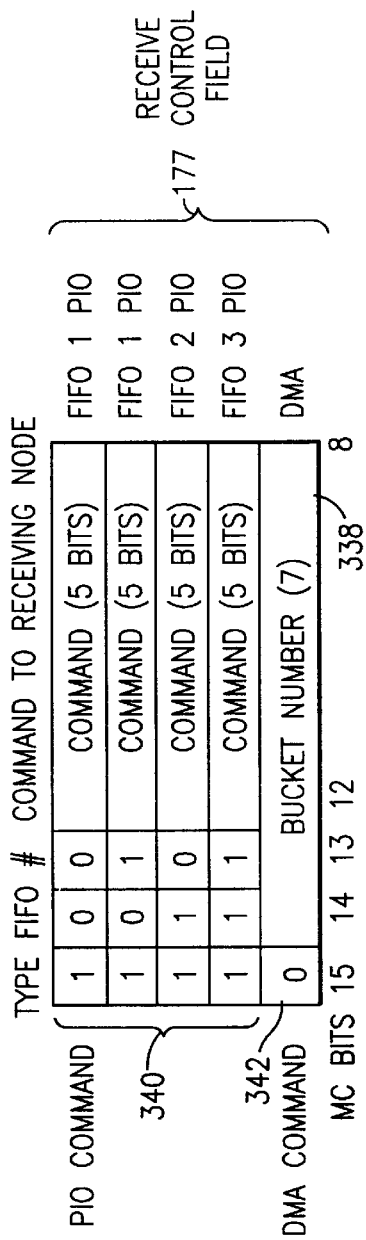
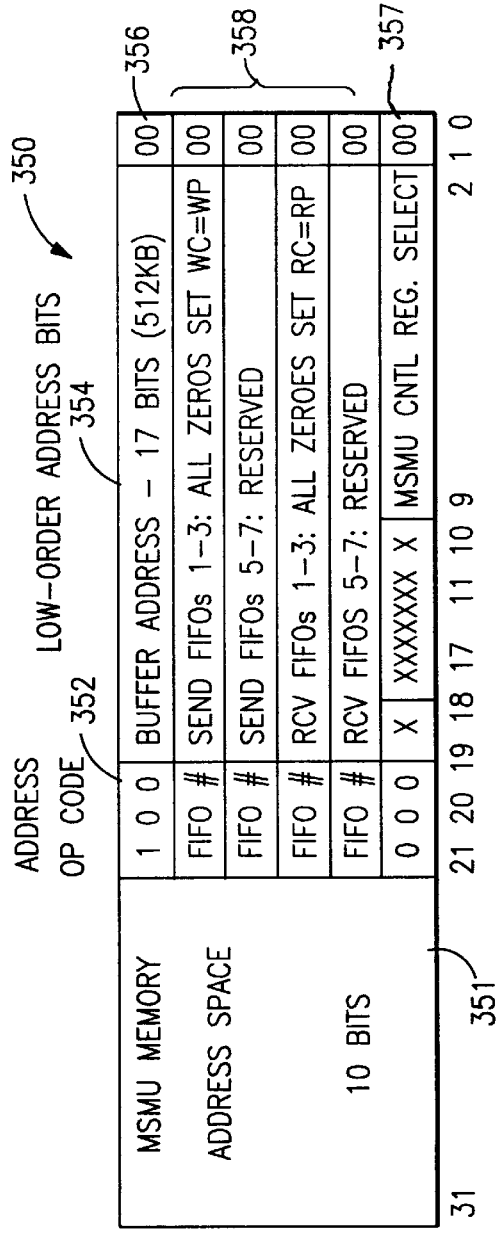
FIG.10
FIG.11

FIG.12

| SOFT WARE RSET | HARD WARE LOCK | XXXXXXXXXXXXXXXXXXXXXXXXXXXXXX |
|---|---|---|
| 502 | 504 | |
| BITS 31 | 30 | 29 0 |

| SOFT LOCK RSET | FIFO INT STATUS | ERR STAT | END STAT | X | INT STATUS | FIFO STATUS | SWITCH ERRORS | FIFO STOP-PED | FIFO RSET | X | FIFO OUTPUT ENABLED | FIFO INPUT ENABLED |
|---|---|---|---|---|---|---|---|---|---|---|---|---|
| 506 | 508–514 | 516 | 518 | | 522–534 | 536–544 | 546–556 | 558 | 560 | | 564 | 566 |
| BITS 31 | 30–26 | 25 | 24 | 23 | 22–16 | 15–11 | 10–5 | 4 | 3 | 2 | 1 | 0 |

| SOFT LOCK RSET | PNTR WRITE DISABL | FIFO ERRORS | X | OVER FLOW | FIFO READ POINTER (15 BITS) | CFE BUS ERRORS |
|---|---|---|---|---|---|---|
| 568 | 570 | 572–590 | 594 | | 596 | 598–600 |
| BITS 31 | 30 | 29–20 | 19 | 18 | 17 2 | 1 0 |

| SOFT LOCK RSET | XXXXXXXXXXX | OVER FLOW | FIFO WRITE POINTER (15 BITS) | X | X |
|---|---|---|---|---|---|

BITS 31 | 30 ... 19 18 | 17 ... 2 | 1 0

602 — SOFT LOCK RSET
604 — OVER FLOW
606 — FIFO WRITE POINTER (15 BITS)

| BUCK 31 STAT | BUCK 30 STAT | BUCKET STATUS BITS (29 TO 2) | BUCK 1 STAT | BUCK 0 STAT |
|---|---|---|---|---|

BITS 31 | 30 | 29 ... 2 | 1 | 0

608 — BUCK 31 STAT
610 — BUCK 30 STAT
612 — BUCK 1 STAT
614 — BUCK 0 STAT

| BUCK 64 STAT | BUCK 63 STAT | BUCKET STATUS BITS (29 TO 2) | BUCK 33 STAT | BUCK 32 STAT |
|---|---|---|---|---|

BITS 31 | 30 | 29 ... 2 | 1 | 0

616 — BUCKET STATUS BITS (29 TO 2)

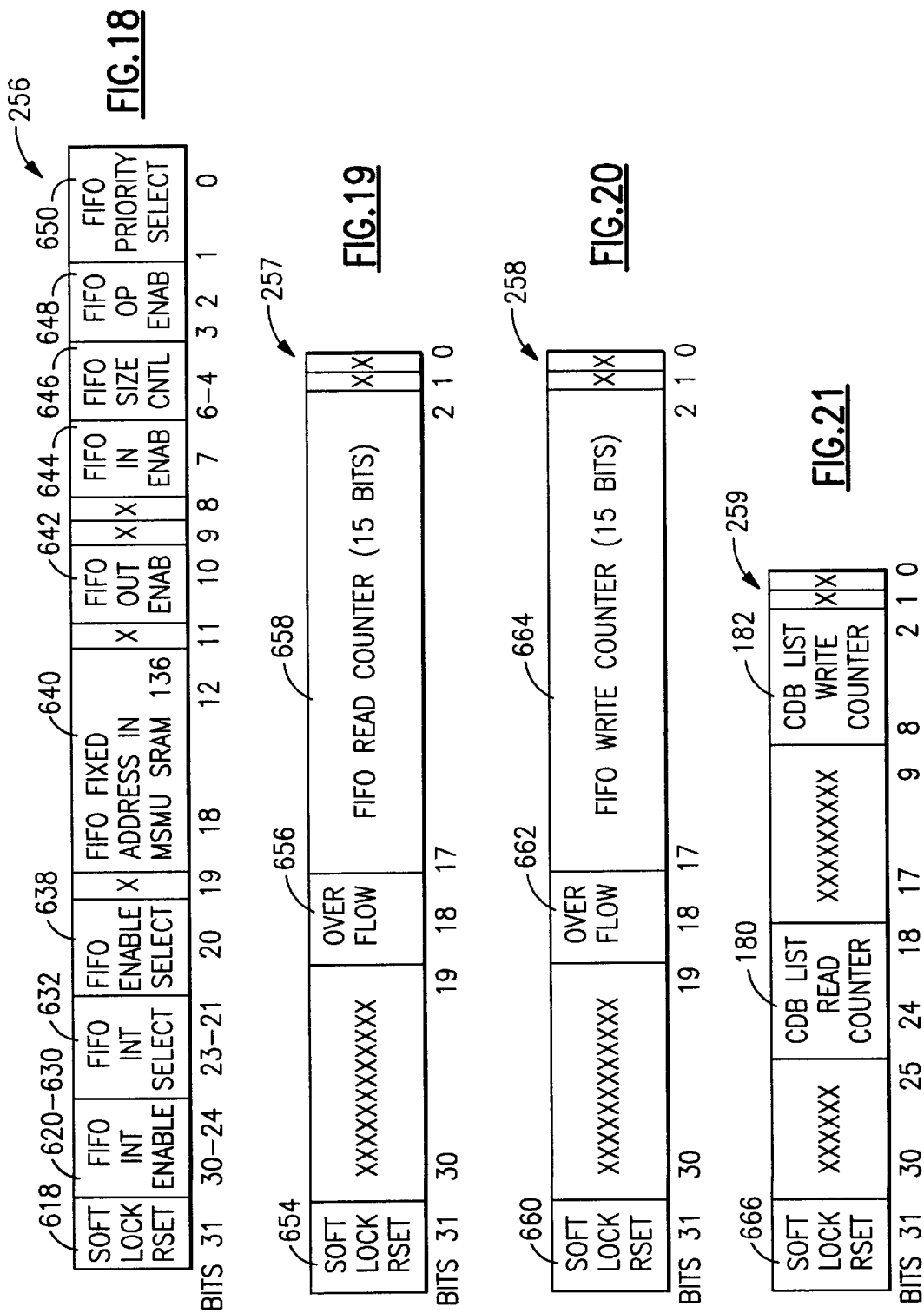

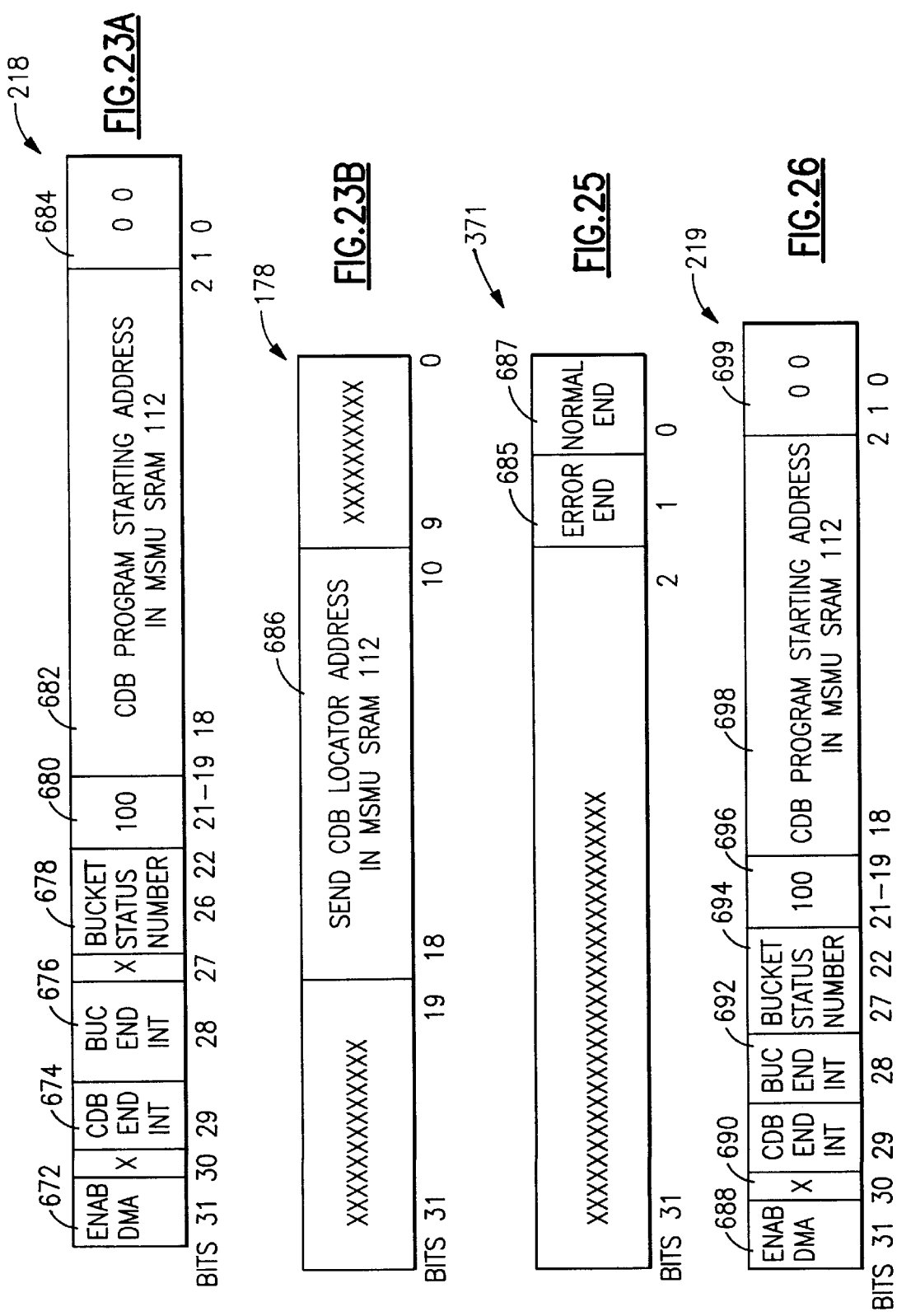

SEND FIFO 3 CDB POINTERS
IN
CIRCULAR BUFFER OF UP TO
64 PENDING POINTERS

64 WORDS IN MSMU SRAM 112

| FIG. 24A | FIG. 24B |
|---|---|
| FIG. 24C | FIG. 24D |

FIG.27

```
       179
        ↙
BITS 31        19 18                              9 8            0
┌──────────┬────────────────────────────────┬──────────────┐
│xxxxxxxxxx│ RECEIVE CDB LOCATOR ADDRESS    │ xxxxxxxx     │
│          │      IN MSMU SRAM 112          │              │
└──────────┴────────────────────────────────┴──────────────┘
```

FIG.29

```
       724
        ↙
BITS 31        19 18                              9 8         2 1 0
┌──────────┬────────────────────────────────┬──────────┬────┐
│ NOT USED │ RECEIVE CDB LOCATOR ADDRESS    │ BUC NO.  │ 00 │
│          │      FROM REGISTER 160         │          │    │
└──────────┴────────────────────────────────┴──────────┴────┘
                         179                    177
```

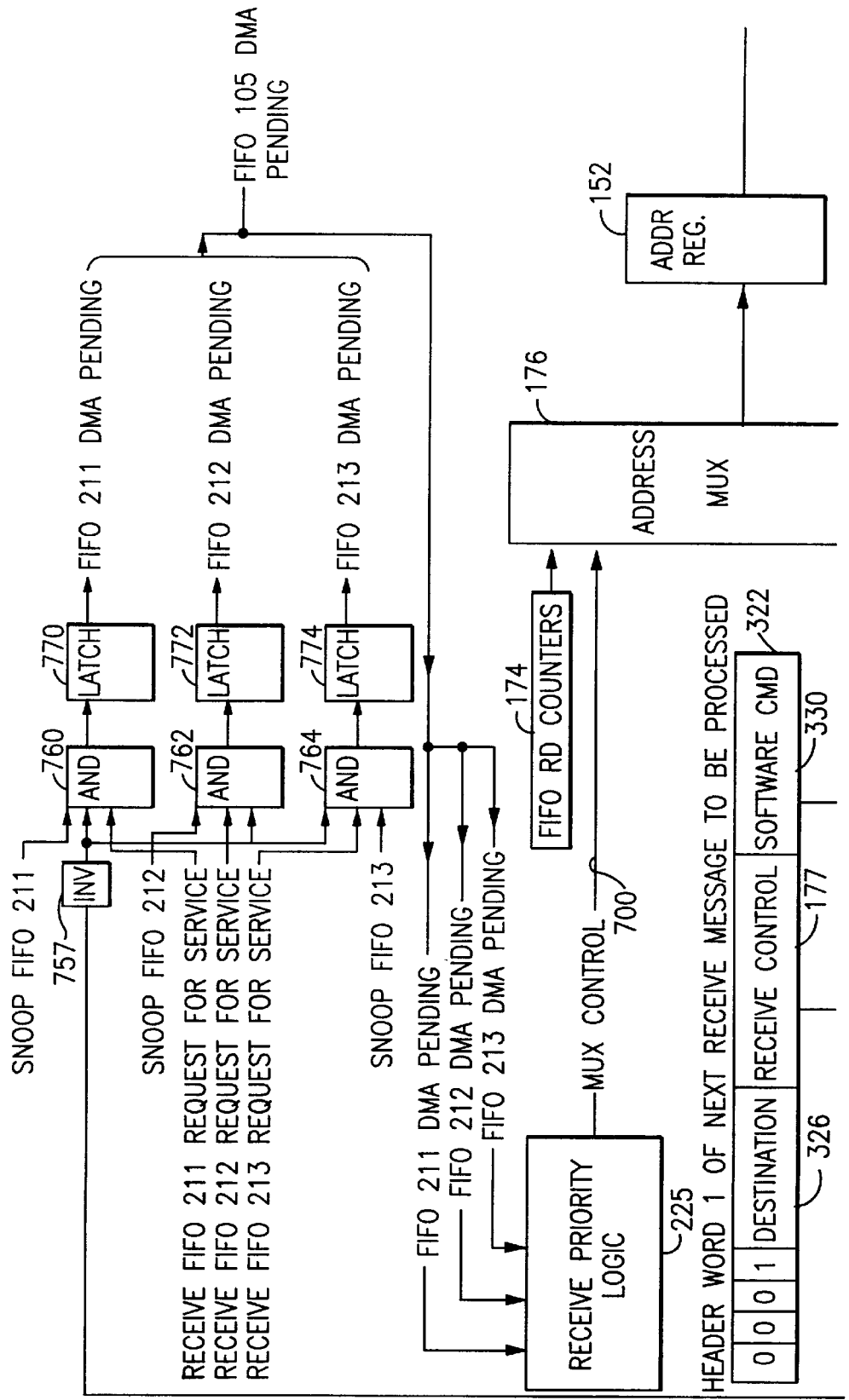

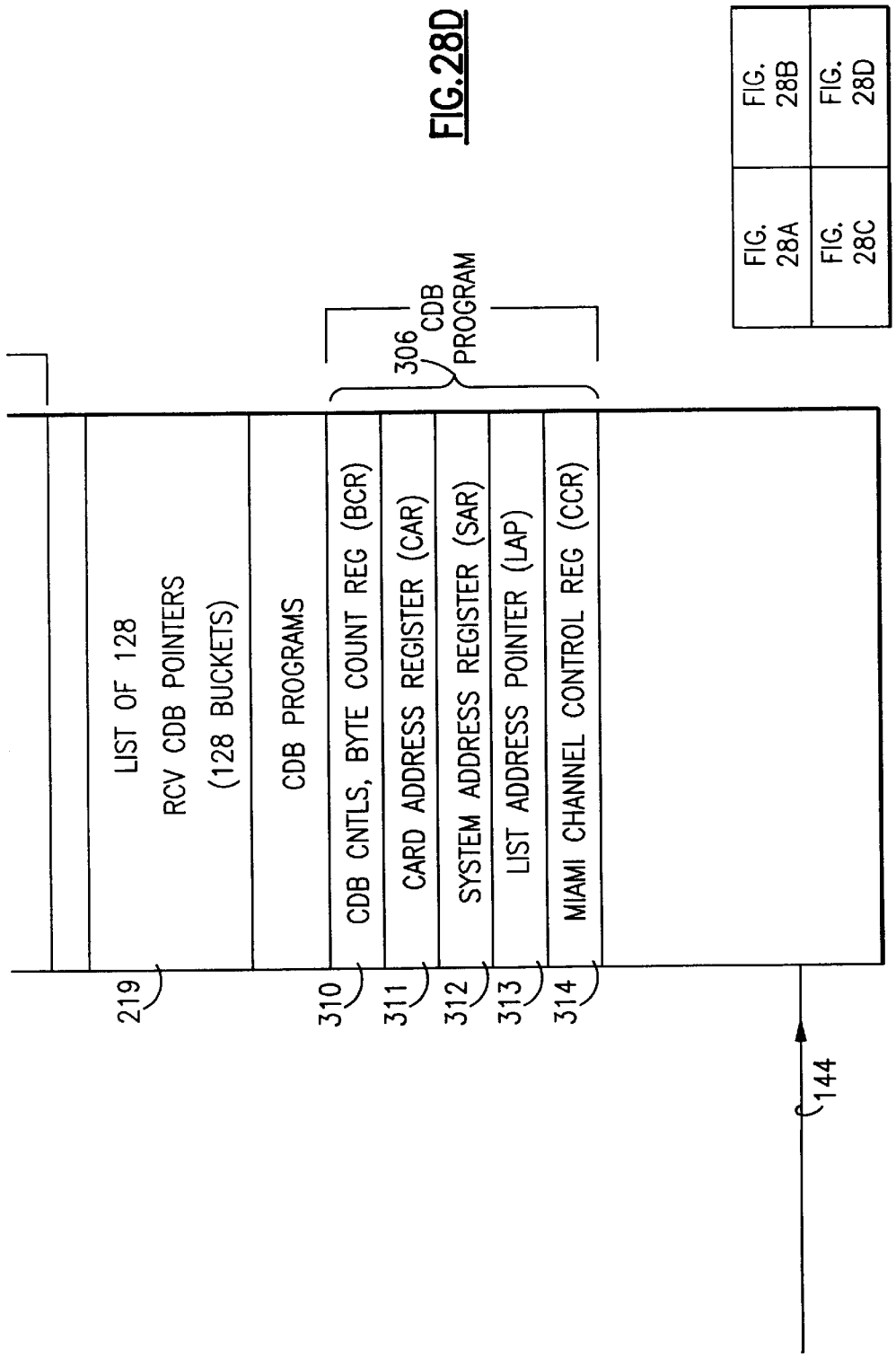

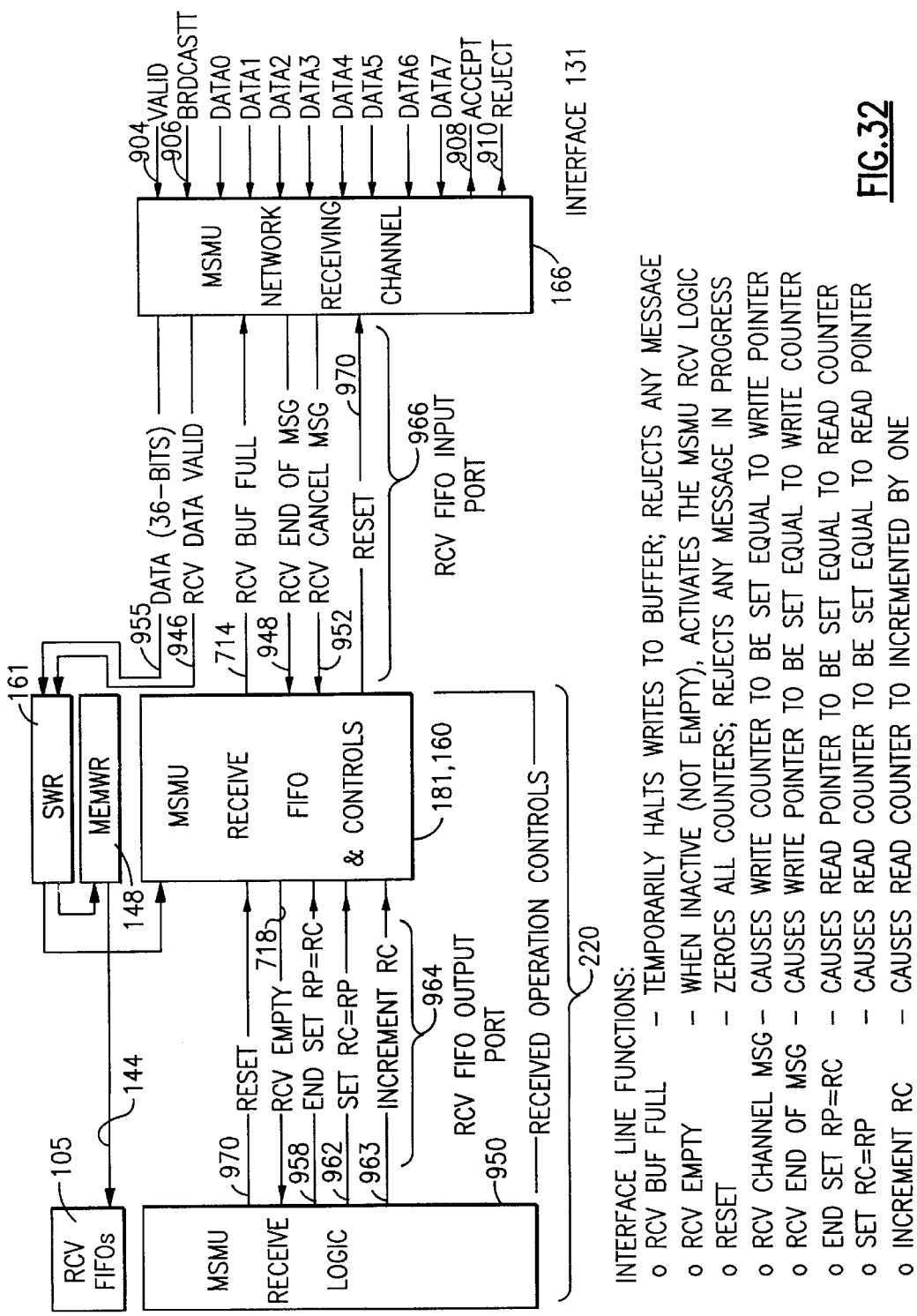

MULTI-TASKING ADAPTER FOR PARALLEL NETWORK APPLICATIONS

BACKGROUND OF THE INVENTION

1. Technical Field of the Invention

This invention relates to a data communication system and pertains, more particularly, to a network adapter that provides separate FIFO buffers optimized for separate multimedia tasks.

2. Background Art

In multiple protocol applications, and especially in the demanding area of multimedia serving applications, there can exist many different types of traffic, including, for example, large, lower priority multimedia data messages; small, high priority multimedia control messages; medium sized, high priority messages associated with high-level protocols such as TCP/IP; and small, high priority messages that the device drivers on the various nodes within the system use for coordination of activities.

In a distributed multimedia server design, the dominant message flow usually includes small control messages from a data consumer to a data provider which, in turn, responds with a large video (or audio data block back to the data consumer. Even at 25 megabytes per second a large piece of video data (64 KB or more) will take nearly 3 milliseconds to transmit. Therefore, there is a need in the art for a communications adapter which, under heavy server load conditions, with possible contention (blocking) in the switch fabric as well, prevents large message blocks from impeding the small, higher priority control messages that should be sent and received expeditiously.

In accordance with one system, data is transferred between a telephone system and a computer. A single send, or transmit, FIFO buffer and a single receive FIFO buffer are used to adapt the speed of the telephone lines to the computer transfer rate. This system requires two microprocessors with memory and code, one to control the send buffer and one to control the receive buffer. This system can connect to multiple telephone lines using multiple adapters, a unique adapter for each telephone line, with each adapter consisting of a pair of FIFO buffers, a pair of microprocessors, and code.

In another system, data transfer is provided between remote peripherals and a computer. Each line adapter to each peripheral is unique, and is specially designed to operate to suit the characteristics of a particular type of remote terminal or station.

In several other systems, an adapter is provided between a computer and a communications network, such as a local area network (LAN), that works at a high data rate, by providing a single adapter to the network comprising a pair of FIFO buffers, one each for send and receive. In one such system, two microprocessors with memory and control code are provided, one for handling buffer management and the other for handling medium access control. In another, time-slotted transmissions are provided for handling digital voice and data telephone applications.

None of these systems provide a communications adapter which provides multiple send and receive FIFO buffers in a single adapter for handling multiple, high speed, logical connections through a single adapter to a single network. There is, therefore, a need to provide a single adapter which interconnects multiple processors through a network, which uses direct memory access (DMA), and avoids the use of slower multiplexing, or time-slotting, of data and control.

It is, therefore, an object of the invention to provide a communications adapter for multiple protocol applications which, inter alia, efficiently handles communications within a multimedia serving application.

It is a further object of the invention to provide a communications adapter which, under heavy server load conditions, with possible contention (blocking) in the switch fabric as well, prevents large message blocks from impeding the small, higher priority control messages that should be sent and received expeditiously.

SUMMARY OF THE INVENTION

The multiple FIFO method and priority control logic of the present invention supports the different types of message traffic, both send and receive, that comprise a multimedia server system.

In accordance with this invention, a communications apparatus is provided comprising a plurality of FIFO buffers, each with independent control and priority logic under software control. The software directs messages to specific, optimized FIFO buffers. In accordance with a further aspect of this invention, the apparatus of the invention is implemented in a system including a plurality of nodes, wherein a sending node specifies the communications path through the system by selecting specific FIFO buffers in each node for buffering its messages.

In accordance with a further aspect of this invention, a method is provided for operating an adapter interconnecting a nodal processor to a network, the adapter including a plurality of addressable FIFO buffers for storing and forwarding messages. The method includes the steps of (1) assigning a priority level to each said FIFO buffer; and (2) responsive to the priority level, determining which sending FIFO buffer is to forward a first next message to the network, and determining which receive FIFO buffer is to store a second next message received from the network.

Other features and advantages of this invention will become apparent from the following detailed description of the presently preferred embodiment of the invention, taken in conjunction with the accompanying drawings.

BRIEF DESCRIPTION OF THE DRAWINGS

FIG. 2A is a high level block diagram of a typical microchannel adapter card, and FIG. 2B is a block diagram of a typical peripheral component interconnect (PCI) network adapter card.

FIG. 5C shows the unique addressing for differentiating FIFO control registers amongst various FIFO buffers.

FIG. 10 is a format diagram of the receive control field of the message header of FIG. 9.

FIG. 11 is a format diagram illustrating processor addressing of the network adapter.

FIG. 12 is a table of bit definitions for the FIFO lock register.

FIG. 13 is a table of bit definitions for the send FIFO status register.

FIG. 14 is a table of bit definitions for the send FIFO read pointer and error status register.

FIG. 15 is a table of bit definitions for the send FIFO write pointer register.

FIG. 16 is a table of bit definitions for the send FIFO bucket A status register.

FIG. 17 is a table of bit definitions for the send FIFO bucket B status register.

FIG. 18 is a table of bit definitions for the send FIFO options register.

FIG. 19 is a table of bit definitions for the send FIFO read counter register.

FIG. 20 is a table of bit definitions for the send FIFO write counter register.

FIG. 21 is a table of bit definitions for the send FIFO channel descriptor block (CDB) pointer list read/write counters register.

FIG. 23A is a format diagram of the send channel descriptor block (CDB) pointer.

FIG. 23B is a table of bit definitions for the send channel descriptor block (CDB) locator address control register.

FIG. 25 is a format diagram for the bus master status word.

FIG. 26 is a format diagram of the receive channel descriptor block (CDB) pointer.

FIG. 27 is a table of bit definitions for the receive channel descriptor block locator address control register.

FIG. 29 is a format diagram for the concatenated address for locating the receive channel descriptor block (CDB) pointer.

FIG. 32 is a block diagram of a typical receive FIFO interface.

BEST MODE FOR CARRYING OUT THE INVENTION

Figure 1:
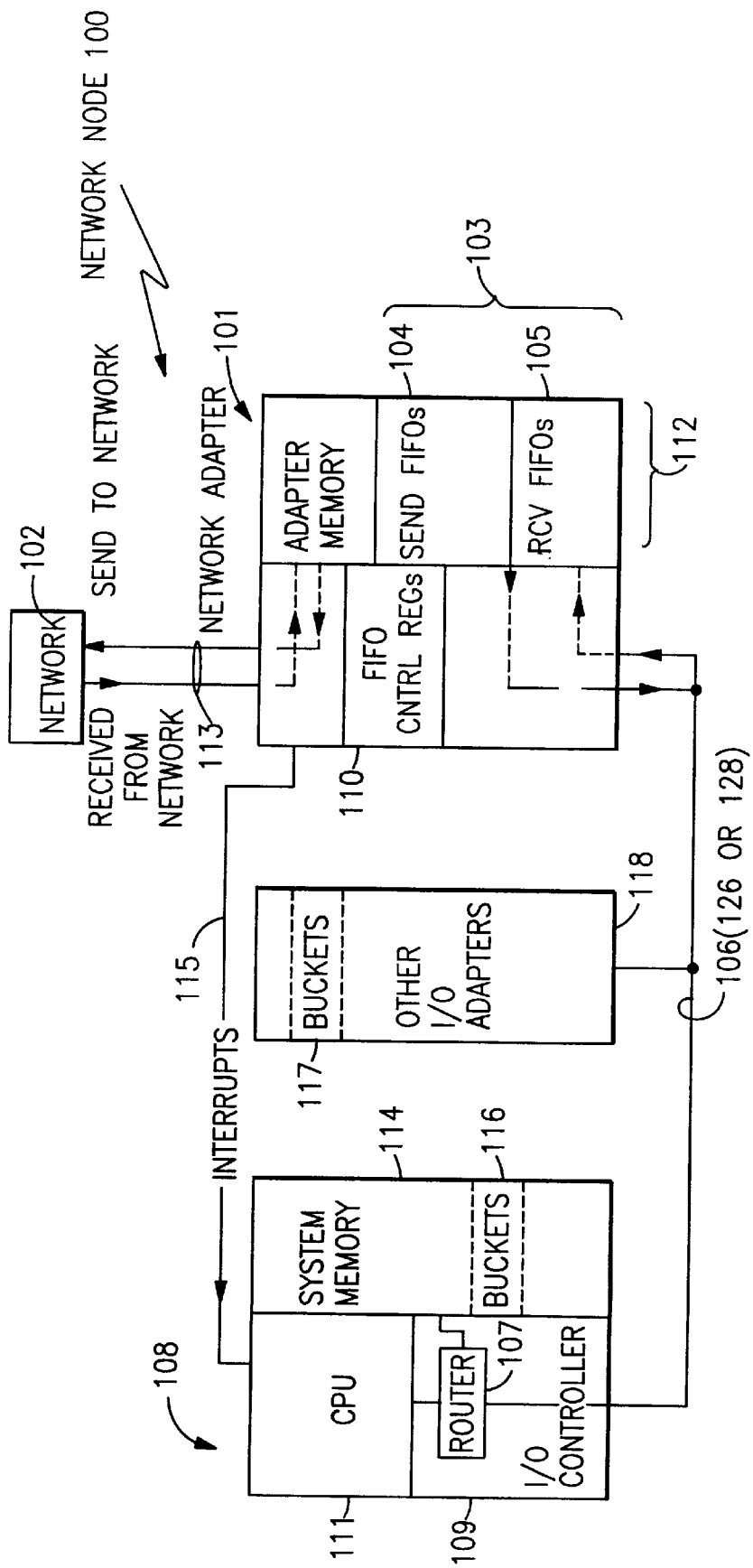
FIG. 1 is a block diagram of a network node in accordance with this invention.

The method and apparatus of this invention provide a flexible FIFO scheme that is suited to multimedia functions. The scheme provides multiple FIFO buffers in each direction within a single network adapter. A different FIFO is used for each multimedia task, and each FIFO is individualized to the size and priority required for the specific task. Messages that are associated with a particular media that are real time, high speed, or high priority are assigned to one of the FIFO buffers and by-pass other, slower messages. This provides a much better alternative than the state-of-the-art single FIFO solutions where these messages are put into a single shared FIFO and become bogged down by traffic to other media. As part of this invention, the control software partitions the local memory provided by the network adapter into multiple FIFO areas, and defines the size and priority of each FIFO individually. In addition, the software controls assignment of each individual message to specific send and receive (RCV) FIFO buffers. The send FIFO selection is made by either the I/O bus addresses used by the software to send data to the network adapter, or by the DMA control programs used by the network adapter to fetch data to be sent to the network. The receive FIFO is selected on an individual message basis by the command field in the message header.

| LIST OF ABBREVIATIONS | |
|---|---|
| ACK | Acknowledge |
| ADDR | Address |
| ALLNODE | Asynchronous Low Latency inter-Node Switch - an IBM Trademark |
| ARB | Arbitration |
| ATM | Asynchronous Transfer Mode (a telephone transmission standard) |
| ATTN | Attention Port Register |
| BCR | Byte Count Register |
| BM | Bus Master |
| BMAR | Bus Master Address Register |
| BMCDB | Bus Master Channel Descriptor Block |
| BMCMD | Bus Master Command Register |
| BMSTAT | Bus Master Status Register (Channel 1 or 2) |
| BUC | Bucket |
| BUCK | Bucket |
| CAR | Card Address Register |
| CCR | Bus Master Channel Control Register |
| CDB | Channel Descriptor Block for control of DMA |
| CFE | Common Front End - an IBM on-card Bus |
| CH | Channel, BM Channel 1 or 2 (Ch1 or Ch2) |
| CNTL | Control |
| CNTR | Counter |
| CPU | Computer Processing Unit |
| CRC | Cyclic Redundancy Coding |
| CRDID | Card Identification Register |
| DMA | Direct Memory Access |
| EN | Enable |
| ENAB | Enable |
| ERR | Error |
| FIFO | First-In, First-Out Buffer |
| HDR | Message Header, HDR1 = Header 1, HDR2 = Header 2 |
| HSBR | Host-Slave Base Address Register for PIO transfers |
| ID | Identification |
| INT | Interrupt |
| INTF | Interface |
| IPL | Initial Program Load |
| KB | Kilo Bytes |
| LBBAR | Local Bus Base Address Register |
| LBPE | Local Bus Parity/Exception Register |
| LAD | Address/Data Bus |
| LAP | List Address Pointer |
| LSB | Least Significant Bit |
| LSSD | Level Sensitive Scan Design |
| MB | Mega Bytes |
| MC | MicroChannel - IBM Trademark |
| MCA | MicroChannel Architecture |
| MCI | MicroChannel Interface |
| MDATA | Memory Data Register for PIO Transfers |
| MSB | Most Significant Bit |
| MSMU | Multi-purpose Switch Management Unit |

-continued

LIST OF ABBREVIATIONS

| | |
|---|---|
| NADS | Negative Address Strobe |
| NMI | Non-Maskable Interrupt |
| NREADY | Not Ready |
| OSC | Oscillator |
| PCI | PCI Local Bus - 32 bit version |
| PIO | Programmed Input/Output via processor instructions |
| PNTR | Pointer |
| POS | Programmable Option Select feature of the MC |
| PQFP | Plastic Quad Flat Pack |
| PROC CFG | Processor Configuration Register |
| PROM | Programmable Read Only Memory |
| RAM | Random Access Memory |
| RC | Read Counter |
| RCV | Receive |
| RD | Read |
| ROM | Read Only Memory |
| RP | Read Pointer |
| RSET | Reset |
| RSR | Reset Status Register |
| RST | Reset |
| SAR | System Address Register |
| SCB | Storage Control Block (MC message passing architecture) |
| SMU | Allnode Switch Management Unit |
| SND | Abbreviation for Send |
| SRAM | Static RAM |
| STAT | Status |
| VPD | Vital Product Data (part of MCA) |
| WC | Write Counter |
| WP | Write Pointer |
| WR | Write |
| XPOS | Extended POS registers in the MSMU |

A PREFERRED EMBODIMENT

Referring to FIG. 1, a typical network node implements a preferred embodiment of the invention. Node 100 attaches to network 102 in full duplex by way of network adapter 101, including FIFO buffers 103, for adapting processor I/O bus 106 for communication with network 102. Processor 108, which includes CPU 111, I/O controller 109 and system memory 114, sends commands from CPU 111 through router 107 in I/O controller 109 over I/O Bus 106 to control the network adapter 101 by loading the FIFO control registers 110. As will be more fully described hereafter, processor 108 also writes messages to send FIFO buffers 104 and reads messages from receive FIFO buffers 105 in adapter memory 112 (also referred to as MSMU SRAM 112.) In addition, if network adapter 101 is a bus master, it operates to read or write messages from/to system memory 114 using DMA operations which use a direct path over processor I/O bus 106 (which may be, for example, a MicroChannel bus 126, or a PCI local bus 128) through router 107 and I/O controller 109 to system memory 114, bypassing CPU 111. These DMA messages also go into the send FIFO buffers 104 or can be read from the receive FIFO buffers 105 in adapter memory 112. System memory 114 optionally includes buckets 116. Other I/O adapters 118 may include a peer-to-peer bus master and buckets 117. Interrupts from adapter 101 to processor 108 appear on line 115, and lines 113 represent the port connection to network 102.

Referring to FIGS. 2A and 2B in connection with FIG. 1, network adapters 120 and 122, respectively, include multi-purpose switch management unit (MSMU) 124 for controlling multiple FIFO buffers 103 for sending and receiving messages with respect to network interface 113 to network 102. MSMU 124, which may be implemented in a single chip, controls external adapter memory 112, also referred to hereafter as MSMU static RAM (SRAM) 112. MSMU 124 includes the capability to transfer direct memory access (DMA) messages over the processor input/output (I/O) bus 106, typically a MicroChannel bus 126 or peripheral component interconnect (PCI) local bus 128. An off-the-shelf chip is used to interface MSMU 124 to processor bus 106, 126 or 128. In a preferred embodiment of the invention, as will be described hereafter in connection with FIG. 30, bus master 130, 132 interfaces to the MicroChannel (MC) bus 126 or PCI bus 128, respectively. (In the figures it is referred to as a Miami 130 or Miami/PCI 132 bus master chip.) Thus, two different adapter cards 120, 122 can be built from MSMU chip 124, for MicroChannel 120 and PCI Bus 122. Clocked by oscillator 135, the bus master 130, 132 family supports DMA transfer rates up to 80 MBS over the Micro-Channel bus 126. The bus master chips 130 and 132 are bus master chips on buses 126 and 128, respectively, and each provide two DMA channels for communicating between bus 126 or 128 and bus 125 for data transfer to or from MSMU 124.

In this preferred embodiment, network port 113 interfaces to a multi-stage network 102 comprising multiple 8×8 Allnode switches, like 121 and 123, as are further described in U.S. Pat. No. 5,404,461. Switches 121 and 123 interconnect first node 100 to a plurality of other nodes, one of which is represented by second node 119. Consequently, network adapter 101 may be referred to hereafter as Allnode adapter 101.

Figure 3:
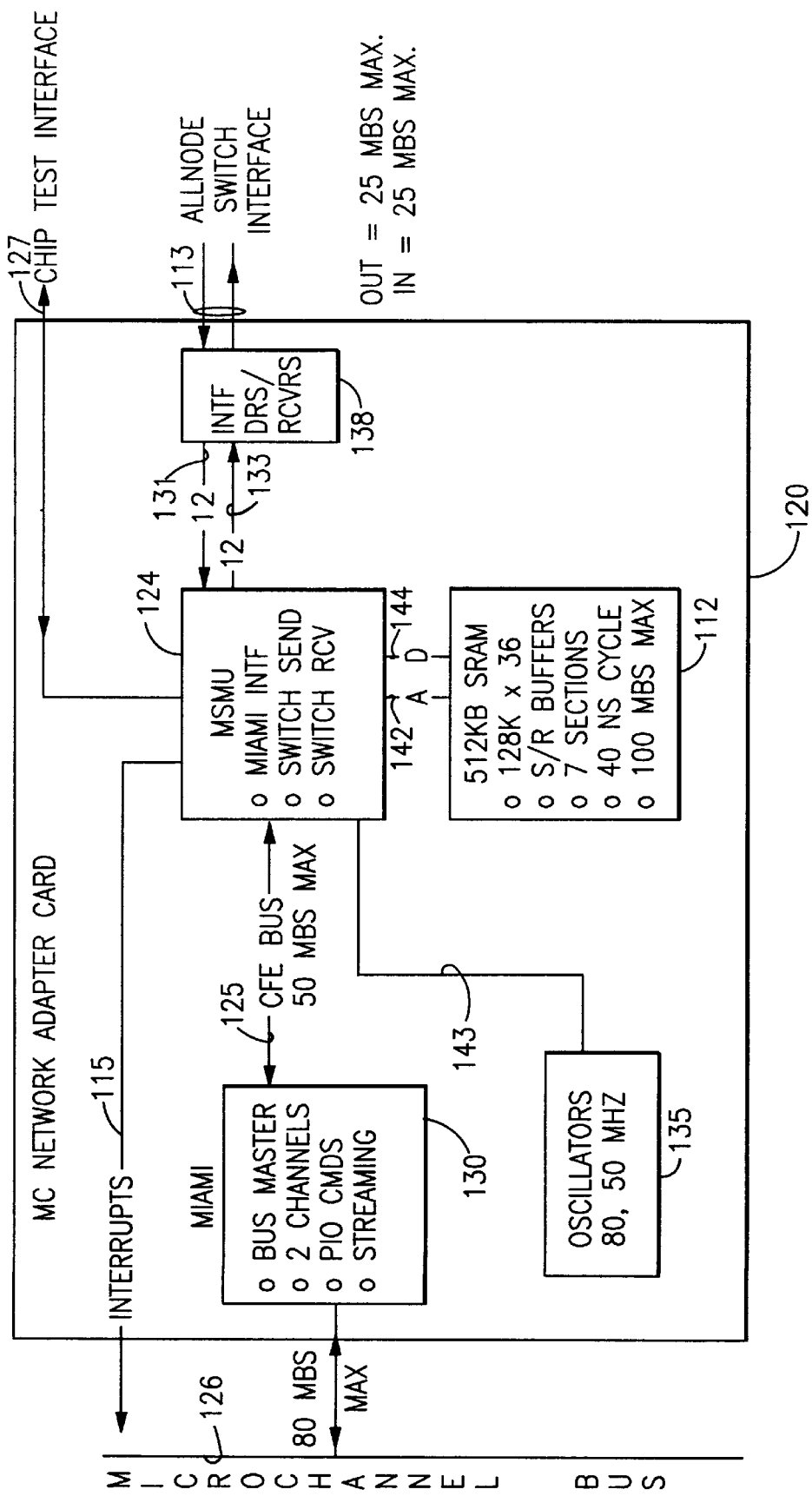
FIG. 3 is a more detailed block diagram of a typical microchannel network adapter card.

Referring to FIG. 3, a more detailed functional layout of preferred network adapter 120 for interfacing between MicroChannel bus 126 and interface port 113 to network 102, is shown. (Interface card 122 for PCI bus 128 is similar, but uses bus master/PCI chip 132.) Bus master 130 and bus master/PCI 132 chips perform bus master and DMA functions.

Bus master 130 interfaces to MSMU 124 via 32-bit common front-end (CFE) bus 125. MSMU 124 receives and drives CFE Bus 125, and connects to port 113 through interface drivers and receivers 138. Thus, MSMU 124 converts CFE bus 125 into a network interface 113 that is compatible with Allnode switch 121, 123. All transfers from CFE bus 125 to network port 113, or vice versa, pass through MSMU local SRAM memory 112, which is used as a store-and-forward buffer for all data transfers. The only exception is when CFE bus 125 is reading/writing MSMU control registers 160 (FIG. 5), which include FIFO control registers 110. MSMU 124 provides interrupts on line 115 to CPU 111, and connects to chip test interface 127.

Referring to FIG. 3 in connection with FIG. 1, in this preferred implementation adapter memory 112 includes 3 send FIFO buffers 104 and 3 receive FIFO buffers 105. The timing critical MSMU 124 component is MSMU SRAM memory 112, which operates at 100 MBS total bandwidth (in and out of the memory). MSMU 124 supports the interfaces to and from network 102, which operates at 25 MBS over interface 131 from network 102 and simultaneously operates at 25 MBS over interface 133 to network 102.

MSMU 124 INTERFACES

MSMU 124 interfaces with clock system 135 over lines 141, 143; static random access memory (SRAM) 112 over address bus 142 and data bus 144; CFE bus 125; Allnode switch interface 138; processor 108 interupts 115; and chip test interface signals 127, as hereafter described. (Other MSMU 124 interfaces include miscellaneous controls 199, 220, 245, which will be described hereafter in connection with FIG. 4A.)

MSMU to Clock System Interface

Clock system 135 provides the following signals to MSMU 124: C50 MHZ 143, a 50 MHZ oscillator signal input; and C80 MHZ 141, an 80 MHZ oscillator signal input.

MSMU to CFE Bus Interface

Referring further to FIG. 3, in accordance with this embodiment, CFE bus 125 includes a 32-bit bi-directional address/data bus with four, byte parity lines. Bit 31 of the Bus is the most significant bit (MSB). In addition, CFE bus 125 includes 15 control lines, as will be described hereafter in connection with FIGS. 6A and 6B.

MSMU to Static Random Access Memory Interface

The MSMU 124 to memory 112 interface is a standard SRAM implementation, with the following interface signal lines:

MADD 142: a 19-bit address bus generated by MSMU 124 without parity. Bits 16 to 0 define a 512 KB SRAM, and bits 17 and 18 provide for possible memory expansion. Bit 18 is the MSB.

MD 144: a 36-bit bi-directional data bus for reading and writing 32-bit data words having odd byte parity. MD(31) to MD(0) are the 32 data bits with MD(31) being the MSB. MD(35) to MD(32) are the parity bits with MD(35) being the byte parity for the most significant byte.

MWE NOT (not shown): a negative active write enable line to MSMU SRAM 112 generated by MSMU 124.

MOE NOT (not shown): a negative active MSMU SRAM 112 output enable line generated by MSMU 124.

MSMU to Allnode Switch Interface

Referring further to FIG. 3, in accordance with this invention, MSMU 124 supports up to two switch interfaces 131, 133, each having an input port of 12 interface signals and an output port of 12 interface signals. As will be explained hereafter in connection with FIGS. 31 and 32, each switch port (input 131 and output 133) includes 8 data signal lines (DATA0 through DATA7), and 4 control signal lines to provide a full duplex, byte-wide interface.

User Interrupts and Miscellaneous

MSMU 124 generates seven user interrupt signals (MCINT 15, MCINT 14, MCINT 12, MCINT 11, MCINT 10, MCINT 09, and MCINT 07) on line 115 without going through bus master 130 or bus master/PCI 132. These interrupts are negative active (0=interrupt), and interrupt processor 108.

In addition MSMU 124 implements the interface signal NET RESETN (not shown): a negative active signal, which when down, indicates that a CFE bus 125 reset has been issued from network 102; and chip test signals 127: chip I/O pins used to aid in the functional test of the switch chips.

MSMU 124 ORGANIZATION

Figure 4A:
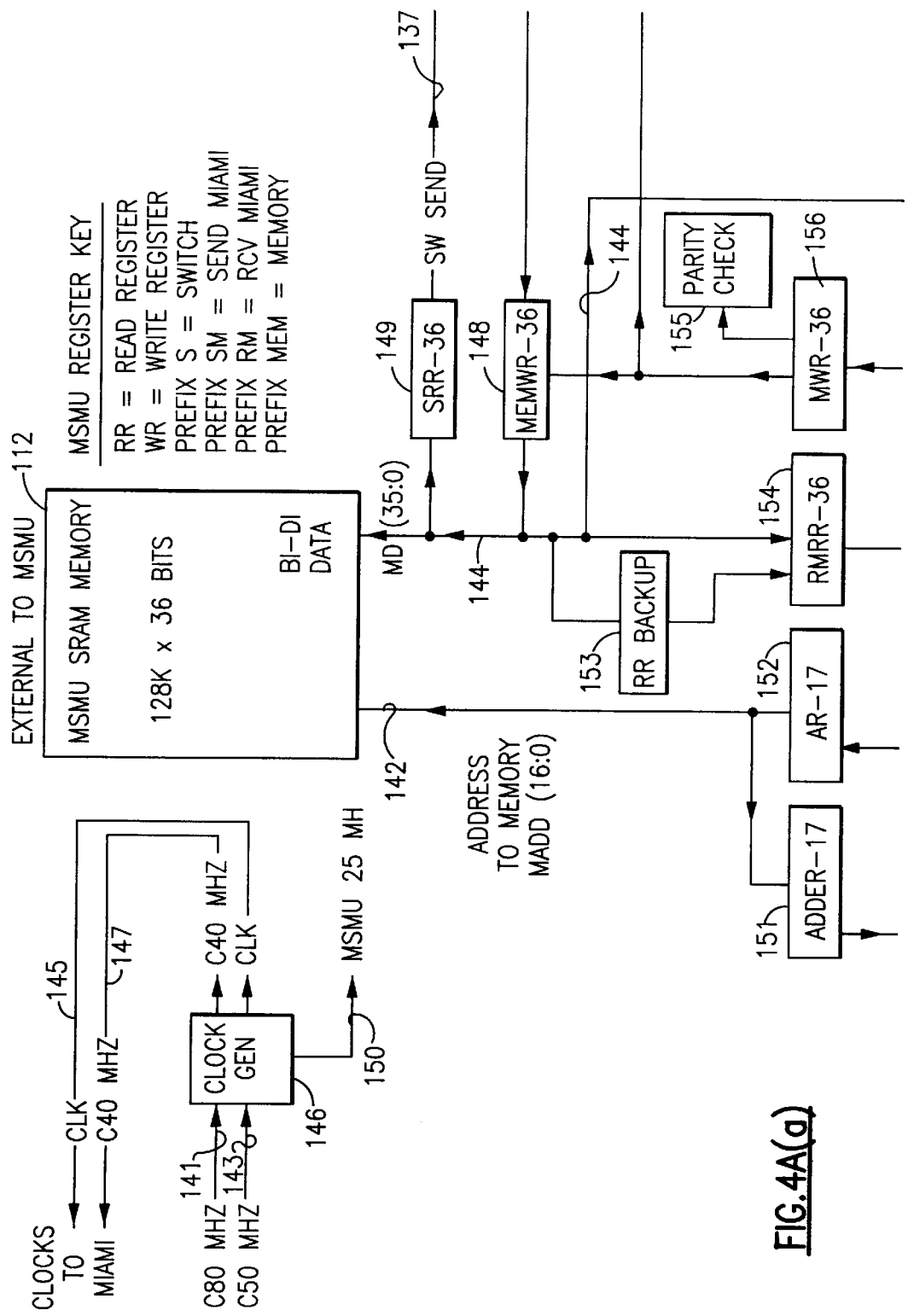
FIGS. 4A, 4A(a)–4A(h) are functional block diagrams of a multi-purpose switch management unit (MSMU).
Figure 4A:
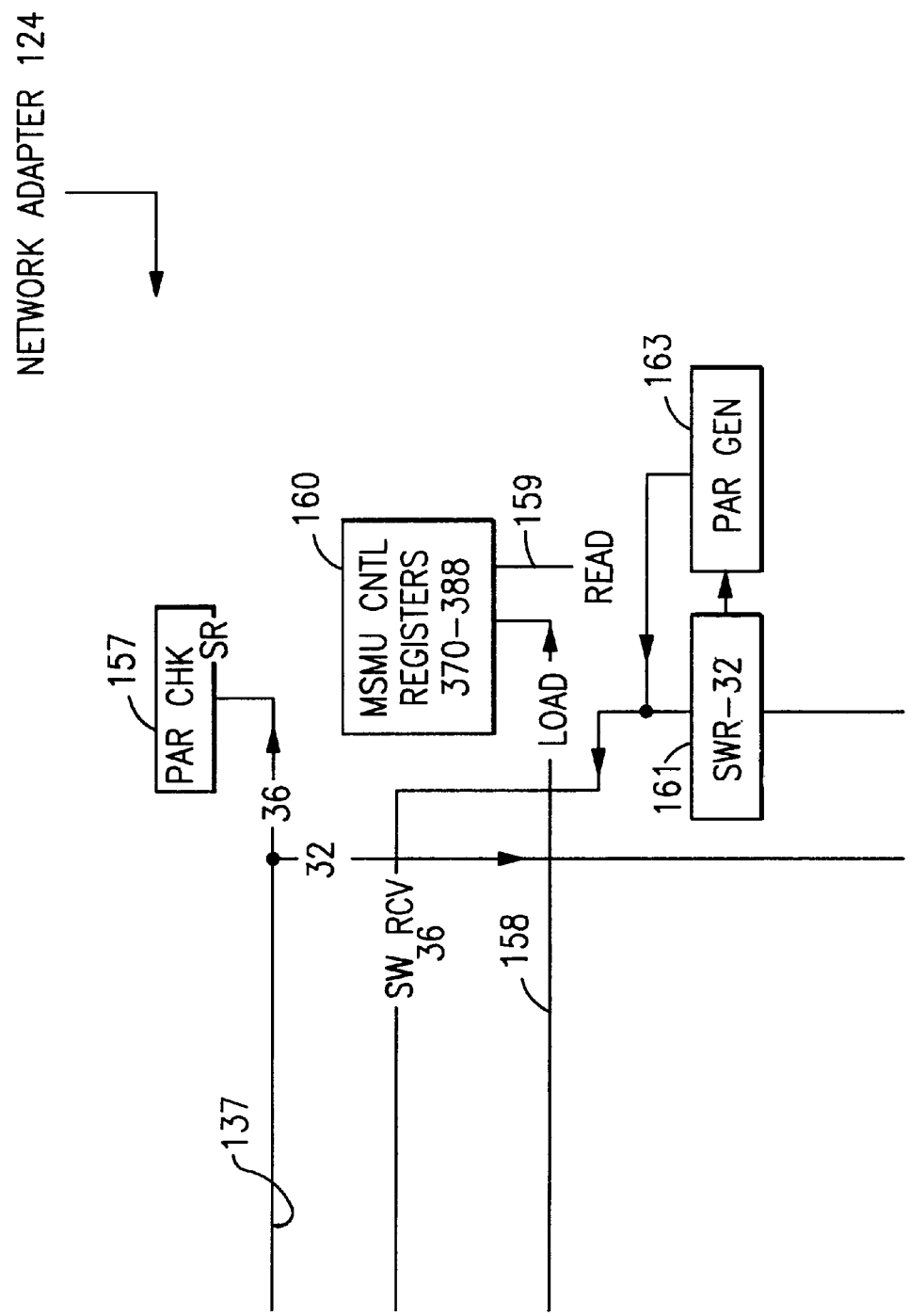
Figure 4A:
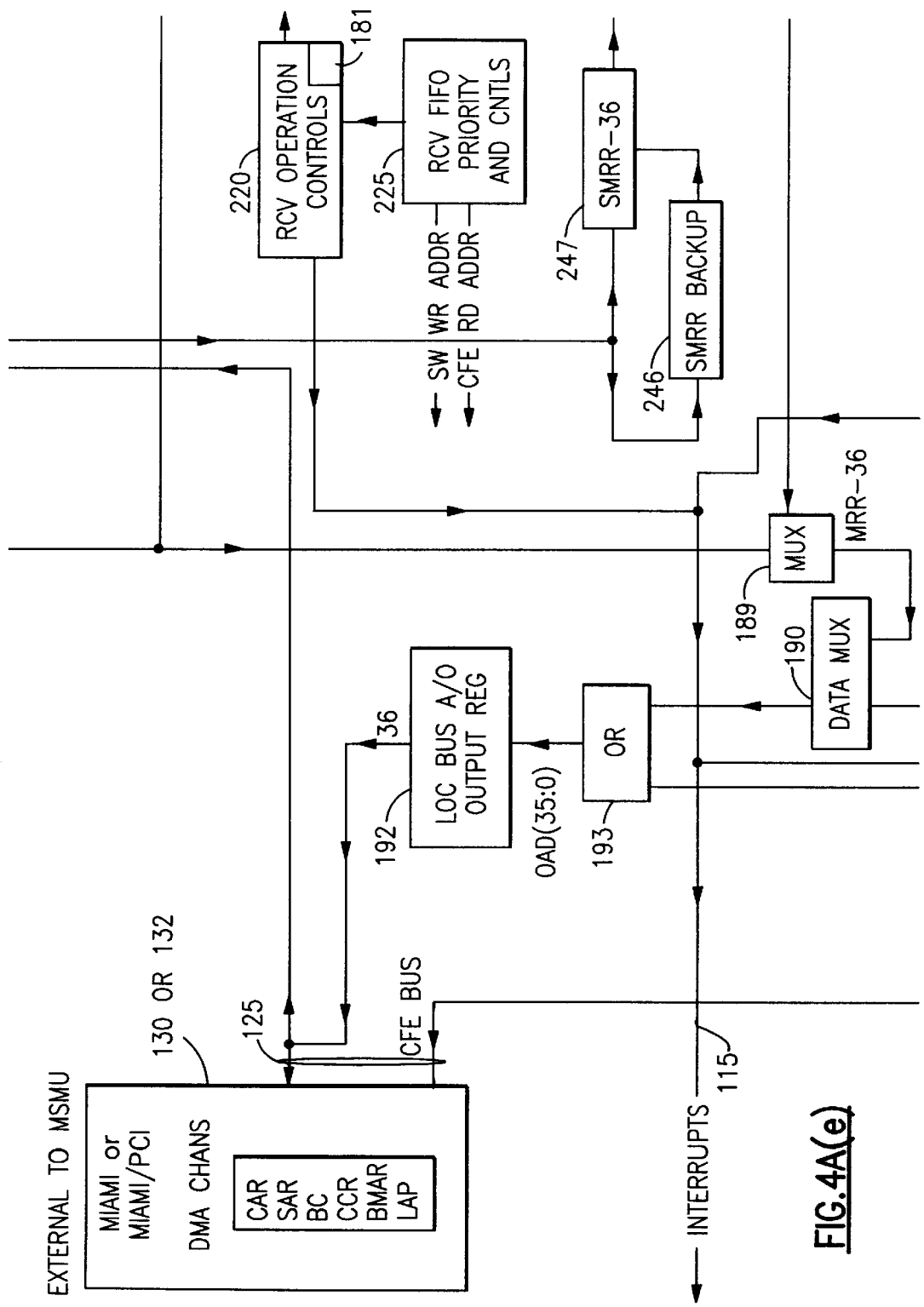
Figure 4A:
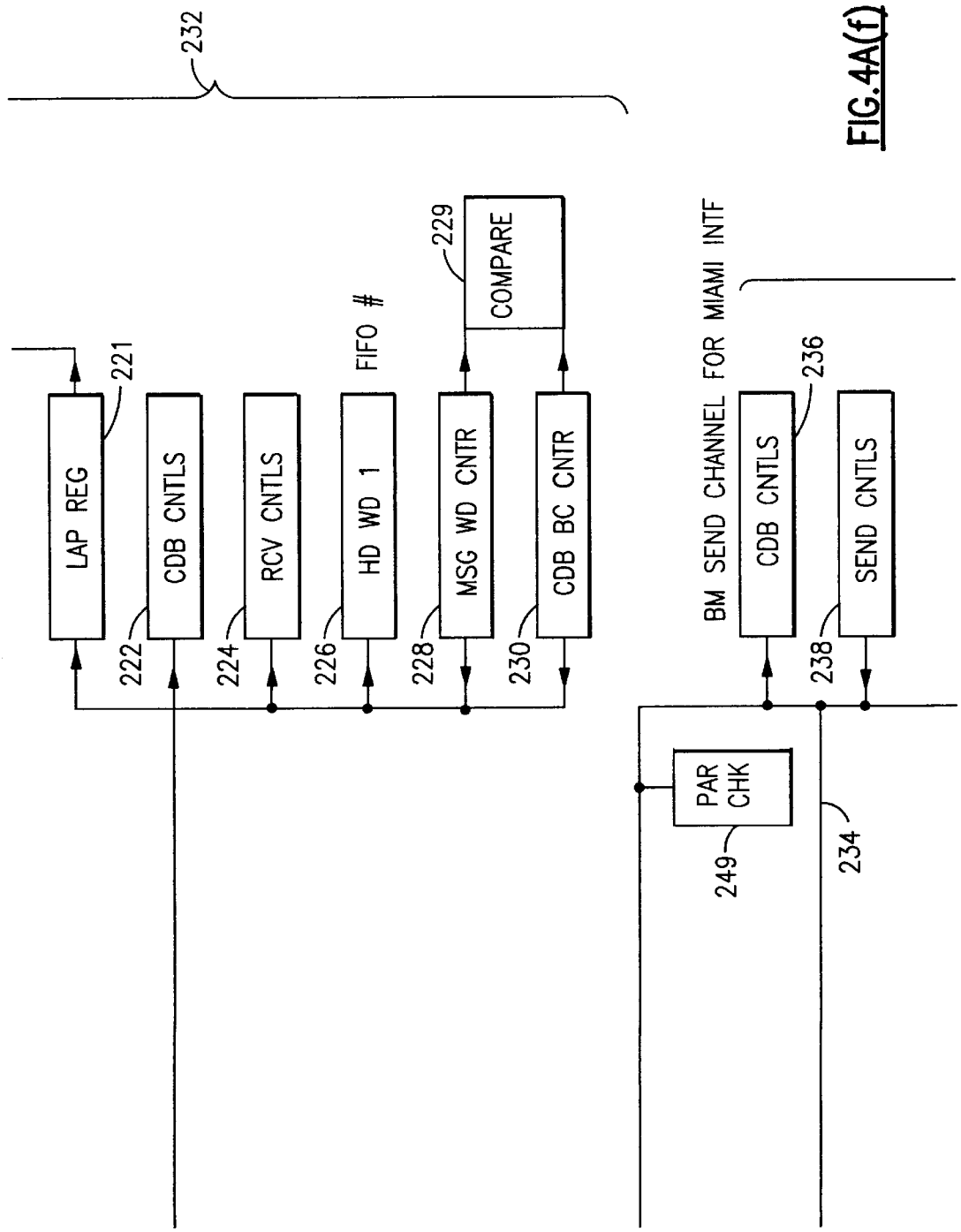
Figure 4A:
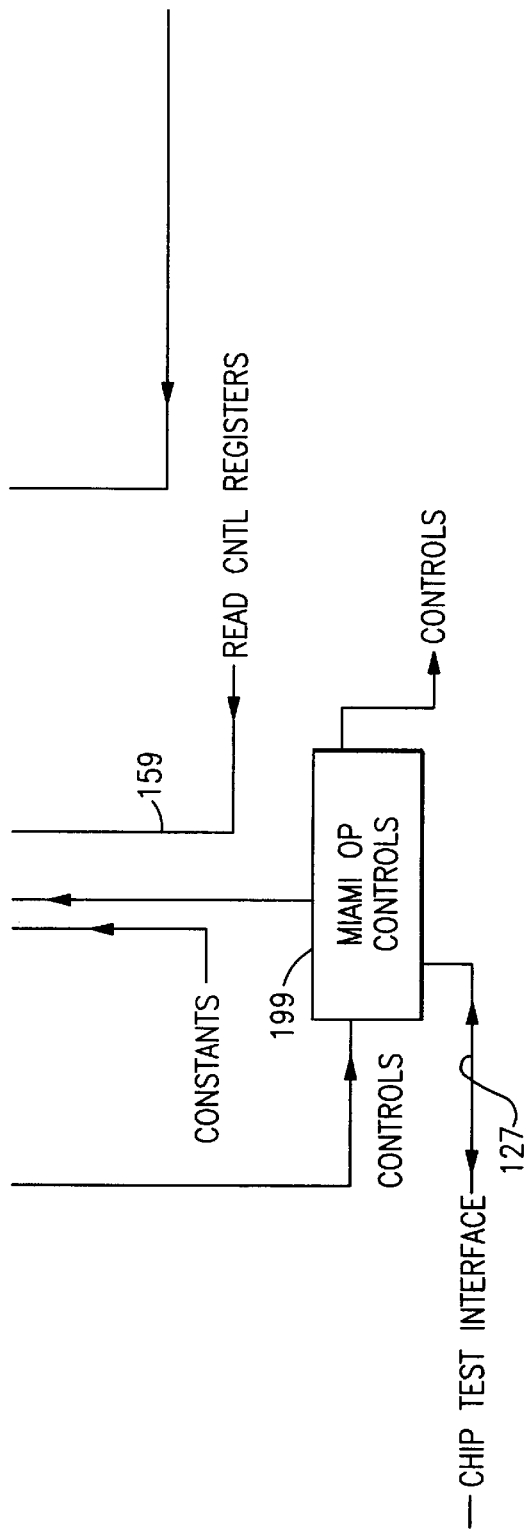

Referring to FIG. 4A, a functional layout of MSMU 124 will be described.

Figure 6A:
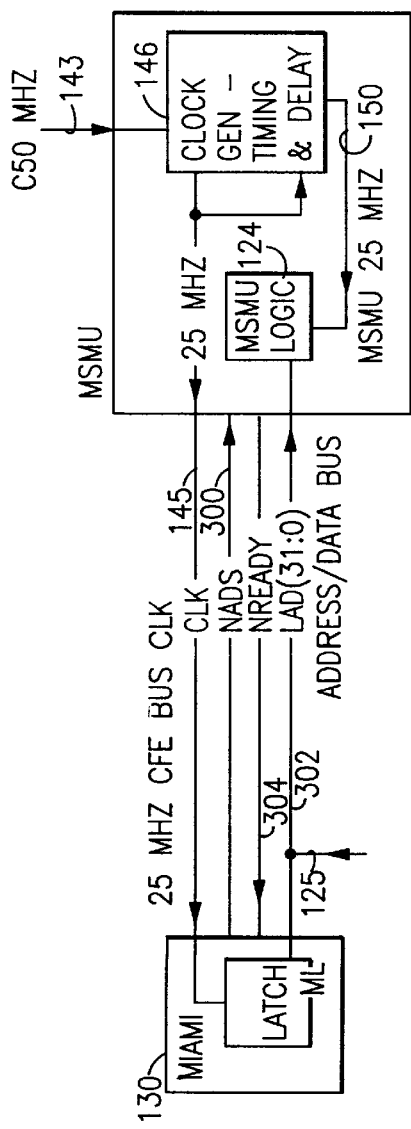
FIG. 6A is a block diagram of the CFE bus controls.
Figure 6B:
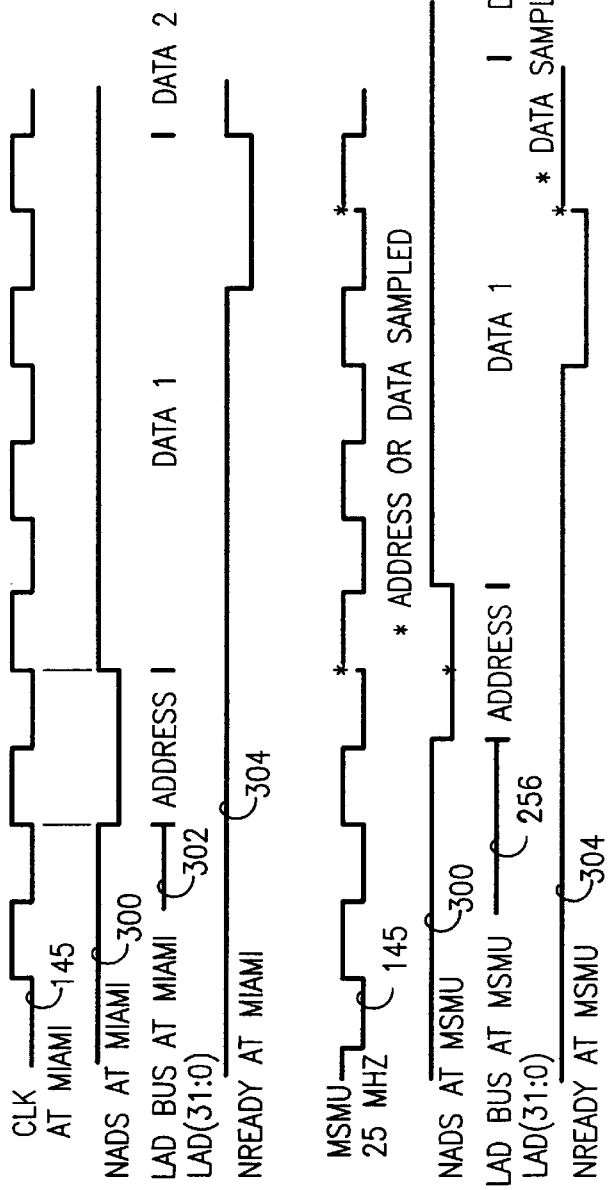
FIG. 6B is a timing diagram illustrating the operation of the common front end (CFE) bus interface to the MSMU.

MSMU clock generator 146 counts down the C80 MHZ input signal 141 to generate C40 MHZ signal 147, a 40 MHZ square wave signal generated by MSMU 124 and output to support other on-card components, such as bus master 130; and counts down the C50 MHZ input signal 143 to generate CLK signal 145, a 25 MHZ square wave signal used for internal MSMU 124 clocking and output from MSMU 124 to bus master 130 for controlling local CFE bus 125 timing, and the MSMU 25 MHZ signal 150 as an internal clock for MSMU 124. Further clocking generation details are shown in FIGS. 6A and 6B.

CFE bus 125 provides 32-bit data and address words. Address words received on CFE bus 125 are placed in either receive memory address register (RMAR) 172 for receive operations (read operations over CFE bus 125), or into send memory address register (SMAR) 170 for send operations (write operations over CFE bus 125). From there, the address is used to address MSMU control registers 160, address MSMU SRAM 112 directly, address channel descriptor blocks (CDB) in MSMU SRAM 112, or to specify the use of (that is, address) a particular send or receive FIFO 103 in MSMU SRAM 112. The memory address is supplied to AR register (17 bits) 152 and thence to address bus 142 through address multiplexor (ADDR MUX) 176 from several sources (including blocks 170, 172, 174, 175, 177, 178, 179, 180 and 182) and is incremented through shared adder 151 and returned to update source register 170, 172.

Figure 5A:
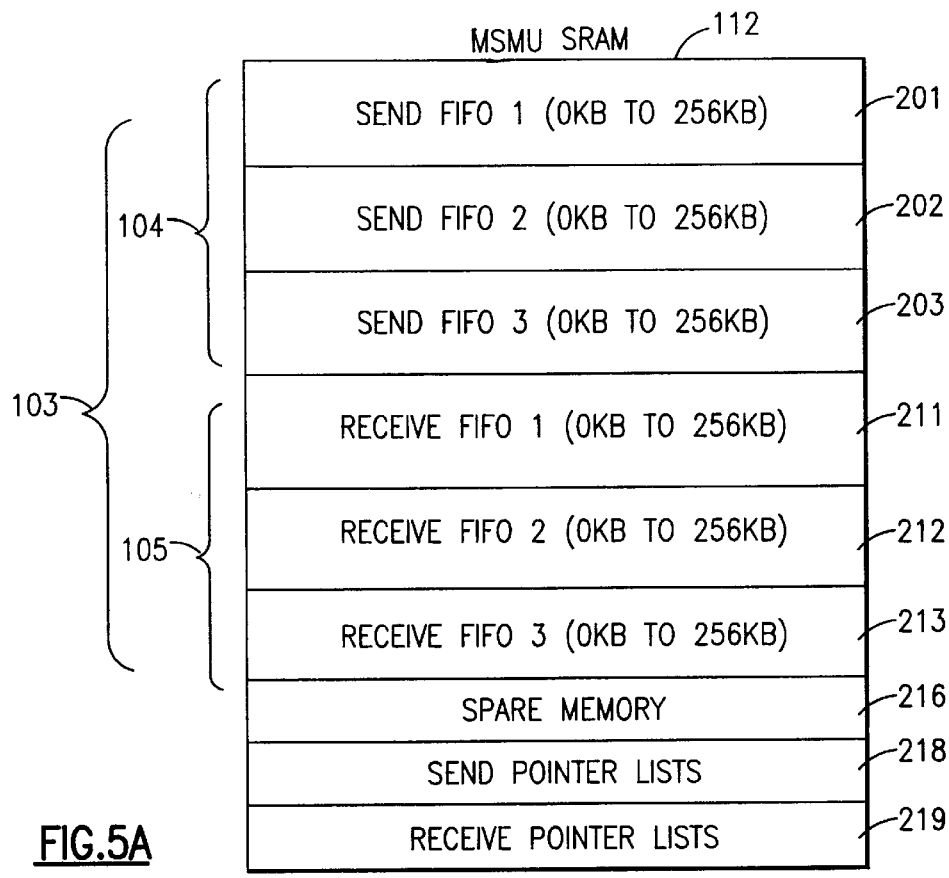
FIG. 5A is a diagram of MSMU static random access memory (SRAM) memory partitioning.
Figure 5B:
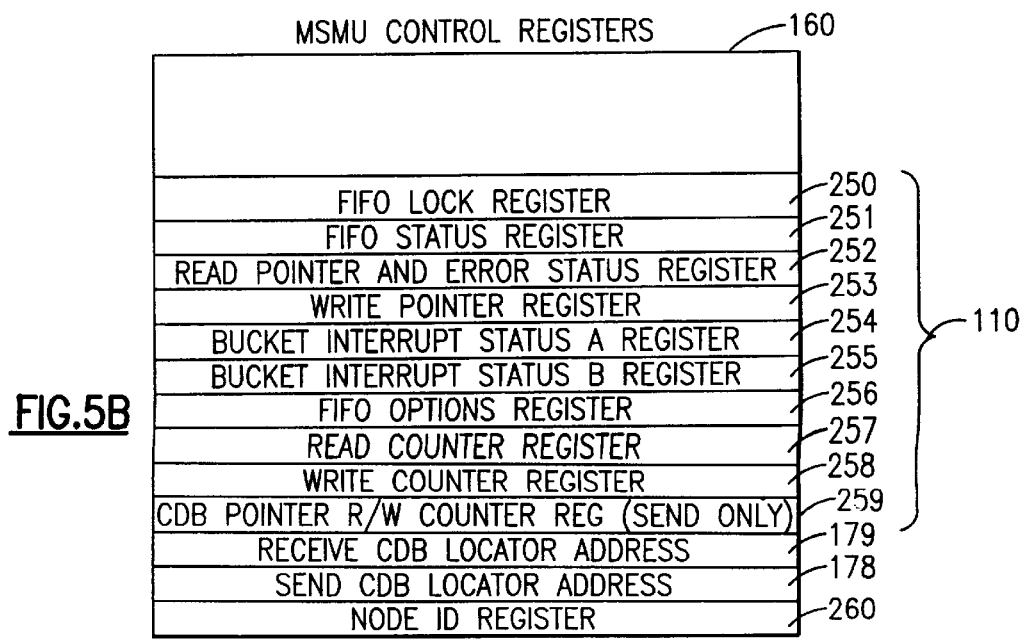
FIG. 5B is a diagram of the control registers for a typical FIFO buffer.

Data words received on CFE bus 125 are placed in memory write (MWR) register 156, checked for correct parity by parity checker 155, and then placed to either MSMU SRAM memory 112 (which includes specially controlled sections for FIFO buffers 103 to be described hereafter) or written via load line 158 to MSMU control registers 160, which include FIFO control registers 110 (FIG. 1, to be further described hereafter in connection with FIG. 5B). Control registers 110 are written or read individually based on an address stored to SMAR 170 or RMAR 172 as selected by MUX 173 and decoded by address decoder 171. Write backup (WR Backup) register 184 is provided to receive data from CFE bus 125 in advance and to keep the write data flowing smoothly to MSMU SRAM memory 112. Send and RCV FIFO buffers are addressed by six FIFO read counters 174 and six FIFO write counters 175, which are further described hereafter in connection with FIG. 28.

Data words read from MSMU SRAM 112 are read into memory read (RMRR) register 154, checked for correct parity by parity checker 187, and then sent to CFE bus 125 through data multiplexors 189 and 190, OR gate 193, and the local bus address/data output register 192, where the data is reclocked prior to leaving MSMU 124 on CFE bus 125 to bus master 130 or 132. Data multiplexor 190 permits MSMU control registers 160 to be read via bus 159 over CFE bus 125. RR back-up register 153 is provided to read MSMU SRAM 112 in advance and to keep the read data flowing smoothly.

Data words read from MSMU SRAM 112 and being sent to network 102 are loaded into switch read register (SRR) 149 from bus 144 and checked for correct parity by parity checker 157. SRR 149 then sends the data to switch logic 164 on line 137 for reformatting in MSMU network sending channel 165 and transmitting to network 102 over interface 133. Data arriving from network 102 is presented over interface 131. Data is recovered by switch logic 164, reformatted by MSMU network receive channel 166, and sent as 32-bit words to switch write register 161. Parity is generated by parity generator 163, and the data and parity are stored to MSMU SRAM 112 through MSMWR 148.

Figure 24A:
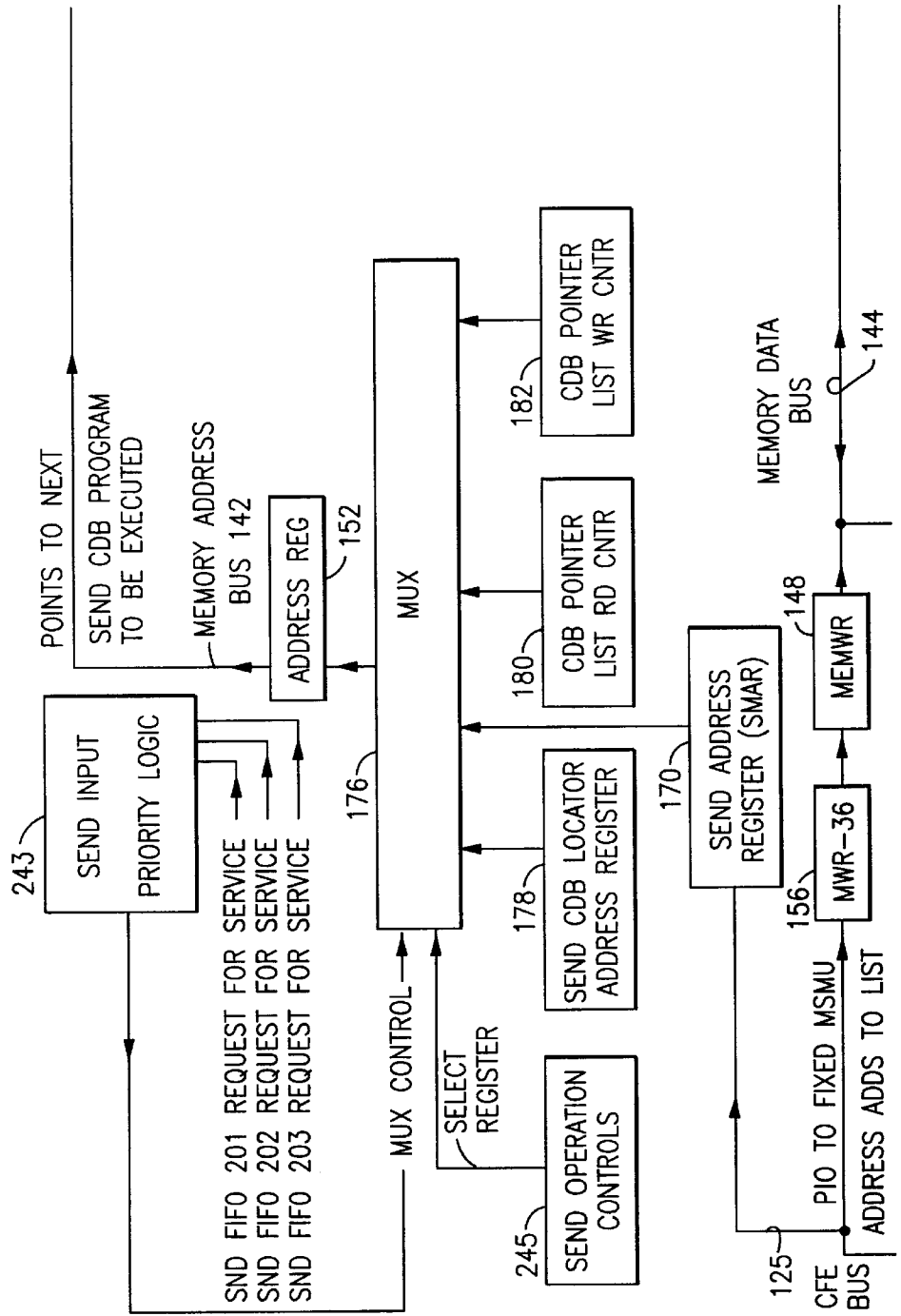
FIG. 24 is a block diagram illustrating send channel descriptor block (CDB) pointer list processing.
Figure 24B:
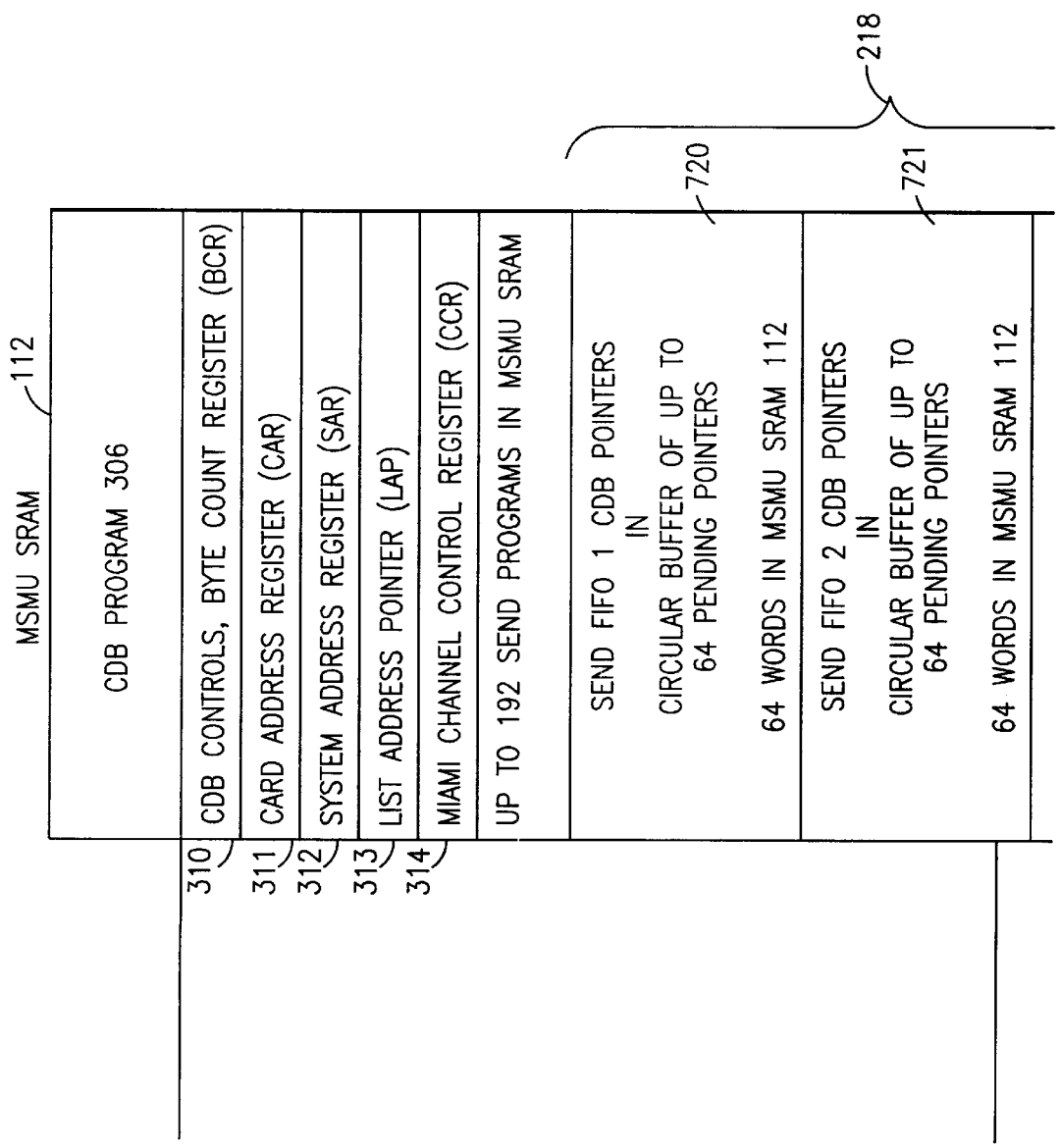
Figure 24C:
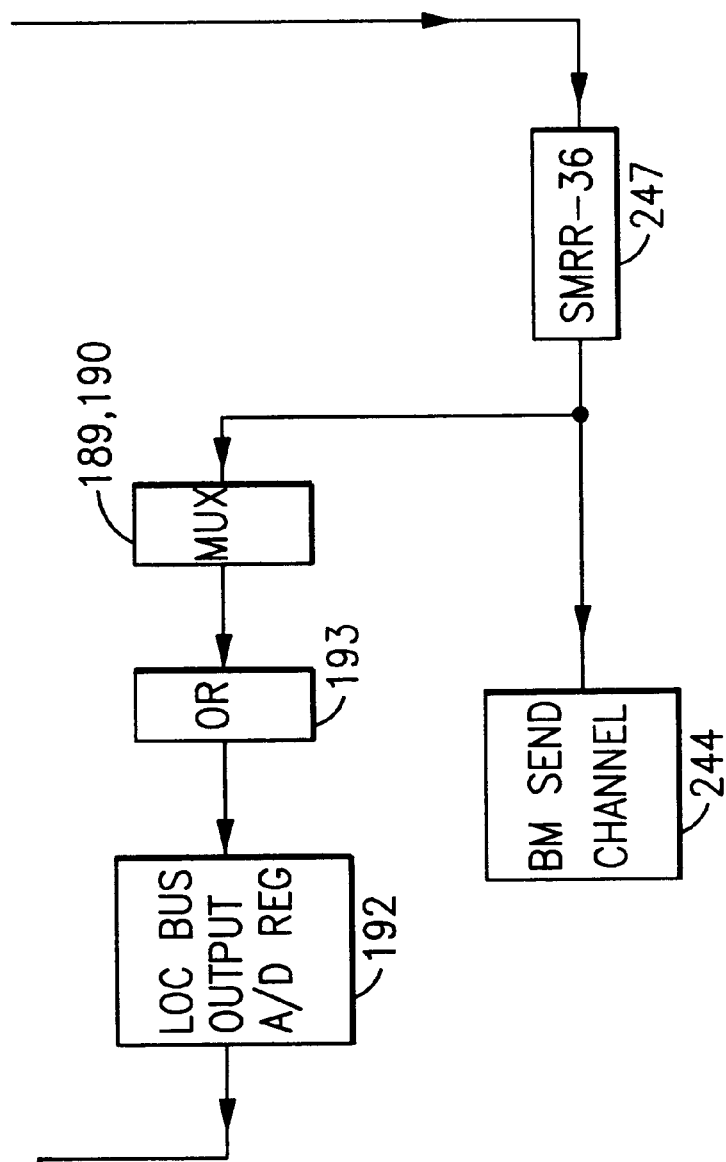
Figures 24, 24D:
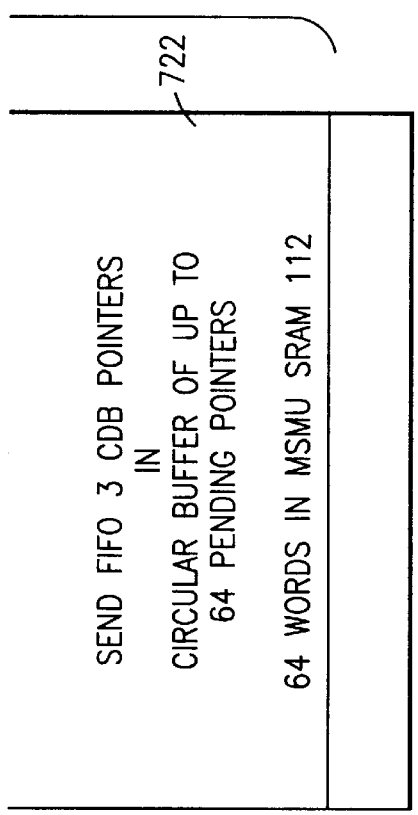
Figure 28B:
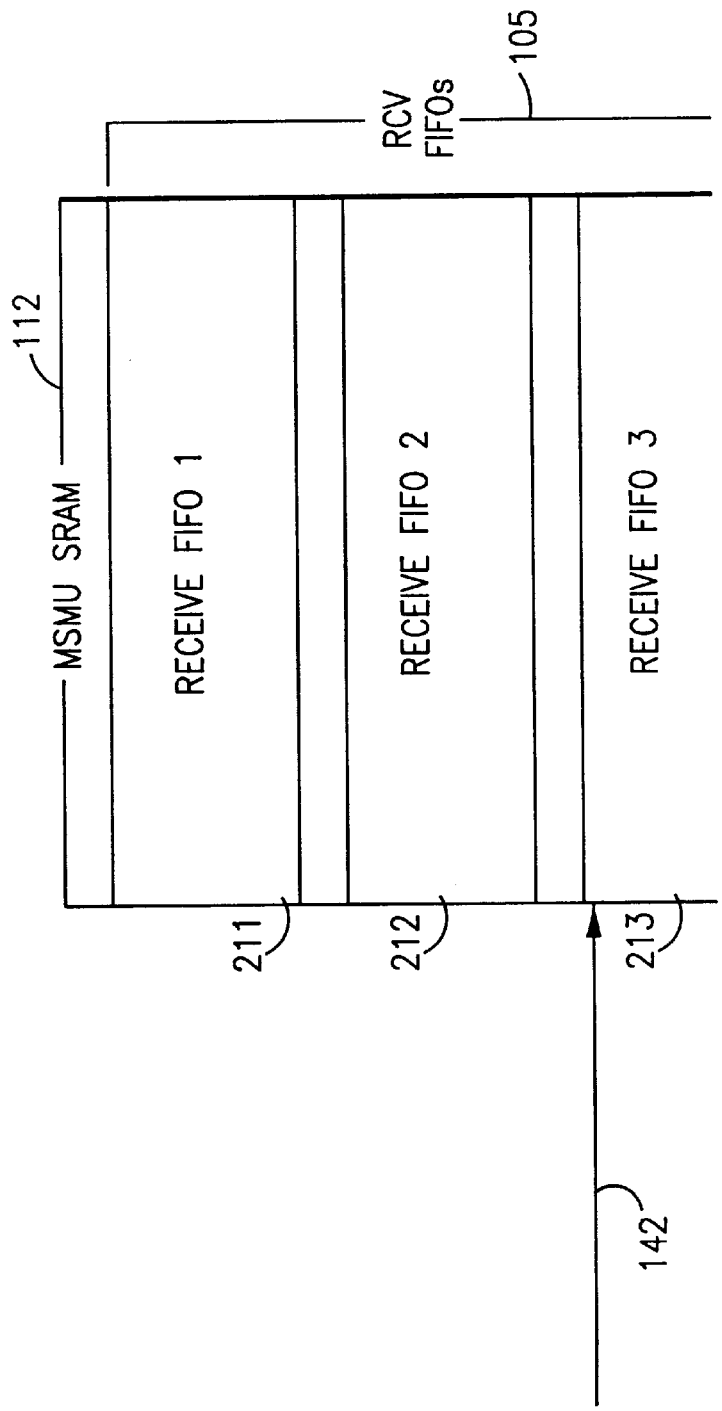
FIG. 28 is a block diagram illustrating receive direct memory access (DMA) message processing.
Figure 28C:
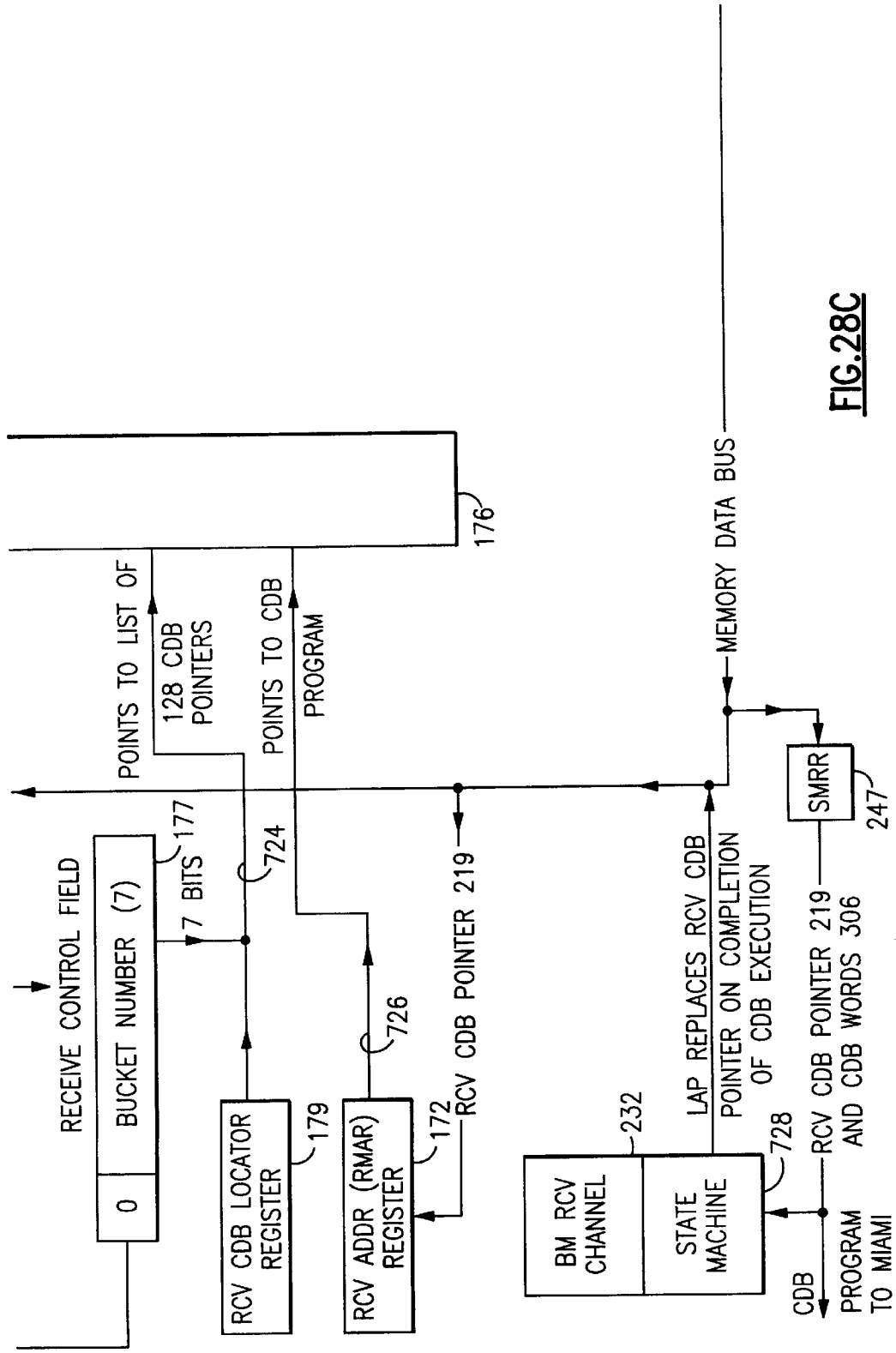

As will be more further described hereafter in connection with FIGS. 24 and 28, MSMU 124 supports simultaneous send and receive DMA operations with respect to FIFO buffers 103 using bus master 130, 132 dual channel bus master (BM) capabilities.

Bus master receive channel 232 and send channel 244 are each used to control a separate DMA transfer, and can be active simultaneously using CFE bus 125 in a multiplexed fashion. Channels 232 and 244 each store a CDB for the active DMA transfer, and control the transfer internal to MSMU 124. FIGS. 7, 8, 9, 22, 25, and 28 give more details of the control of the DMA operation using CDBs to control the DMA channels.

Receive operation controls 220 and 225 select the highest priority receive FIFO 105 having a pending DMA operation, and set up 6 bus master (BM) receive registers, including channel descriptor block (CDB) controls 222, receive controls 224, FIFO number (HD WD 1) 226, message word counter 228, CDB byte counter 230, and latest list address pointer (LAP) register 221 to implement the bus master (BM) receive channel 232 in MSMU 124. Comparator 229 is provided to compare the value in register 230 with register 228, and select the smaller of the two values, for purposes to be described hereafter. The RCV CDB is pointed to by RCV CDB locator register 179 (FIG. 5B) and RCV control field register 177.

Likewise, send operation controls 245 and 243 select the highest priority send FIFO 104 having a pending DMA operation, and set up four bus master (BM) send registers 236, 238, 240, 242 to implement BM send channel 244 in MSMU 124. SMRR back-up register 246 is provided to read MSMU SRAM 112 in advance and to keep the read data flowing smoothly. SMRR register 247 output on line 234, after being checked for correct parity by parity checker 249, supplies BM send channel 244 with CDB programs 306 (see FIG. 7) without interfering with the receive operation in progress which may be using the RR back-up register 153 and read data register 154 simultaneously. CDBs are fetched from MSMU SRAM 112 under the control of register 178 and counters 180 and 182, which are used to address in CDBs through address MUX 176 and address register 152. Further detail is shown in FIG. 24.

Bus master controls 199 perform the synchronization functions required in MSMU 124 to enable bus master 130 to read and write control registers 160 and MSMU SRAM 112, and provides chip test interface 127. Interrupts 115 are generated in receive operations controls block 220 and send operation controls block 245.

Data written from memory data (MD) bus 144 to MSMU SRAM memory 112 always goes through memory write (MEMWR) register 148. The data can come from two sources: from CFE bus 125 through preliminary memory write (MWR) register 156, and from switch write register (SWR) 161 from the switch in receive logic 164 for inputting messages into receive FIFO buffers 105. Data from MD bus 144 is read by Allnode switch interface 164 through switch read register (SRR) 149.

Figure 4B:
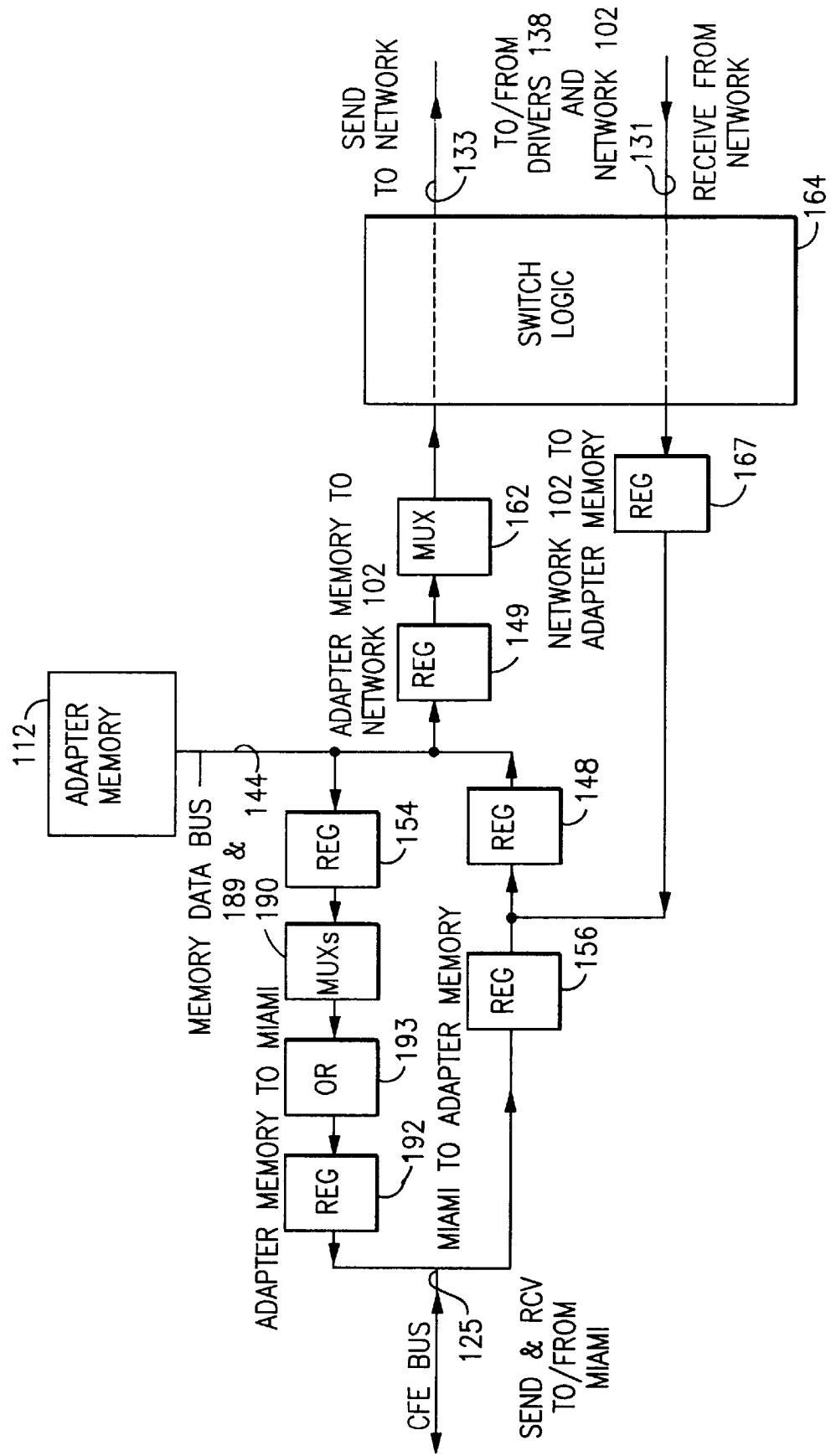
FIG. 4B is a functional diagram of the data flow to and from an adapter memory for supporting three concurrent functions.

Referring now to FIG. 4B, the data flow in and out of adapter memory 112 is further described, where memory 112 is a store-and-forward buffer memory operating at a total bandwidth of 100 MBS. Three concurrent functions share the 100 MBS bandwidth as follows:

(a) Data received from network 102 at 25 MBS.

(b) Data sent to network 102 at 25 MBS.

(c) Data sent or received (mutually exclusive) to bus master 130, 132 at 50 MBS.

The data flow for sending data to switch network 102 is as follows: data arrives on bus 125 into registers 156 and 148, and is stored to memory 112 over bus 144. Switch logic 164 reads the data out of memory 112 through register 149 and MUX 162 and sends the data to network 102 over Allnode interface 133 and drivers 138. In the opposite direction, data arrives from network 102 over interface 131, goes through registers 161 and 148 to be stored to memory 112. Bus master 130 reads the data from memory 112 through register 154, MUXes 189 and 190 and OR 193 to register 112, and then over bus 125 to bus master 130, 132.

MSMU BUFFER MEMORY (SRAM) 112 ORGANIZATION

Referring to FIG. 5A, MSMU Buffer Memory 112 provides FIFO buffers 103, including one to three send FIFO buffers 104 (FIFO buffers 201, 202 and 203), one to three receive FIFO buffers 105 (FIFO buffers 211, 212 and 213), spare memory 216, send pointer lists 218, and receive pointer lists 219. Processor 108 software allocates the use of MSMU SRAM 112, defines the starting address (lower boundary) of each FIFO 103, selects each FIFO size, in this embodiment ranging from 0 KB to 256 KB, and defines FIFO 103 priority. These options are set individually for each FIFO 103 by writing control bits to an options register 256, one provided for each FIFO 103, as will be more further described hereafter in connection with FIGS. 5B and 18. Send pointer list 218 is further detailed in FIG. 24 and receive pointer list 219 in FIG. 28. Processor 108 defines the location of pointer lists 218 and 219 in MSMU SRAM 112, as further detailed by FIGS. 23 and 26. As will be further described hereafter with respect to FIG. 7, processor 108 software also controls the allocation of spare MSMU memory 216, which it uses mainly for control programs for DMA. These programs, called channel descriptor blocks (CDBs), are used by bus master 130 to control send and receive DMA operations simultaneously. The sum total of the allocated FIFO buffers 103, pointer lists 218 and 219, and spare memory 216 cannot exceed the size of MSMU SRAM 112.

Referring to FIGS. 5B and 5C, in accordance with this embodiment, six sets of registers 110 (250–259) are provided in MSMU control register 160, one set for each FIFO 103. FIG. 5C shows the address assignments used by the processor software to differentiate the six sets of registers 250–259, on set for each FIFO 201–203 and 211–213. MSMU control registers 160 also include receive CDB locator address 179, send CDB locator address 178, and node ID register 260. The functions performed by each of these registers 160 will be further described hereafter.

CFE BUS 125 INTERFACE AND CLOCK TIMING

Referring to FIGS. 6A and 6B, CFE bus 125 includes the following 15 control lines. (Signals on some of these lines are shown in the MSMU/bus master timing diagram of FIG. 6B, where bus master 130 is shown as the bus master and MSMU 124 as the bus slave.)

NCMDRSTOUT: negative active CFE Bus Reset generated by bus master 130 or by MSMU 124 from a network reset message for special cases where bus master 130 is not used.

NADS: negative active timing signal 300 indicating the address is on CFE bus 125, and is generated by the bus master (which is either MSMU 124 or bus master 130, whichever is controlling the transfer).

W_NR: write/read control line (not shown) generated by the bus master. Negative is read.

NREADY: negative active control line 304 generated by bus slave when data is available on CFE bus 125. The bus slave is either MSMU 124 or bus master 130, whichever is NOT controlling the transfer.

NBLAST: a negative active control line (not shown) meaning end of transfer, generated by the bus master and active when the last data transfer is being requested on CFE bus 125.

NMSTRREQ: a negative active request (not shown) from bus master 130, when functioning as bus master, for the use of CFE bus 125.

NSLVEREQ: a negative active request (not shown) for the use of CFE bus 125 from bus master 130 when functioning as bus slave.

NMSTRACK: a negative active acknowledgement (ACK) (not shown) of a request for the use of CFE bus 125, generated by bus master when acting as bus master, or by the MSMU 124 bus arbiter (not shown.)

NSLVEACK: a negative active ACK of a request for the use of CFE bus 125 from bus master 130, when functioning as bus slave, or by the MSMU 124 bus arbiter (not shown.)

INT(3), INT(2), INT(1) and INT(0): four coded CFE bus 125 interrupt signals (not shown) generated by bus master 130.

NEXCEPTION: a synchronous, negative active error signal (not shown) generated by the bus slave (in this example, MSMU 124) of CFE bus 125.

All address and data information transferred between bus master 130 and MSMU 124, regardless of which one is master or slave, is put on CFE bus 125 in conjunction with the rise of CLK 145 (a 25 MHZ signal), and received (taken off CFE bus 125) in conjunction with the rise of the following CLK 145 signal. MSMU 124 generates the CLK 145 signal by counting down the C50 MHZ signal 143. CLK 145 experiences on/off chip pulse transmission delays, so bus master 130 sees CLK 145 delayed from its generation point in MSMU 124. To keep the clock that bus master 130 uses aligned with the clock the MSMU 124 uses, clock generator 146 delays CLK 145 and creates the MSMU 25 MHZ clock 150 to be identical to the CLK 145 signal as seen by bus master 130; i.e., the CLK 145 signal as seen by bus master 130 is identical in timing to the MSMU 25 MHZ 150 clock as seen by MSMU 124. Referring to FIG. 6B, an example of this is shown, with bus master 130 as master writing to MSMU 124 as slave. Bus master 130 starts the transfer by placing an address on CFE bus 125 and dropping negative address strobe (NADS) signal 300 with the rise of CLK 145. MSMU 124 sees the NADS signal 300 after a transmission delay, and on the next rise of MSMU 25 MHZ 150 (when NADS 300 is down) samples and stores the address from LAD bus 302 to send memory address register (SMAR) 170 or receive memory address registers (RMAR) 172 (see FIG. 4A). Bus master 130 activates NADS 300 for one clock time only, after which bus master 130 places the first data word on CFE bus 125 and holds it there until slave MSMU 124 responds with not ready (NREADY) 304 for one clock time. All control signals, including NADS 300, and NREADY 304, are activated, deactivated, and sampled only on the rise of CLK 145 or its equivalent, MSMU 25 MHZ clock 150. Thus, CFE bus 125 is a synchronous bus.

CFE BUS 125 PERFORMANCE

In this embodiment, CFE bus 125 is capable of transferring 4-byte words at 25 MHZ, which yields a maximum, 0-Wait transfer rate of 100 MBS. 0-Wait means that negative ready (NREADY) 304 goes down to start a data transfer and stays down (stays ready) during every subsequent clock time indicating that a new 4-byte data word can be transferred every clock time; this equals the 100 MBS maximum rate. MSMU 124 implements a transfer rate of receiving or sending data to bus master 130 that is the 1-wait rate of 50 MBS. This means that MSMU 124, when driving NREADY 304 as a slave will at best cause the NREADY signal to oscillate being down (ready) for 1 clock cycle and up (not ready) for 1 following clock cycle.

MSMU HEXADECIMAL AND BYTE CONVENTIONS

Memory and register address values, and data values, herein specified are given in hexadecimal, unless otherwise noted.

A data or address word is 32 bits in length. The most significant data bit is labelled bit 31, and the least significant bit is labelled bit 0.

Each address or data word is divided into 4 bytes and each byte is supplemented with one byte parity bit containing odd parity. The most significant byte is byte 3, and the least significant byte is byte 0.

CONTROL OF MSMU USING CDB PROGRAMS

Figure 7:
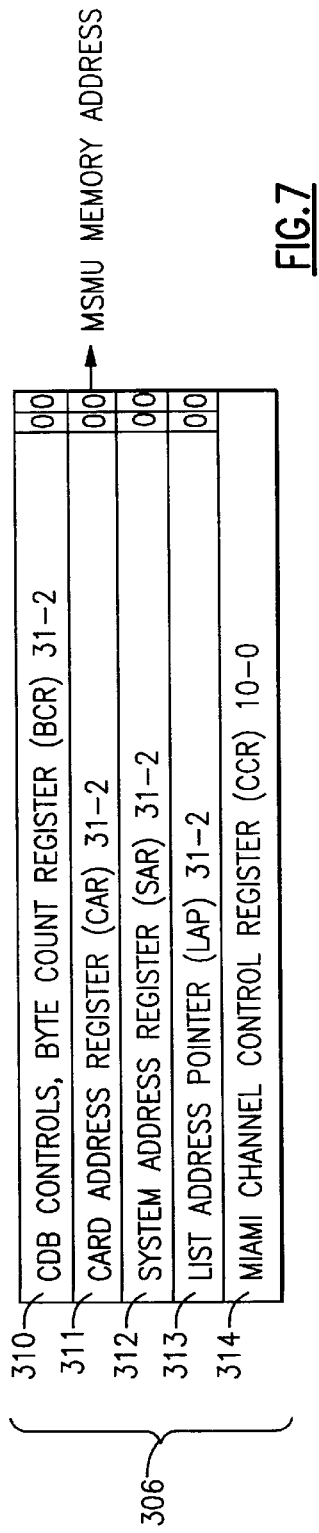
FIG. 7 is a format diagram of a channel descriptor block (CDB) for control of direct memory access (DMA) send and receive operations.

Referring to FIG. 7, both MSMU 124 and bus master 130 are intelligent chips capable of being programmed by programs residing in MSMU SRAM 112 to descriptor blocks (CDBS) 306.

The five CDB 306 word types are as follows:

Type 1. Byte count register (BCR) 310—This word contains the byte count of the transfer that CDB 306 is controlling, and the following control bits:

Bit 31—Program Validity=1 means that CDB 306 is a valid one.

Bit 30—Reserved

Bit 29—Reserved

Bit 28—CAR=1 means the card address register (CAR) 311 CDB word option is enabled; 0=CAR 311 disabled.

Bit 27—SAR=1 means the system address register (SAR) 312 CDB word option is enabled; 0=SAR 312 disabled Bit 26—Reserved Bit 25—Reserved Bit 24—EN LAP=1 means to use list address pointer (LAP) 313 CDB to point to the next CDB 306 to be executed (automatic set-up).

Type 2. Card address register (CAR) 311—This word contains the address of FIFO 103, MSMU SRAM 112 direct memory location, or MSMU control registers 160 involved in the transfer being controlled by CDB 306.

Type 3. System address register (SAR) 312—This word contains the address of system memory 114 including buckets 117.

Type 4. List address pointer (LAP) 313—This is a pointer to the starting address of the next CDB 306 in MSMU SRAM 112.

Type 5. Bus master channel control register (CCR) 314—This word is used by bus master 130 to control the DMA operation. It contains 11 control bits as follows:

Bit 10—Inhibit card address increment Control, 0=increment.

Bit 09—Arbitration (ARB) level select for processor bus 106.

Bit 08—Reserved

Bit 07—Reserved

Bit 06—Reserved

Bit 05—Inhibit MC 126 or PCI 128 address increment: 0=increment.

Bit 04—Reserved

Bit 03—Reserved

Bit 02—Interrupt to MSMU 124 on end of DMA byte count: 1=enabled.

Bit 01—Direction bit: 0=receive, 1=send

Bit 00—Start/stop control: 1=Start, 0=Stop.

ALLNODE MESSAGE FORMAT

Figure 8:
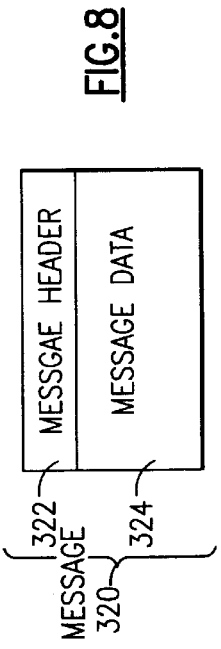
FIG. 8 is a format diagram of an allnode message.

Referring to FIG. 8, the message format of an Allnode write-only message 320 is shown. Every message 320 includes message header 322 and message data 324.

Referring to FIG. 8 in connection with FIG. 2, Allnode adapter card 101, (also referred to more generically as the network adapter card 101) using MSMU 124, supports the passing of messages between nodes of a parallel system through Allnode switch 121 and 123 using the protocols defined herein. MSMU 124 only supports write-only messages, whereby any node, say 100, can write (send) a message to another node, say 119. If node 100 wants to read from another node 119, it must send a write operation requesting the data it wants to read, and the responding node 119 will issue a write message returning the requested data. While Allnode adapter 101 supports read and write operations over processor bus 106, it supports only write messages across switch network 102. When transmitting a write-only message across network 121, 123 from one node 100 to another node 119, a sending node 100 creates and issues the message, network 102 media including Allnode switch 121 and 123 with an Allnode adapter 101 on each side transports the message, and a receiving node 119 on the other side of network 121, 123 receives the message.

Message Passing Protocol

Figure 9:
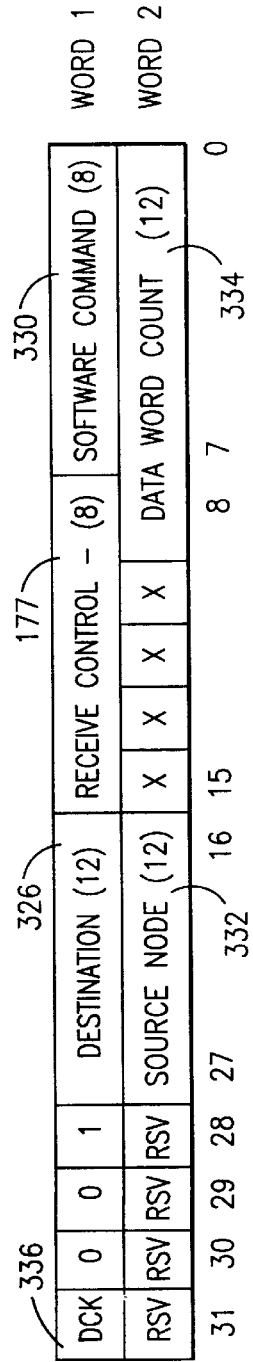
FIG. 9 is a format diagram of an allnode message header.

Referring to FIG. 9, message header 322 defines everything that MSMU 124 in sending node 100 and MSMU 124 in receiving node 119, for example, have to know in order to transmit message 320 across switch network 121 and 123 from one node 100 to another node 119, except for constant parameters which are previously set-up in MSMU control registers 160 (FIG. 4A). Message header 322 includes physical ID number 326 identifying destination node 119 receiving message 320, receive control field 177 containing control information for the MSMU (shown in FIG. 10) at receiving node 119, software command field 330, sending node 100's physical node identifier 332, the word count 334 of message 320 data, and several control parameters 336. Destination field 326 provides for addressing this message 320 to one of up to 4096 receiving nodes 119. Receive control field 177 permits MSMU 124 to execute various receiving options as described below. Software command 330 is an application control field for software use only; MSMU 124 hardware performs no operations on software command field 330, except to pass it directly across network 102. When receive destination check (DCK) bit 336 is zero, receiving MSMU 124 will check destination ID 326 in header 322 against the contents of the MSMU node ID register 260 (FIG. 5B.) If the compare agrees, MSMU 124 will continue to accept message 320. If the compare disagrees, MSMU 124 will reject message 320. In this embodiment, message data 324 is word-aligned and composed of an integral number of 32-bit words from 0 to 2K words (8K bytes).

Referring to FIG. 10, one function of receive control field 177 is to permit various receiving command options. The several command bits are used to control the selection of receive FIFO 105. Receive control field 177 in header 322 word 1 contains control information for the receive logic in MSMU 124, and is used to indicate the type of message 320 being received. In addition, if message 320 is a DMA message 342, bucket number field 338 is used to route message 320 to any of 128 buckets 117 in system memory 114. Bucket area 117 is a specific area of memory 114 reserved to receive only specially tagged messages 320. For instance, processor 108 might store receive messages 320 related to processor 108 task 1 into bucket 1, messages 320 from node 119 into bucket 2, messages 320 of length 1K to bucket 3, etc. Buckets 117, if enabled, are assigned at the discretion of processor 108 software, and the bucket concept implemented must be understood by software at both the sending and receiving nodes 100, 119. In this preferred implementation, if buckets are enabled by FIFO options register 256 (FIG. 5B), the 128 buckets 116, 117 are associated with 3 receive FIFO buffers 105 as follows: messages 320 to buckets 0 to 63 (64 buckets) are received into receive FIFO 211, messages 320 to buckets 64 to 95 (32 buckets) are received into receive FIFO 212, and messages 320 to buckets 96 to 127 (32 buckets) are received into receive FIFO 213. Buckets 116, 117 can be enabled or disabled on an individual FIFO 105 basis. When buckets are disabled by FIFO options register 256, the default is bucket 0 (all messages go to bucket 0.)

Referring further to FIG. 10, the meaning of the bits in receive control field 177 is as follows:

MC bit 15 defines whether the arriving message 320 should be received as a processor input/output (PIO) 340 or a direct memory access (DMA) operation 342 (DMA=0). A message 320 that is received by PIO is held in receive FIFO 105 until processor 108 reads message 320 directly under software control using I/O read instructions. PIO 340 commands require dedicated processor 108 support during the read of the entire message 320. DMA commands 342 require no processor 108 support during the read of the entire message 320.

MC bits 14 and 13 are used to select which receive FIFO 105 is to receive message 320 (00 or 01=FIFO 211, 10=FIFO 212, 11=FIFO 213.)

MC bits 12 to 8 for PIO commands 340 are for software use only and can be used to define commands or other options as desired.

MC bits 14 to 8 for DMA commands 342 define 128 buckets. A different bus master 130 DMA receiving program is associated with each bucket 116, 117. All buckets 116, 117 have different CDB programs 306 (FIG. 7), and are associated with a specific one of the three receive FIFO buffers 105 as defined above.

MSMU ADDRESS ASSIGNMENT

Bus master 130 reads/writes data to MSMU 124 or vice versa based on CFE bus 125 full memory window addresses having full direct addressing capability. Full memory window addressing on CFE bus 125 supports either of two modes—bursting or non-bursting. Bursting is a mode on CFE bus 125 where a single address is sent followed by multiple, sequential data transfers. Non-bursting is a mode on CFE bus 125 where an address is sent with each data word.

Processor 108 software defines the full memory address range on MC bus 126 or PCI bus 128 during initialization time to be 0400 XXXX XXXX XXXX, where 0400 selects network adapter card 101 and the X's define operations to be executed by network adapter 101. Bus master 130 will recognize PIO read and write commands 340 issued to this address range on the MC bus 126 or PCI bus 128. In turn, bus master 130 propagates the same address to CFE bus 125 address and to MSMU 124. MSMU 124 is initialized to recognize addresses on CFE bus 125 in the form 0400 XXXX XXXX XXXX.

MC or PCI processor 108 or peer-to-peer bus master 118 sends address and data across processor bus 106 to bus master 130 to command and communicate with MSMU 124. Processor 108 can transfer control and data to and from MSMU 124 directly on bus 106 via programmed I/O instructions (PIOs) 340, or indirectly via DMA 342 on the bus master channels implemented by bus master 130, 132, since bus master 130, 132 is itself a peer-to-peer bus master on processor bus 106.

Referring to FIG. 11, a 32-bit micro-channel MC address is shown. In this embodiment, all addresses to MSMU 124 end in 00, whether on MC bus 126 or PCI bus 128, because MSMU 124 will only respond to word aligned addresses. The address 350 issued over the processor bus 106 (126 or 128) is 32 bits, which in this embodiment is segmented into 3 major functions as shown below:

1. MSMU memory address space 351—a 10 bit segment defining the portion of processor I/O bus 106 addressable memory unique to MSMU 124.

2. A 3-bit OP CODE field 352 in bits 21 to 19, as follows:
   a) Operation code (OP CODE) field 352: OP CODE=100 commands a direct memory read or write operation of MSMU SRAM 112, where low-order address 354 bits 18 to 0 are used as direct address bits to permit MSMU SRAM 112 to be directly addressed by processor 108. MSMU 124 can contain a total memory 112 space of up to 512 KB; which may be subdivided into up to 6 FIFO 103 areas and other functions as shown in FIG. 5A.
   b) Six OP CODES 352 are used to permit sections of MSMU memory 112 to be addressable as up to 6 different FIFO 103 areas. Each FIFO 103 area is processor 108 software enabled and can be selectable in fixed sizes between 0 kilo bytes (KB) and 256 KB (provided all FIFO buffers 103 can be partitioned into the allotted memory space), and can contain either PIO 340 or DMA 342 messages 320. In this preferred embodiment only 4 of the 6 OP CODES are used, the other two are reserved for the selection of additional FIFO buffers 103.
   c) OP CODE 352=000 is used to read or write MSMU control registers 160.

3. Low-order address bits 354—the address segment 354 containing the 19 low-order bits is used to address MSMU memory 112 directly (word 356, with address op code=100), indicate FIFO commands (words 358, with address op code=FIFO #), or address MSMU control registers 160 (word 356, with address op code=000).

Message 320 is routed to a particular send FIFO 104 as follows. After node processor 108 has issued commands to each of the FIFO options registers 110 (see FIG. 5B) in control registers 160 to set-up the location, size, and priority of each send FIFO 104 and to enable it, processor 108 software dedicates a particular one of the send FIFO buffers 104 to communicate with a particular media. Processor 108 software routes all messages 320 to a particular send FIFO 104 based on address 352 (bits 21 to 19) sent across I/O bus 106. Address 350 on I/O bus 106 performs 3 functions: 1) direct data transfer to a particular adapter card on bus 106 (in this case, for example, to network adapter 101), 2) select which send FIFO 104 at network adapter 101 is to store and forward this message 320, and 3) define the type of operation to be performed. For FIFO 104 selection, 2 bits (20, 19) are used to define which of 3 send FIFO buffers 104 is to be selected. This is a very flexible method, which permits each message 320 to be routed to a specific FIFO 104.

Referring again to FIG. 10, message 320 is routed to a particular receive FIFO 105 as follows. After node processor 108 has issued commands to each of the FIFO options registers 110 to set-up the location, size, and priority of each receive FIFO 105 and to enable it, processor 108 software can dedicate a particular one of receive FIFO buffers 105 to receive messages 320 from a particular media. Processor 108 software in the sending node (say, 100) controls the selection of each message 320 to a particular receive FIFO 105 based on the several bits of the receive control command field 177 in message header 322. Sending node 100 constructs and attaches a message header 322 to every message 320. Thus, receiving node (say, 119) must communicate with each sending node (say, 100) prior to starting message 320 transfer, to tell sending node 100 which receive FIFO 105 has been dedicated at receiving node 119 to receive message 320 to or from a particular media. Sending node 100 then sets up software command field 330 of message header 322 appropriately, so that message 320 will be routed to the correct receive FIFO 105 for each message 320.

MULTI-FIFO CONTROLS

Referring again to FIGS. 5A and 5B, in accordance with the invention, all FIFO buffers 103 may be set-up and have their options defined completely under processor 108 software control. Each FIFO 103 is controlled through programming an associated set 110 of control registers 160. MSMU 124 implements a flexible set of FIFO options. FIFO buffers 103 are split into two types, send FIFO buffers 104 and receive FIFO buffers 105. Send FIFO buffers 104 store messages 320 to be sent to Allnode switch network 121 and 123, and receive FIFO buffers 105 store messages 320 that have been received from Allnode switch network 121 and 123. All FIFO buffers 103 are implemented in MSMU SRAM 112 space; some memory space must be dedicated to support at least one send FIFO 104 and one receive FIFO 105.

FIFO buffers 103 act as store-and-forward buffers for network messages 320. The largest message 320 size must be smaller or equal to the FIFO size, so that the complete message 320 will always fit in a FIFO 103. MSMU 124 does not support message 320 sizes that are larger than the FIFO size. MSMU 124 will send a message 320 to network 102 only after the entire message 320 has been loaded into a send FIFO 105. Once message 320 is in, say, FIFO 211, MSMU 124 guarantees that it will deliver message 320, so a processor 108 or DMA operation can move on to the next task. The feature of providing FIFO 103 storage on either side of network 102 and no storage in switches 121 and 123 themselves, enables Allnode switch networks 102 to implement automatic retry and alternate path options without involving processor 108 software. When message 320 is entirely stored in a send FIFO 104, MSMU 124 picks an alternate path and tries to send message 320 over that path. If the path is blocked or failed, MSMU 124 picks the next alternate path and retries sending message 320. Thus, FIFO 104 permits retries around blockages and failures without ever involving processor 108. MSMU 124 continuously cycles through the alternate paths of the switch network 102 until it delivers message 320 successfully.

FIFO CONTROL REGISTERS

Referring further to FIGS. 5A and 5B, MSMU 124 supports up to 3 different send FIFO buffers 104 and up to 3 different receive FIFO buffers 105. All FIFO buffers 103 are set-up and have their options defined completely under software control. Each FIFO 103 is controlled through programming the associated set 110 of nine MSMU control registers 160. The detailed bit patterns for each of the nine registers for a typical FIFO 103 (say, send FIFO 201) are shown in FIGS. 12 to 21. The following description of FIFO control registers 110 refers to the specific set for FIFO 201, which set is replicated for each of FIFO buffers 103, unless otherwise noted or apparent from context. A tenth FIFO register 259 is used for the send FIFO buffers only.

FIFO Lock Register 250

Referring to FIG. 12, FIFO lock register 250 is used to read and set the lock status of FIFO 201. The register contains two fields of one bit each: software lock 502 and hardware lock 504. Reading software lock 502 sets it to 1, and writing 1 resets it to 0. Hardware lock 504 is read only, as it only reports the status of the hardware. In general, when a FIFO has hardware lock 504 set equal to 1 it indicates the selected FIFO 103 is busy as the hardware processes a DMA command 342. Thus, reading these two bits 00 means neither software or hardware is locked, so MSMU sets the values to 10; reading 10 means software lock, MSMU leaves 10; reading 01 means hardware lock, MSMU sets 11 and issues an interrupt when the pending hardware lock is released (as status goes from 11 to 10.) After reading the previous value, software lock 502 is always set to 1.

MSMU 124 hardware locks a FIFO 103 while it is in the process of performing a DMA transfer 342 into a send FIFO 104 or out of a receive FIFO 105. Processor 108 software should not attempt to write or read PIOs 340 directly to a hardware-locked FIFO 103, or it will scramble hardware and software messages 320 and cause a malfunction.

In some cases, it is necessary for processor 108 software to lock a FIFO 103 before writing or reading the FIFO. For example, if software lock 502 is set on in FIFO 201, MSMU 124 hardware enters the STOPPED state for that FIFO 201 and will not process any further DMA commands 342 to that FIFO 201 until the software lock is removed and the STOPPED state is reset by stopped status field 558 (bit 4 of FIFO status register 251, FIG. 13) being written to a 1. Also, no other software task should write to FIFO 201 until its lock 502 is removed.

When processor 108 software reads lock register 250 for this FIFO 103, it gets the lock status. If lock field 502 or 504 (bit 30 or 31) is set, when reading, this FIFO 103 is locked and processor 108 software cannot use this FIFO 103 at this time. If processor 108 software reads 00 as the status, this specific FIFO 103 was not previously locked. MSMU 124 automatically, in response to a read of 00 status, sets field 504 (bit 31) and enters the STOPPED state. Thus, reading 00 status from lock fields 502, 504 informs processor 108 software that it has won and software-locked this FIFO 103.

Reading a hardware-locked status in bits 502, 524 of 01 in register 250, means that processor 108 software task reading the 01 status has reserved a FIFO 103 for use immediately after the active DMA operation to FIFO 103 terminates. MSMU 124 changes the status to 11. If processor 108 software reads the status again and gets 11 status, it means the DMA operation to FIFO buffers 103 is still in progress. If processor 108 software reads the status again and gets 10 status, it means the DMA operation to FIFO buffers 103 has finished, MSMU 124 has entered the STOPPED state, and processor 108 software has won and software-locked the selected FIFO 103. In addition, if the unlock interrupt (bit 547 of FIFO status register 251, FIG. 13) is enabled, MSMU 124 will issue an interrupt 115 (FIG. 4A) when the locked status changes from 11 to 10 in bits 502 and 504, respectively, of FIFO lock register 250.

Processor 108 software unlocks a software-locked FIFO 103 by writing a one to field 502 of lock register 250 or any of the other FIFO control registers 110, except bucket status registers 254, 255. FIFO 103 remains in the stopped state after a software lock is removed until a 1 is written to bit field 558 (FIG. 13), bit 4 of FIFO status register 251 to take FIFO 103 out of the stopped state.

When reading read pointer & error status register 252 (FIG. 14) of any FIFO 103, field 568, bit 31 will contain the lock status of the selected FIFO 103. However, reading the lock status fields (bits 31 in each of control registers 110) through these registers 110 will not change the lock status (bit 31).

FIFO Status Register 251

Referring to FIG. 13, FIFO status register 251 contains 30 one bit fields which report, by way of example, the major status conditions of send FIFO 201. (Some fields pertain to other FIFO buffers 103, while others only are valid in other receive FIFO buffers 105, or send FIFO buffers 104, as will be apparent from context.)

Field 506: clear software lock—read as zero=not locked, read as one=locked, and write to 1 clears software lock.

Field 508: this FIFO 103, when read as a one, has a PIO message waiting to be read by processor 108—write to 1 clears.

Field 510: this FIFO 103, when read as one, has a DMA message waiting and does not have a valid CDB to process the waiting message: write to 1 clears.

Field 511: this FIFO 103 CDB list not full status, when read as a one indicates that the CDB list status has changed from full to not full.

Field 512: this FIFO 103 bucket status A pending, when set to one.

Field 513: this FIFO 103 hardware unlocked status, when read as a one indicates that the hardware status has changed from locked to unlocked while a software lock was pending.

Field 514: this FIFO 103 bucket status B pending when set to one.

Field 516: this FIFO 103 error status—any error for this FIFO 103.

Field 518: this FIFO 103 CDB end status indicating a CDB has completed successfully: write to 1 clears.

Field 522: send FIFO 201 interrupt pending status.
Field 524: send FIFO 202 interrupt pending status.
Field 526: send FIFO 203 interrupt pending status.
528: receive FIFO 211 interrupt pending status.
Field 530: receive FIFO 212 interrupt pending status.
Field 532: receive FIFO 213 interrupt pending status.
Field 534: MSMU non-FIFO interrupt pending status.
Field 536: this FIFO 103 exactly full.
Field 538: this FIFO 103 empty.
Field 540: this FIFO 103 hardware locked status.
Field 542: this FIFO 103 CDB pointer list full.
Field 544: this FIFO 103 CDB pointer list empty.
Field 546: this FIFO 103 read parity error while reading send buffer—write to 1 clears.

Field 548: this FIFO 103 buffer empty before end of message error—write to 1 clears.

Field 550: this FIFO 103 retry count expired error—write to 1 clears.

Field 552: this FIFO 103 accept stuck at 0 error—write to 1 clears.

Field 554: this FIFO 103 accept stuck at 1 error—write to 1 clears.

Field 556: this FIFO 103 accept timeout error—write to 1 clears.

Field 558: this FIFO 103 stopped status—write to 1 clears.

Field 560: this FIFO 103 reset—write to 1 clears this FIFO.

Field 564: this FIFO 103 output enabled.
Field 566: this FIFO 103 input enabled.

Thus, FIFO status register 251 performs the following functions:

1. Reset lock status by writing a 1 (Read as 0).
2. Pending FIFO interrupt conditions.
3. Pending FIFO errors—a summary of errors—field 516 bit 25=1 when any error is detected for this FIFO 103.

4. The interrupt status of all FIFO buffers 103 and MSMU 124.
5. FIFO full or empty status.
6. FIFO pointer list full or empty status (send only).
7. FIFO DMA operation in progress indication.
8. FIFO STOPPED status—1=stopped.
9. FIFO input and output enable status.
10. Six specific FIFO error detected indications.

In addition, writing to this register 251 can cause the following functions:

1. Individual reset of any of the six specific FIFO 103 errors.
2. FIFO STOPPED reset—resets only the individual FIFO STOPPED status.
3. FIFO Reset—resets only the individual FIFO 103.

Read Pointer and Error Status Register 252

Referring to FIG. 14, read pointer and error status register 252 includes the following fields:

Field 568: this FIFO 103 software locked status—write to 1 clears (resets) software lock; read lock status without forcing the status to the software locked state.

Field 570: this FIFO 103 write control: 1 enables individual bit resets for error condition bits 572 to 590, 598 and 600; 0 enables write of pointer 596 (one of read pointer registers 252, FIG. 5C).

Field 572: this FIFO 103 invalid CDB error.

Field 574: this FIFO 103 CFE timeout error.

Field 576: this FIFO 103 DMA response timeout error.

Field 578: this FIFO 103 DMA initial message length error.

Field 580: this FIFO 103 FIFO full error: write tried to a full FIFO 103.

Field 582: this FIFO 103 CFE data parity error.

Field 584: this FIFO 103 MSMU read data parity error.

Field 586: this FIFO 103 MSMU write data parity error.

Field 588: this FIFO 103 MSMU 124 termination error.

Field 590: this FIFO 103 CDB pointer list full error: write issued to a full CDB pointer list.

Field 594: this FIFO 103 read pointer overflow.

Field 596: this FIFO read pointer: 16 bits of absolute word address defining the starting address of the next message 320 to be read, plus overflow bit 594.

Field 598: this FIFO 103 hardware locked when PIO issued.

Field 600: this FIFO 103 bus master termination error.

Write with field 570 equal to 1 will reset any error status when corresponding bit equals 1. Write with field 570 equal to 0 will only write read pointer 596. This register 252 is reset to all zeros by send FIFO 201 reset 560 (FIG. 13.) Processor 108 software stores the high order bits 17 to 12 of read pointer 596 to be equal to fixed address field 640 bits 17 to 12 when this FIFO 103 is initially being set up.

This read/write register contains 32 bits as follows:

1. Lock status 568—1 bit—reset lock status by writing a 1, read lock status without forcing the status to the software locked state.
2. Write enable 570—1 Bit—1 enables individual writes (resets) of error conditions; 0 enables write of read pointer 596.
3. Read Pointer 596—16 bits of absolute word address which defines the starting address of the next message 320 to be read, plus overflow bit
4. The 12 specific FIFO 103 error detected indication bits 572–590, 598–600 are individually resettable by writing a 1.

Write Pointer Register 253

Referring to FIG. 15, write pointer register 253 includes the following fields:

Field 602: clear software lock—write to 1 clears software lock 602.

Field 604: write pointer overflow.

Field 606: write pointer; one of write pointer registers 253 (FIG. 5C.)

This read/write register 253 contains 17 bits (18 to 2) plus 1 Lock Bit as follows:

1. Reset lock status 602 by writing a 1.
2. Write pointer 606—16 bits (17 to 2) of absolute word address which define the starting address of where the next message 320 to be written, plus overflow field 604.

Bucket Interrupt Status A Register 254

Referring to FIG. 16, bucket A status register 254 includes 32 1-bit fields 608, 610, . . . , 612, 614, which define the bucket status for the first 32 Buckets. Register fields 608–614 bits can be reset individually by writing a 1 to the individual 1-bit field being reset. A field 608–614 bit value of 1 indicates CDB complete for the corresponding bucket.

Bucket Interrupt Status B Register 255

Referring to FIG. 17, bucket interrupt status B register 255 is used only for receive FIFO 211. The register bits 616 (bits 31 . . . 0) can be reset individually by writing a 1 to the individual bit being reset.

FIFO Options Register 256

Referring to FIG. 18, FIFO options register 256 includes the following fields:

Field 618: this FIFO 103 software locked status—write to 1 clears software lock.

Field 620: enable unlocked interrupt 513 for this FIFO 103; enables interrupt 115 to be issued when this FIFO 103 is switched from the hardware locked state to being not hardware locked while software lock was pending.

Field 622: enable waiting interrupt for this FIFO 103; enables PIO message waiting status 508 or DMA message waiting status 510 of this FIFO 103 status register 251 to issue interrupt 115 when set to a one.

Field 624: enable CDB pointer list not full interrupt 511 for this FIFO 103—issued on transition from full.

Field 626: enable bucket interrupts for this FIFO 103; interrupt 115 is issued when any bit in this FIFO 103 bucket status register 254 or 255 is set to a one.

Field 628: enable error interrupt for this FIFO 103; interrupt 115 is issued for this FIFO 103 if error status bit 516 is set in this FIFO 103 status register 251.

Field 630: enable CDB end interrupt for this FIFO 103; interrupt 115 is issued for this FIFO 103 if end status bit 578 is set in this FIFO 103 status register 251.

Field 632: this FIFO 103 interrupt number—a three bit field decoded to select one of seven different interrupt lines comprising interrupts 115, or disabled.

Field 638: enable buckets for this FIFO 103—enable buckets=1; 0=default to bucket 0.

Field 640: fixed address high order bits 18–12 for this FIFO 103; location of this FIFO 103 in MSMU SRAM 112.

Field 642: output enabled for this FIFO 103—enable=1; enables this FIFO 103 to be read.

Field 644: input enabled for this FIFO 103—enable=1; enables this FIFO 103 to be written.

Field 646: this FIFO 103 size—a three bit field decoded as follows: 000=disabled; 001=4 KB; 010=8 KB; 011=16 KB; 100=32 KB; 101=64 KB; 110=128 KB; and 111=256 KB.

Field 648: this FIFO 103 operation support—a two bit field decoded as follows: 00=reserved; 01=DMA only; 10=PIO only; and 11=DMA or PIO.

Field 650: this FIFO 103 read/write priority as follows: 00=disabled; 01=high priority; 10=middle priority; and 11=low priority. FIFO buffers 103 assigned the same priority are treated round-robin.

Thus, this FIFO options register 256 is a read/write register which performs the following functions:

1. Reset lock status.
2. FIFO interrupt enable to individually enable the following interrupts: unlock interrupt, PIO message 508 waiting interrupt, DMA message 510 waiting interrupt, CDB end interrupt, bucket interrupts (2 used for receive FIFO 211), error interrupt, and CDB pointer list moving from full to not full interrupt (used only by send FIFO buffers 104).
3. FIFO interrupt number—3 bits used to assign one of 7 possible interrupts to associate with this individual FIFO 103.
4. FIFO function enable/disable bits used to individually select bucket activation, and FIFO input and output enables.
5. This FIFO 103 location in MSMU SRAM 112–7 high order fixed address (FA) bits defining the memory address range where this FIFO 103 is placed in MSMU Memory 112. The number of fixed address bits used varies depending on the size of this FIFO 103. The placement of FIFO buffers 103 in MSMU SRAM is limited such that the lowest FIFO address must be all zeroes from bit 0 up to (but not including) the least significant bit of the active fixed address bits. This means that a 256 KB FIFO 103 can only be placed in one of two possible locations in MSMU SRAM: the top half or the lower half. A 128 KB FIFO 103 can only be placed in one of four possible locations in MSMU SRAM: the top quarter, one of two middle quarters, or the lower quarter. A 64 KB FIFO can be located in one of 8 possible locations in MSMU SRAM, etc.
6. FIFO size—3 bits that enable this FIFO 103 and select the FIFO size from 7 options: 4 KB, 8 KB, 16 KB, 32 KB, 64 KB, 128 KB, and 256 KB.
7. FIFO mode options—2 bits that select from 3 operational mode options: DMA only, PIO Only, or DMA and PIO combined.
8. FIFO priority—2 bits that enable this FIFO 103 and select the FIFO priority from 3 options: HI, MID, and LO in order of descending priority. If two or three FIFO buffers 103 are assigned the same priority, those FIFO buffers will be serviced using a round-robin approach.

Read Counter Register 257

Referring to FIG. 19, read counter register 257 is a read/write register including the following fields:

Field 654: this FIFO 103 software lock—read as 0, write to 1 clears software lock.

Field 656: overflow bit for read counter 658 (one of read counter registers 257, FIG. 5C).

Field 658: read counter for this FIFO 103.

Read counter register 257 is reset to all zeros by this FIFO 103 reset 560 (FIG. 13.) When this FIFO 103 is initially set up, processor 108 software stores field 658 high order bits (bits 17 to 12 of this register 257) to be equal to fixed address field 640 bits 17 to 12 of register 256 for this FIFO 103. Overflow bit 656 is initialized to 0.

Thus, read counter register 257 performs the following functions:

1. Reset lock status by writing a 1.
2. Read Counter—16 bits (17 to 2) of absolute word address which define the next address in FIFO 103 to be read from MSMU SRAM 112, plus bit 18 (the overflow bit).

Write Counter Register 258

Referring to FIG. 20, write counter register 258 includes the following fields:

Field 660: software lock—read as zero, write to 1 clears software lock 660.

Field 662: write counter overflow bit.

Field 664: write counter for this MSMU 103; one of write counter registers 258.

Write counter register 258 is a read/write register containing 17 bits (18 to 2) plus 1 Lock Bit as follows:

1. Reset software lock status 660 by writing a 1.
2. Write counter 664—16 bits (bits 17 to 2 write counter register 258) of absolute word address which defines the next address in FIFO 103 to be written.

CDB Pointer Read/Write Counter Register (Send Only) 259

Referring to FIG. 21, CDB pointer list read/write counter register 259 includes the following fields:

Field 666: software lock—write to 1 clears software lock 660.

Field 180: CDB pointer list read counter for this send FIFO 104.

Field 182: CDB pointer list write counter for this send FIFO 104.

CDB pointer list read/write counter register 259 is a read/write register containing 14 bits (bits 24 to 18, 8 to 2) plus 1 lock bit, which is operable to:

1. Reset software lock 666 status by writing a 1.
2. Provide processor 108 read or write to CDB pointer list read counter 180. Read counter 180 is incremented every time MSMU 124 successfully completes a CDB.
3. Provide processor 108 read or write to CDB pointer list write counter 182. Write counter 182 is incremented every time processor 108 software stores a CDB pointer to a send list 720, 721, 722 for this send FIFO 104.
4. These counters are initialized by power-on-reset to all zeroes.

FIFO INITIALIZATION

Each FIFO 103 must be initialized and configured before it can be used; this includes defining FIFO size, priority, starting (fixed) address, operations, etc., and enabling the FIFO. In addition, processor 108 software must write a value to bits 17 to 11 of all counter and pointer registers, where the value must be equal to the fixed address bits 17 to 11 of the FIFO options register 256. Bits 18, and 10 to 2 are usually written to zeroes.

FIFO OPERATION

Figure 22A:
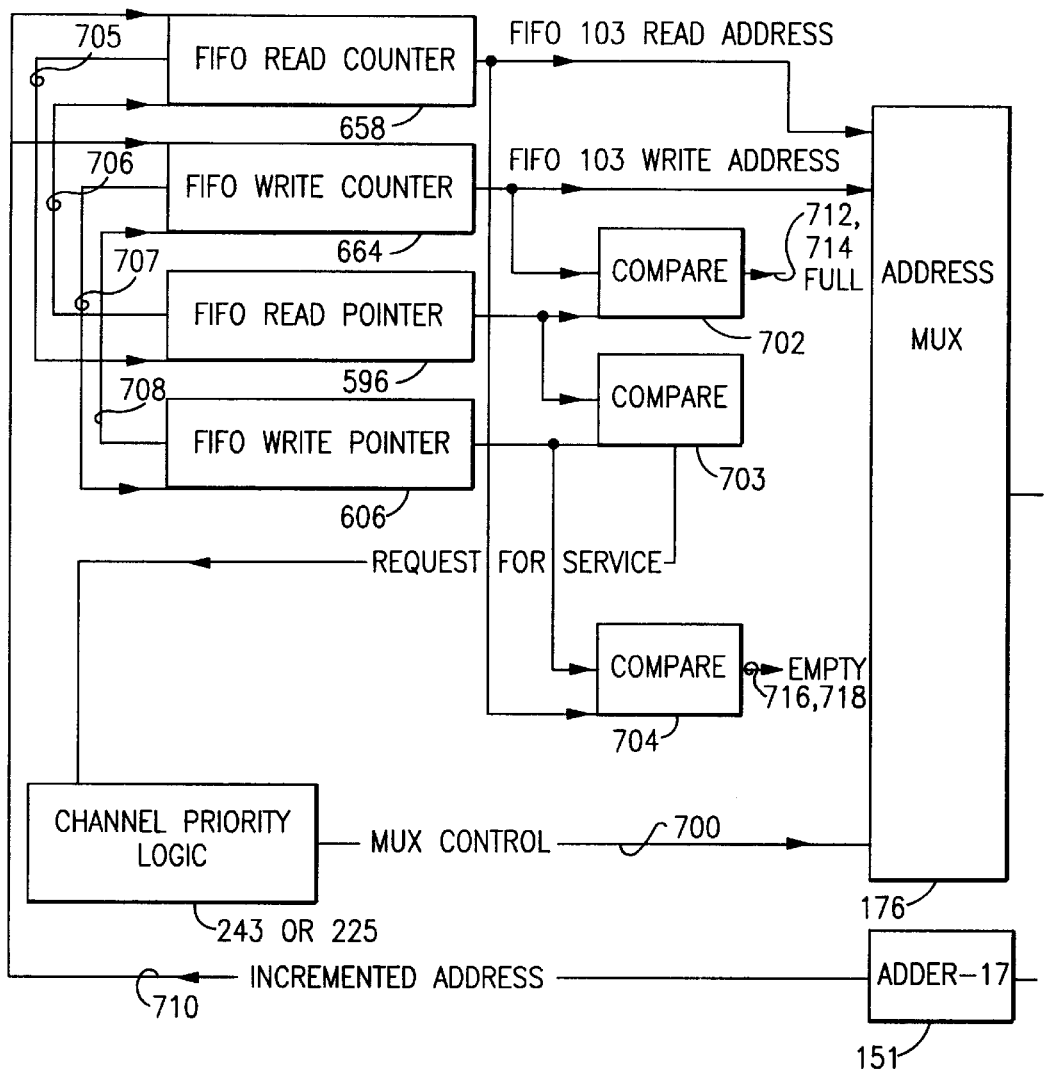
FIG. 22 is a block diagram showing the FIFO read/write controls including two counters and two pointers.
Figure 22:
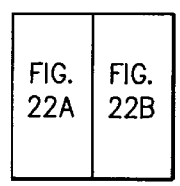
Figure 22B:
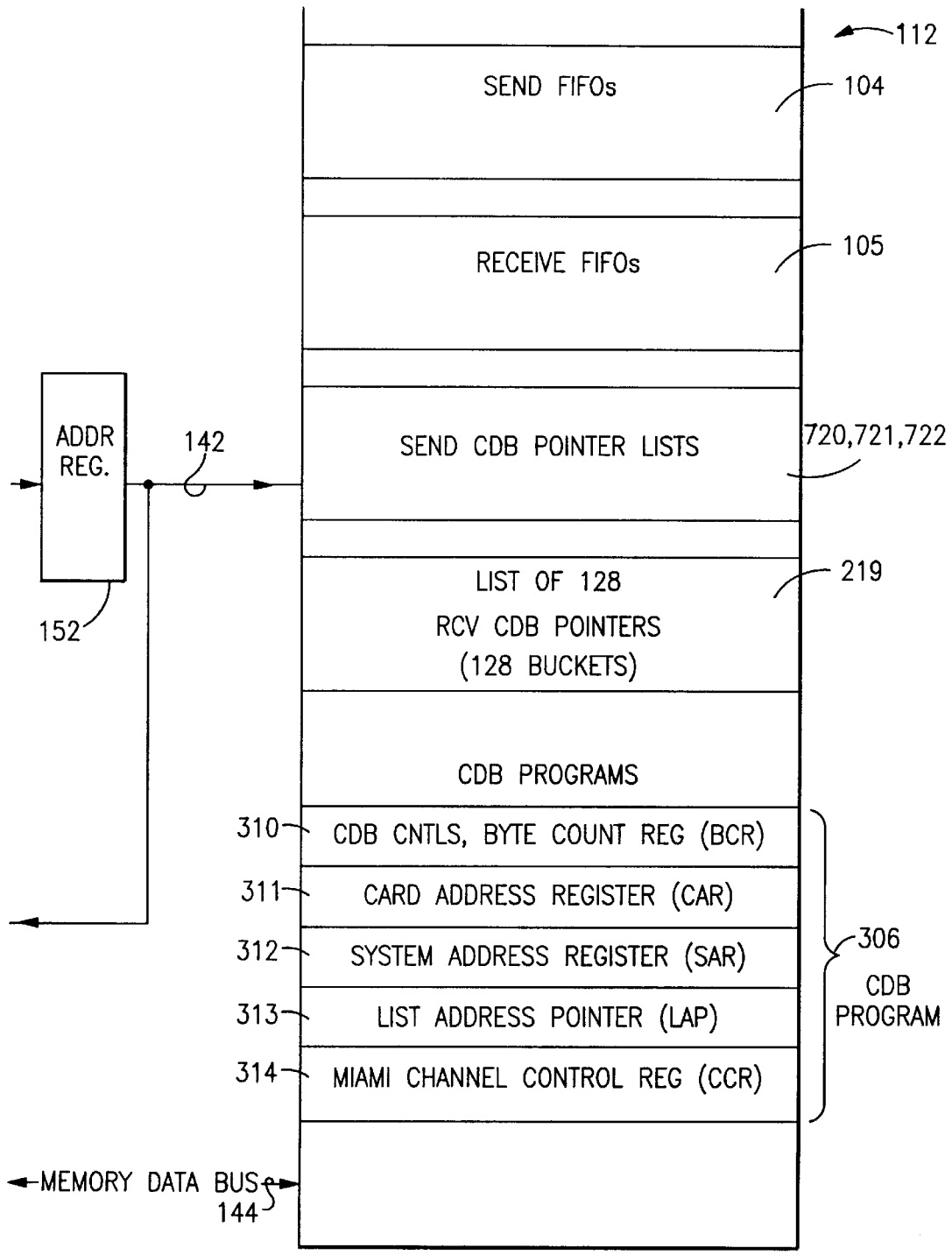

Referring to FIG. 22, the control of FIFO buffers 103 (including send FIFO buffers 104 and receive FIFO buffers 105) uses MSMU control registers 160 read counter 658 (one of read counters 174, FIGS. 4A and 19), write counter 664 (one of write counters 175, FIGS. 4A and 20), read pointer 596 (FIG. 14), and write pointer 606 (FIG. 15). Read pointer 596 is compared against write pointer 606 in comparator 703; if they are exactly equal (all bits are equal, including the overflow bit), FIFO 103 is empty. If they are not exactly equal, a message 320 resides in FIFO 103, and a request for service is generated by comparator 703 to the send 243 or receive 225 channel priority logic, the output of which is fed on line 700 to address multiplexor 176 (a line which is not shown in FIG. 4A.)

Read counter 658 and write counter 664 are used to address MSMU SRAM 112 via MUX 176, address register 152 and memory address bus 142. From address bus 142, the address is sent to MSMU SRAM 112 and to adder 151 to be incremented; then the incremented value is stored back over bus 710 into the active counter 658 or 664. Read counter 658 is active when FIFO 103 is being read, and write counter 664 is active when FIFO 103 is being written.

If a message 320 is written correctly into FIFO 103, write counter 664 is left pointing to the MSMU SRAM 112 address where the next message 320 is to start being written. The address in write counter 664 is copied into write pointer 606 over bus 707 so that both are equal for the write of next message 320, and both point to the address where the first word of the next message 320 is to be written in MSMU SRAM 112. If the write of message 320 to FIFO 103 is not successful, the address in write pointer 606 is copied into write counter 664 over bus 708. This has the effect of erasing any partial message to FIFO 103, and allows it to be retried from the beginning.

Likewise, if a message 320 is read correctly into FIFO 103, the read counter 658 is left pointing to the MSMU SRAM 112 address where the next message 320 is to start being read. The address in the read counter 658 is copied into read pointer 596 over bus 705 so that both are equal for the start of the read of the next message 320 and both point to the address from which the first word of the next message is to be read. If the read of message 320 from FIFO 103 is not successful, the address in read pointer 596 is copied into read counter 658 over bus 706. This has the effect of moving read counter 658 back to the start of the message 320 to be read from FIFO buffer 103, and allows the read of message 320 to be retried from the beginning.

FIFO counter logic generates full and empty signals in comparator blocks 702 and 704, respectively, to keep track of FIFO buffer 103 status. When all the bits of write pointer 253, 606 are equal to all the bits of read counter 257, 658 including overflow bits 604 and 656, respectively, FIFO buffer 103 is empty and empty signal 716, 718 is activated. When all bits of write counter 664 and read pointer 596 are equal, including the overflow bits, FIFO buffer 103 is full and full signal 712, 714 is generated by comparator 702.

Write counter 664 and read pointer 596 are compared in comparator 702 to generate FIFO full signal 712, 714, and read counter 658 and write pointer 606 are compared in comparator 704 to generate FIFO empty signal 716, 718, as will be further described in connection with FIGS. 31 and 32.

BUCKET OPTIONS

The terms bucket or buckets 116, 117, which reside in processor memory 114 or other adapters 118 (see FIG. 1), only have meaning in regards to FIFO buffers 103, and are used in relation to both send FIFO buffers 104 and receive FIFO buffers 105. The terms are used to distinguish individual messages 320 or groups of messages 320 from other messages 320, such that every message 320 or group of messages 320 can be assigned to an individual bucket for tracking. Each FIFO buffer 103 implemented in MSMU 124 has the capability of tracking at least 32 buckets at any given time. Send FIFO buffers 104 can track a total of 96 buckets, and receive FIFO buffers 105 can track a total of 128 buckets. MSMU memory 112 contains receive pointer list 219 (FIG. 5A comprising 128 locations each storing one receive CDB pointer associated with each receive bucket 116, 117.

MSMU DMA OPERATIONS

Referring further to FIG. 22, CDB programs 306 to bus master 130 perform either of two functions: send DMA operations or receive DMA operations. MSMU 124 supports the simultaneous execution of two CDB programs 306, one send operation being executed in conjunction with bus master 130 bus master channel 1, and one receive operation being executed in conjunction with bus master 130 bus master channel 2. In addition, MSMU 124 provides the capability to activate up to 192 send CDB programs 306 which can support CDB chaining and linking options. MSMU 124 holds multiple pending CDB programs 306 in MSMU SRAM 112 and executes them in the order defined by the selected priority. MSMU 124 also maintains 128 pointers 219 to receive CDB programs 306 (each associated with a different bucket).

Processor 108 software generates one or many CDB programs 306, and stores them to spare MSMU memory 216 in locations that have not been assigned as FIFO buffer 103 areas or used for other functions. CDB program 306 comprises the 5 words 310–314 shown in FIGS. 7 and 22. Just writing a CDB program 306 to MSMU SRAM 112 does not cause it to be executed. Each CDB program 306 remains dormant until activated. Every CDB program 306 once stored to MSMU SRAM 112 remains there until removed or written over. MSMU 124 never modifies CDB programs 306, so it is possible, if desired, to activate the same CDB program 306 many times. Send and receive CDB programs 306 are activated differently.

SEND DMA OPERATIONS

MSMU 124 implements a broad scope of operations, being able to receive incoming messages 320 from processor 108, either by DMA 342 or by PIO 340 to be sent to network 102. FIFO operational mode option field 648, bits 3 and 2 in send FIFO options registers 256 (FIGS. 5B and 18) enable the associated send FIFO 104 to receive messages 320 from processor 108 in DMA mode only, PIO mode only, or the inter-mixing of both modes.

Referring to FIG. 23A, a send CDB pointer 218 (one of pointers in lists 218) is used for all send operations, except when receiving a message 320 sent by PIO 340 into a send FIFO buffer 104. Processor 108 software can activate 0 to 64 send CDB programs 306 (FIG. 7) at a time for each of the three send FIFO buffers 104. More specifically, processor 108 software activates a send CDB channel program 306 by writing a send CDB pointer 218 to one of 3 send pointer lists 218 (see FIG. 5A) in MSMU spare memory area 216—one list associated with each send FIFO buffer 104. Send CDB pointer 218 (FIG. 23A) contains the starting address 682 of a prestored CDB program 306 plus other controls for enabling DMA (bit field 672), enabling a general interrupt (bit field 674) or a bucket interrupt (bit field 676) at the completion of the execution of the associated CDB program. Also, bit field 678 relates the CDB program to a specific bucket number.

Referring to FIG. 23B, the contents of register 178 of MSMU control registers 160 are shown, which processor 108 software uses to assign a fixed address 686 in MSMU SRAM 112 defining where in MSMU spare memory 216 (FIG. 5A) the three send pointer lists 218 are located.

Referring to FIG. 24, MSMU 124 hardware maintains a 64-word circular buffer 720, 721, 722 that contains the pending send CDB pointer list 218 (FIG. 5A) for the associated send FIFO buffer 104. Each circular buffer 720, 721, 722 is controlled by the two 6-bit counters shown in FIG. 21: a read counter CDB pointer list read counter 180 and a CDB pointer list write counter 182. These counters 180, 182 are readable by processor 108 as send CDB list counter register 259 (FIG. 5B), one of the MSMU control registers 160 (FIG. 4A). Counters 180, 182 are initialized to all zeroes, so that when the first send CDB pointer 218 is written to list 218 at location 00, write counter 182 (see also FIG. 21, bits 02–08) is incremented to 01. Read counter 180 (see also FIG. 21, bits 18–24) remains at 00 until the CDB program 306 pointed to by the send CDB pointer 218 has been completely executed. Read and write pointers 180, 658 and 182, 664 being unequal informs MSMU 124 hardware that a request for service (see FIG. 22) is pending at priority logic 342 (list 218 is not empty) for a particular send FIFO buffer 104, and cause MSMU 124 to select one send CDB pointer 218 to be processed next, when no previous send operation is active.

Referring further to FIG. 24, a block diagram of pointer lists 218 and send input priority logic 243 used to activate send CDB programs 306, is shown. Three circular buffers 218 (720, 721, and 722), are provided in MSMU memory 112, each containing a list of send CDB pointers pointing to CDB programs 306 that have been activated for execution. This means that processor 108 can activate up to 192 list entries and have them held pending in the order determined by their storage to lists 720, 721, 722, with each list processed on a first-in, first-out basis. One of the three FIFO lists, say 720, is selected for the processing of one CDB program 306, words 310–314. The selection is made based on the priority assigned to the associated FIFO buffer 104. The priority is assigned by send FIFO options registers 256 (FIGS. 5B, 18) to be either high, low or middle depending upon the value stored in priority field 650, bits 0 and 1 of send FIFO options registers 256. If two or three send FIFO buffers 104 are assigned the same priority, they will execute CDBs in round-robin fashion, if they all have pending entries in their lists 720, 721 and 722. Send input priority logic 243 determines which lists 720, 721, 722 have requests for service and selects from the candidates the highest priority FIFO buffer 104 or the round-robin FIFO buffer 104 to be serviced next. Send input priority logic 243 gates the address pointing to the next CDB pointer 218 to be executed onto memory address bus 142 through address register 152 by selecting MUX 176 to present a concatenated address comprised of register 178 to locate lists 720, 721, 722 and CDB pointer list read counter 180 (FIG. 4A) to define which of the up to 64 entries in the selected list 218 is to be executed next. As a result, send CDB pointer 218 is accessed from MSMU SRAM 112, and placed in SMAR register 170 (FIGS. 4A and 24) from bus 144. The path from memory data bus 144 to SMAR 170 is as follows: bus 144 to SMRR 247 (and send channel 244), to MUXes 189, 190, to OR gate 193, to output register 192, to CFE bus 125 to SMAR 170 (and MWR 156, MEMWR 148 and back to memory data bus 144). Thus the CDB pointer is output from MSMU 124 on bus 125 and wraps back into MSMU 124 and SMAR 170. Next send operation controls 245 are activated and cause SMAR 170 to be gated through MUX 176 to address register 152 to memory address bus 142 to MSMU 112. This uses address 682, bits 18 to 5 of the send CDB pointer 218 (FIG. 23A) to find the beginning of CDB program 306 in memory 112. MSMU 124 then accesses and executes the selected CDB program 306. Only one send CDB program 306 is executed at a time. When it completes, the next priority is selected and the operation repeats until all the send CDB lists 218 are empty.

Send CDB Locator Address

Referring further to FIGS. 23 and 24, three send CDB pointer lists 218 are located in a block of 192 consecutive memory locations in MSMU memory 112. The block location is programmable and placed at the MSMU memory locations defined by send CDB locator address field 686 in register 178. Send CDB locator address 686 defines a block of 256 memory locations of which the 64 low-order locations are not used, and available for other software uses.

Activating Send CDB Programs 306

A send CDB program 306 which has been previously stored to MSMU SRAM 112, is activated by placing a send CDB pointer 218 (FIG. 23A) in one of the three circular send lists 218 in MSMU SRAM 112. Processor 108 software writes send CDB pointers 218 to the appropriate list by issuing a PIO command 340 directly to MSMU SRAM 112 to an address it has defined to be the send CDB locator address 178 (one of MSMU control registers 160—FIG. 23B), and setting bits 9 and 8 to select the desired send FIFO list 720, 721, 722 (FIG. 24). Send messages 320 within lists 218 are kept in order at all times. No ordering is supported between different lists, where send priority is used instead. Bits 9 and 8 of send locator address 178 are used to select which list 218 is selected: 720, 721, or 722. When processor 108 is writing to list 218, it must define bits 8 and 9 to select the proper list 720, 721, or 722. In register 178 bits 8 and 9 are don't care bits—because when being concatenated to read list 218 (as shown in FIG. 24), send priority logic 243 defines bits 8 and 9 to select the proper list 720, 721, 722 to be read based on the outcome of the priority selection.

Processing of Send Messages 320

If a send FIFO buffer 104 is enabled and has room, a CDB program 306 can be executed to add a message 320 to the associated FIFO buffer 104. Send input priority logic 243 determines which lists 720–722 have active entries (which is signified by a request for service) and selects from the candidates. The next send CDB pointer 218 is read from the activated CDB list 218 for that FIFO buffer 104, and is used to point to the next send CDB 306 to be executed.

MSMU 124 begins to process a new send CDB program 306 as follows:

1. Send logic operation control 245 of FIGS. 4A and 24 arbitrates for the use of CFE bus 125, and wins the bus before proceeding.

2. MSMU 124 locates and fetches the send CDB pointer 218 to point to the CDB program 306 to be executed. MSMU 124 locates the send CDB pointer 218 by forming a 19-bit address in address register 152 to MSMU SRAM 112 as follows:

a) Bits 18 to 10—9 bits of the address come from the send CDB locator address 178 stored in MSMU Control Register 160.

b) Bits 09 and 08 select the circular list 720–722 associated with a given send FIFO buffer 104. MSMU 124 forces these bits to 01 (bits 9, 8) if it is processing send FIFO buffer 201, 10 for send FIFO buffer 202, and 11 for send FIFO buffer 203.

c) Bits 7 to 2: 6 bits from circular list read counter 180 (bits 24–18) are used to define the top of the list. Read counter 180 uses only 6 bits (7 to 2) for forming the address. Bit 8 is the overflow bit.

d) Bits 1 and 0: the low order two bits are always forced to 0 to perform word-aligned accesses.

3. The low 22 data bits (21 to 0) of send CDB pointer 218 after being fetched are loaded to send memory address register (SMAR) 170 in MSMU 124 (FIG. 4A and 24.) From this point MSMU 124 uses SMAR 170 to provide the address to fetch the first CDB word 306, then SMAR 170 is incremented by 1 and used to fetch the second CDB word 306, etc. In addition, MSMU 124 loads the high order bits (31 to 22) of send CDB pointer 218 into CDB control register 222 (FIG. 4A), and holds them active throughout the entire processing for control purposes.

4. CDB program 306 is loaded to bus master 130. MSMU 124 using SMAR 170, accesses CDB words 306 in order, starting with byte count register (BCR) word 310. MSMU 124 loads CDB 306 control bits of BCR word 310 (bits 31 to 20) into CDB byte counter 242 (FIG. 4A) and decrements them throughout the entire processing for control purposes. MSMU 124 remains as master on CFE bus 125 and sends BCR word 310 and the other four CDB words 311–314 to bus master 130 through register 154, over bus 188, through MUXes 189, 190 and OR gate 193 to register 192 and CFE bus 125 (FIG. 4A). This starts bus master 130, because of bit 0 (start bit) being set in CCR word 314. MSMU 124 send logic 243 can now pause and wait for bus master 130 to execute the commanded DMA 324 transfer.

5. Bus master 130 transfers DMA data 324 as a master on CFE bus 125 with MSMU 124 being the slave. When bus master 130 is ready to write a message 320 to MSMU 124, as it is executing the present send CDB 306, bus master 130 arbitrates for CFE bus 125 by raising its master request interface signal (a control line in CFE bus 125). MSMU 124 normally is the CFE bus 125 arbiter, and will respond to bus master 130 with the master acknowledge (ACK) signal (a control line in CFE bus 125) when bus master 130 can use the bus 130. Bus master 130 then issues a CFE bus 125 write sequence by placing the contents of CAR register 311, as an address, on CFE bus 125, and issuing the NADS signal 300 (FIGS. 6A, 6B) to MSMU 124 to start the transfer, while at the same time indicating a write operation on CFE bus 125. MSMU 124 receives the address to SMAR 170 and uses it to store to the designated MSMU SRAM 112 locations, usually one of the three send FIFO buffers 104. MSMU 124 increments send FIFO write counter 258 (FIG. 20) after storing each data word to MSMU SRAM 112. This continues, usually over several or many bus ownership periods, until bus master 130 expires the command byte count in BCR 310.

6. When bus master 130 issues a termination interrupt over four control lines (INT3–0) in CFE bus 125 to MSMU 124 for bus master (BM) Channel 1, MSMU 124 responds by reading the BMSTAT1 register 371 (FIG. 25) in bus master 130 to get the interrupt status. The reading of the status also resets the bus master interrupt lines in CFE bus 125. If the status is 0 in bit field 685 and 1 in bit field 687 (normal end), the status indicates that bus master 130 has completed the operation successfully. MSMU 124 moves the send FIFO write pointer 253 to be equal to send FIFO write counter 258, thus officially adding the new message 320 to the active send FIFO 104.

7. If Bit 29 is set in the active send CDB pointer 218, 236 (FIGS. 22 and 4A) indicating that an interrupt should be issued to processor 108 after CDB 306 has completed successfully, MSMU 124 will issue the interrupt defined by bit fields in the associated send FIFO options register 256 (FIG. 18.) Two interrupt options are available, the general CDB end interrupt or the bucket end interrupt. The general CDB end interrupt is enabled on an individual FIFO buffer 104 basis by setting bit 630 (send enable CDB end interrupt) to 1 in send FIFO options register 256. If more detailed bucket information is required by processor 108 software, the bucket end interrupt is used. The bucket end interrupt is enabled on an individual FIFO buffer 104 basis by setting bit 626 (send enable bucket interrupt) in send FIFO options register 256. Up to 32 different bucket end interrupts can be set based on bucket 364 selected by bit field 678 in the send CDB pointer 218 (FIG. 22). The latest bucket interrupt status is held in bucket status registers 254, where each bucket has one associated status bit 608, 610–612, 614. Once set, a bucket status bit will remain set until reset by processor 108 software. On receiving a bucket interrupt 115, processor 108 software can read the MSMU 124 bucket interrupt status control register 254 associated with the interrupt to determine which buckets have pending interrupts. Writes to MSMU bucket status registers 254 can be used to individually reset a bucket interrupt.

8. MSMU 124 then checks if there are requests for service in the send CDB pointer lists 218 to be processed. When there are, MSMU 124 returns to the first step and processes the highest priority pending send operation.

Send Buckets

For send FIFO buffers 104, the bucket 116, 117 assignment only has meaning to sending processor 108. It is a way to track individual messages 320. Processor, for example, 108, can preload and activate up to 192 (64 associated with each send FIFO buffer 104) different CDB programs 306 at MSMU 124. MSMU 124 will execute these in serial and in order of priority. If processor 108 just enables CDB 306 interrupt function, it will get interrupted at the completion of each CDB program 306. If buckets are enabled through register 256 (bit field 638, FIG. 18) and only certain processor tasks wish to track when certain CDB programs 306 are complete, processor 108 should use the bucket concept and assign bucket numbers (BN) to CDB 306 programs via send CDB pointer 218, bit fields 678 and 676 (FIG. 23A). Then only marked CDB programs 306, where register 218 bit field 676 is a one will give interrupts 115, and reading bucket status register 254 will tell processor 108 which buckets 116 have completed a CDB program 306. Processor 108 software can track up to 96 send buckets 116 simultaneously. If the send buckets are not enabled (register 256, bit field 638), but register 256 bit field 30 is enabled, the CDB end interrupt that lumps all CDB end interrupts together under a single interrupt 115 function can be used if register 218 bit field 674 is a one.

RECEIVE DMA OPERATIONS

Referring to FIGS. 26–28, processor 108 software can activate 0, 1, or multiple CDB programs 306 for any of 128 receive buckets 116. MSMU memory 112 contains receive pointer list 219 (see also FIG. 5A) comprising 128 locations specifically dedicated to storing one receive CDB pointer 219 associated with each receive bucket 116. A DMA 342 message 320 stored in any of receive FIFO buffers 105 (including buffers 211, 212 and 213) will point to its specific receive CDB pointer 219, which is used to access CDB program 306 for that bucket 116. Receive CDB pointer 219 contains the starting address 698 of a prestored CDB program 306 plus other controls as discussed hereafter.

Referring to FIG. 26, receive CDB pointer 219 is identical to send CDB pointer 218, except that receive CDB pointer 219 contains an additional bit in bucket status number field 694 (bit 27), which is used to define up to 128 receive buckets 116. Thus, receive CDB pointer 219 also includes enable DMA field 688, CDB end interrupt 690, and bucket end interrupt 692.

Processor 108 software loads receive CDB programs 306 to MSMU SRAM 112 and activates each program 306 individually (one per bucket 116, 117) by writing a receive CDB pointer 219 to one of the 128 pre-assigned locations in the list of RCV CDB pointers 219 in MSMU memory 112. The same locations 219 are used to deactivate receive buckets 116, 117 if zeroes are stored in bit field 688 of the receive CDB pointers 219. All 128 receive pointers 219 should be initialized with bit field 688 equal to zero (0) to indicate that there are no valid CDB programs 306 associated with each receive bucket 116, 117. After processor 108 software generates and stores a CDB program 306 for a receive bucket 116, 117, it can then write a new receive CDB pointer 219 to list 219 for that bucket 116, 117 with bit field 688=1, indicating that receive CDB pointer 219 now points to a valid CDB program 306.

Receive CDB Locator Address

Referring to FIGS. 5A and 27, the 128 pre-assigned locations 219 in MSMU memory 112 containing receive CDB pointers 219 are located in a block of 128 consecutive memory locations. The block location is programmable and defined by the receive CDB locator address 179 (FIGS. 4A, 5B and 27, an MSMU control register 160 register.) Processor 108 software writes receive CDB pointers 219 to the appropriate MSMU SRAM 112 location by issuing a PIO 340 in the direct write to MSMU SRAM mode, setting bits 21 to 19 in the PIO address to 100 (FIG. 11), and writing directly to MSMU memory 112.

Receive CDB pointers 219 only have meaning in regards to DMA operations. MSMU 124 implements a broad scope of operations, being able to receive incoming messages 320 to be sent to processor 108 either by DMA 342 or PIO 340, whichever is specified in receive command field 177 of Allnode message header 322 (FIG. 9). When receiving messages 320 in PIO mode 340, receive CDB pointers 219 are not used to receive message 320.

Initial Processing of Receive Messages 320

If a receive FIFO buffer 105 is enabled and has room, an incoming message 320 will be received into the receive FIFO buffer 105 specified by receive control field 177 in the Allnode message header 322 Word 1 (FIG. 9). Bit field 648 in receive FIFO buffer 105 option registers 256 do not come into play until after message 320 is received. Thus, even a DMA message 342 will be accepted into a receive FIFO buffer 105 set up to be PIO Only, or a PIO message 340 will be accepted into a receive FIFO buffer 105 set up to be DMA Only.

After message 320 is received and validly stored into the designated receive FIFO buffer 105, that FIFO buffer 105 becomes not empty and generates a request for service as shown in FIG. 22. Referring to FIG. 28, MSMU 124 then begins its initial processing of message 320. The first step is to snoop the Allnode Header Word 1 322 (FIG. 9) of the received message 320 to examine the receive control field 177 shown in FIGS. 9 and 10. First, bit 15 is examined to see the type of operation specified: 0=DMA 342, or 1=PIO 340. If the operation is a PIO 340, the snoop processing stops and the PIO waiting status (bit field 508 in status register 251, FIG. 13) is set, and interrupt 115 is used if enabled by bit field 622 in FIFO buffer 105 options register 256. This status is held until message 320 is read and cleared by processor 108 software; this prevents any reprocessing of the same message 320. After this message 320 is cleared, MSMU 124 performs the initial processing steps on the next message 320 in receive FIFO buffer 105, if it is still not empty. If the operation defined by receive control field 177 (bit 15=0) is a DMA 342, the initial snoop step sets the appropriate RCV DMA pending latch (770, 772, or 774) in FIG. 28, based on bit 15 inverted through inverter 757 to gates 760, 762, and 764 which select one of the RCV FIFO buffers 105—the one presently being serviced. The snoop FIFO signals to AND gates 760, 762 and 764 for each FIFO 211, 212, and 213 are mutually exclusive and rotate in a round-robin manner— each snoop FIFO signal being active every third cycle time. MSMU 124 addresses MSMU SRAM 112 to fetch and snoop the first header word 322. The address of the first header word 322 comes from the FIFO read counter 174, which locates the beginning of message 320. When snooping during the initial processing steps, the FIFO read counter 174 is inhibited from incrementing after fetching header word 1. Thus, after the snoop operation, FIFO read counter 174 still point to header word 1 of message 320. Latches 770, 772, and 774 of FIFO buffer 105 prevent any reprocessing of the same message 320. Latches 770, 772, 774 stay set until MSMU 124 hardware processes and clears that message 320 from FIFO buffer 105. Then, MSMU 124 performs the initial processing steps on the next message 320 in FIFO buffer 105, if it is still not empty.

MSMU Processing of Receive Messages 320

Referring further to FIG. 28, all receive DMA messages 320 require the execution of a CDB program 306, words 310 through 314. MSMU 124 controls the priority of when a CDB program 306 gets executed. MSMU receive logic 225 implements these controls. By the time a message 320 is received, processor 108 software should have preloaded CDB programs 306 for each active receive bucket 116, 117 and loaded receive CDB pointers 219 to point to where in MSMU SRAM 112 CDB programs 306 are located. MSMU 124 hardware processes one receive CDB 306 and one send CDB 306 at a time.

Step 1: When there are no previous receive CDB programs 306 being processed, and receive DMA pending latches 770, 772, 774 are set, MSMU 124 begins to process a new receive message 320 as follows:

First, receive priority logic 225 determines which receive FIFO buffers 211, 212, 213 have pending operations, and selects the one to be processed next. The selection is based on the priority assigned to the associated FIFO buffers 105. The priority is assigned by the receive FIFO options register 256 (FIGS. 5B, 5C and 18) to be either HI, LO, or MID depending upon the value stored to bits 0 and 1 of register 256. If two or three receive FIFO buffers 105 are assigned the same priority, they will execute CDBs in round-robin fashion, if they all have pending operations. The highest priority FIFO buffer 105 or the round-robin FIFO buffer 105 to be serviced next is selected.

Second, MSMU receive operation controls 220 (FIG. 4A) reads both Allnode message header 322 words from the selected receive FIFO buffers 211, 212, or 213 and stores them in BM RCV channel 232 registers 226 and 228 (FIG. 4A), respectively, where they are held throughout the processing of the receive message 320 for control purposes, and for diagnostic purposes to indicate what header 322 was last processed by MSMU 124. In addition, RCV control field 177 from header 322 is stored to register 177 as shown in FIG. 28. FIFO read counters 174 are used to fetch header words 322 from MSMU SRAM 112. In this case FIFO read counters 174 are incremented after each word read from MSMU SRAM 112, and continue to sequence through the entire message 320.

Third, MSMU 124 locates and fetches the CDB program 306 to be executed to receive the next message 320 residing in the selected receive FIFO buffer 105. MSMU 124 uses 7 bits of the value in the receive command field 177 (the FIFO buffer number and bucket number bits 338 as shown in FIG. 11) to concatenate with a base value in receive CDB locator address register 179 (FIGS. 5B and 27), to form the address 724 in MSMU SRAM 112 where receive CDB pointer 219 is located. The exact composition of the 19-bit address 724 to point to the receive CDB pointer is shown in FIG. 29, as follows:

a) Base address bits 18 to 9: these 10 bits of the address come from the receive locator address 179 stored in MSMU control register 160.

b) Bits 8 to 2: 7 bucket number bits from Allnode header receive control field 177, Bits 14 to 8, respectively.

c) Bits 1 and 0: The low order two bits are always forced to 0 to perform word-aligned accesses.

MSMU 124 accesses receive CDB pointer 219 for the active receive bucket 116 from MSMU memory 112, and checks that DMA field 688 (bit 31) is set to validate receive CDB pointer 219. If not set, a CDB program 306 for that bucket 116 is not enabled, and MSMU 124 issues a DMA message waiting interrupt to processor 108 by setting bit 510 of FIFO status register 251 as shown in FIG. 13.

Step 2: If a valid CDB Program 306 exists, receive CDB pointer 219 is fetched and loaded to receive memory address register (RMAR) 172 (FIGS. 4 and 28) and to BM RCV channel 232 CDB control register 222 in MSMU 124. From this point MSMU 124 uses RMAR 172 to provide the address to fetch the first CDB word 310, then RMAR 172 is incremented by 1 and used to fetch the second CDB word 311, etc.

Step 3: MSMU 124 as master on CFE bus 125 loads CDB 306 to bus master 130. MSMU 124, using RMAR 172, accesses CDB 306 words 310–314 in order, starting with byte count register (BCR) word 310. MSMU 124 loads CDB 310 control bits of BCR word 310 (bits 31 to 20) into BM RCV channel register 224, and holds them active throughout the entire processing for control purposes. In addition, bits 19 to 0 of CDB word 310 are loaded to BM RCV channel 232 register 230 (FIG. 4A.) Before sending BCR word 310 to bus master 130, MSMU 124 compares in comparator 229 (FIG. 4A) the BCR count in register 230 verses the Allnode header count field in BM RCV channel register 228, and sends the smaller of the two values to bus master 130 as the BCR count. This is necessary because the preloaded CDB Program 306 cannot always determine accurately the size of message 320 to be received. This selection of the smaller count field allows only the correct message 320 size to be transferred. If the Allnode header count 334 is larger than the BCR count, a receive message 320 doesn't fit error is set in bit fields 572–590 of MSMU control register 252 (FIG. 14). The error bit field 572–590 being set generates an interrupt 115 to processor 108 software.

Step 4: MSMU 124 remains as master on CFE bus 125 and sends the other four CDB words 311 to 314 to bus master 130 straight from MSMU memory 112, and keeps a local copy of CDB word 313 in LAP register 221. This starts bus master 130, because of Bit 0 (receive start bit) being set in bus master channel control register (CCR) word in bus master 130. MSMU 124 receive operations controls 220 (FIG. 4A) pauses and waits for bus master 130 to execute the commanded DMA transfer.

Step 5: Referring to FIGS. 6A and 6B, bus master 130 transfers DMA data as a master on CFE bus 125 with MSMU 124 being the slave. When bus master 130 is ready to read a received message 320 from MSMU 124, as it is executing the present receive CDB 306, bus master 130 will arbitrate for CFE bus 125 by raising its master request interface signal (a control line in CFE bus 125). MSMU 124 normally is the CFE bus 125 arbiter, and will respond to bus master 130 with the master acknowledge (ACK) signal (a control line in CFE bus 125) when bus master 130 can use bus 125. Bus master 130 then issues a CFE bus read sequence, by placing the contents of the card address register (CAR) register 311 as a address, on CFE bus 125, and issuing NADS signal 300 to MSMU 124 to start the transfer, while at the same time indicating a read operation on CFE bus 125. MSMU 124 receives the CAR address and uses it to access the designated MSMU receive FIFO buffer 105. This continues usually over several or many bus ownership periods, until bus master 130 expires the command byte count in its byte count register (BCR) 310.

Step 6: When bus master 130 issues a termination interrupt over four control lines (INT3–0) in CFE bus 125 for BM Channel 2, MSMU 124 reads the BMSTAT2 register 371 (FIG. 25) in bus master 130 to get the interrupt status. The reading of the status also resets the bus master interrupt. If the error end status 685 is zero and normal end status 687 is one, the status indicates that bus master 130 has completed the operation successfully. MSMU 124 moves receive FIFO read pointer 596 to be equal to the receive FIFO read counter 658 (FIG. 22), thus clearing received message 320 from FIFO buffer 105. This leaves both read pointer 596 and read counter 658 pointing to the first word of the next message 320.

Step 7: If bit field 690 or 692 is set in the active RCV CDB pointer 219 as stored in BM RCV channel control register 222 (FIG. 4A), it indicates that an interrupt 115 should be issued to processor 108 after CDB 306 has completed successfully. MSMU 124 will issue the interrupt defined by field 632 (bits 23 to 21) in the associated receive FIFO options register 256. Two interrupt options are available, the CDB end interrupt or the bucket end interrupt. The CDB end interrupt is selected by bit field 690 (FIG. 26) and enabled on an individual receive FIFO buffer 105 basis by setting enable CDB end interrupt field 630 (bit 24) to 1 in the receive FIFO options register 256 (FIG. 18). If more detailed bucket information is required by processor 108 software, the bucket end interrupt is used. The bucket end interrupt is selected by bit field 692 (FIG. 26) and enabled on an individual FIFO buffer 105 basis by setting receive enable bucket interrupt field 626 (bit 27) in receive FIFO options register 256. Up to 64 (32 for receive FIFO buffers 212 and 213, and 64 for receive FIFO buffer 211) different bucket end interrupts can be set based on the bucket selected by Bit 27 to 22 in the active receive CDB pointer 219 (FIG. 26) as stored in BM RCV channel control register 222 (FIG. 4A.) The latest bucket interrupt status is held in MSMU register 254 (FIG. 16) with each bit indicating the status of one of the 32 buckets. In addition, register bucket status register 255 (FIG. 17) holds the status for the additional 32 buckets associated with receive FIFO buffer 211, where each bucket 116, 117 has one associated status bit. Once set, a bucket status bit 608–616 (FIGS. 16 and 17) will remain set until reset by processor 108 software. On receiving a bucket interrupt 115, processor 108 software can read the MSMU bucket status registers 254 and/or 255 associated with the interrupt 115 to determine which buckets 116, 117 have interrupts pending. Writes to the MSMU bucket status register 254 and 255 can be used to individually reset a bucket interrupt 115.

Step 8: At the completion of the execution of a CDB program 306 associated with a specific bucket 116, 117, receive pointer lists 219 (FIG. 28) contains a receive CDB pointer 219 for bucket 116, 117 that has just been executed and is not obsolete. BM receive channel 232 (FIG. 28) replaces pointer 219 to the executed CDB program 306 with a new CDB pointer 219. Replacement of pointer 219 comes from the list address pointer (LAP 313 in register 221, FIG. 4A), which is part of the BM receive channel 232. The LAP was stored to register 221 early in the process of receiving message 320, when MSMU 124 sent the CDB program to bus master 130 (step 4). The LAP is held in register 221 until the CDB program 306 completes successfully. Then the LAP is taken from register 221 by BM RCV channel 232 and stored into the list of RCV CDB pointers 219 in MSMU SRAM 112 as shown in FIG. 28. BM receive channel 232 forms the address of where to store register 221 into MSMU SRAM 112 in the same manner as described in step 4, above. This automatic replacement of a completed CDB pointer 219 is executed completely by MSMU 124 without requiring help from bus master 130. The replacement is controlled by a hardware state machine 728 in BM RCV channel 232.

Processor 108 must determine in advance what happens when each CDB program 306 completes successfully. What happens next is controlled by the value programmed by processor 108 to LAP 313 in the present CDB program 306. LAP 313 has the exact same format as the RCV CDB pointer 219 shown in FIG. 26. If the software preprograms bit field 688 in LAP 313 to 0, this defines an invalid RCV CDB pointer 219 after the execution of the present CDB program 306 and after the LAP 313 is stored to MSMU SRAM 112 to be the next RCV CDB pointer 219 for the active bucket 116, 117. When the next message 320 arrives to that bucket 116, 117, the MSMU 124 will not use a CDB program 306 to receive the message, but instead sets bit field 570 in FIFO buffer 105 status register 251 and issues interrupt 115 to inform processor 108 that a DMA message is waiting.

If the software pre-programs a valid RCV CDB pointer 219 in LAP 313 of a successfully completed CDB program 306, the state machine 728 storing of LAP 313 to list 219 will re-arm the active bucket 116, such that when the next DMA message 320 arrives to that bucket 116, 117, BM RCV channel will execute the CDB program 306 pointed to by the new RCV CDB pointer 219.

MSMU 124 then returns to step 1 and looks for the highest priority DMA message 320 to be received next.

Receive Buckets

For messages 320 being received from network 102 into MSMU 124, buckets 116, 117 only have meaning in regards to DMA operations and the associated receive control field 177 in message header 322 word 1 (FIGS. 9–11), is used to indicate the bucket number 694 (FIG. 26) of message 320 being received. MSMU 124 receive operation controls 220 can route the received message 320 to any of 128 different memory areas (buckets 116, 117) depending on the bucket number 177 assigned. Processor 108 software sending message 320 must pre-assign the bucket 116 that is to receive message 320. Buckets 116, if enabled, are assigned totally at the discretion of processor 108 software, and the bucket concept must be understood by both the sending, say 108, and receiving, say 119, node software. If the system does not wish to implement receive buckets, the concept can be disabled, individually by FIFO buffer 105 using bit field 638 of FIFO options register 256, and the default is that the receiving logic in MSMU 124 will force all messages 320 to be received into 4 different buckets 116 based on bits 14 and 13 of the receive control field 177 in Allnode header 322 Word 1. The default is bucket 0 if receive control field 177 bits 14 and 13 are both zero, bucket 32 if receive control field 177 bits 14 and 13=01, bucket 64 if receive control field 177 bits 14 and 13=10, and bucket 96 if command field bits 14 and 13 are both ones.

Bucket Assignment

At the discretion of processor 108 software, buckets 116 offer several possibilities as follows:

1. A different bucket 116 number might be assigned to each processor 108 task.
2. A different bucket 116 number might be assigned to each set of processor 108 communications; for instance, a different Bucket 116 might be set up for processor node 100 to receive messages 320 from each different processor node 108, 119, etc.
3. A different bucket 116 number might be assigned to each message 320 of a different length.
4. Other options are possible, and not prohibited.

FURTHER CDB DETAILS

Starting bus master 130 (BM) channels

Figure 30:
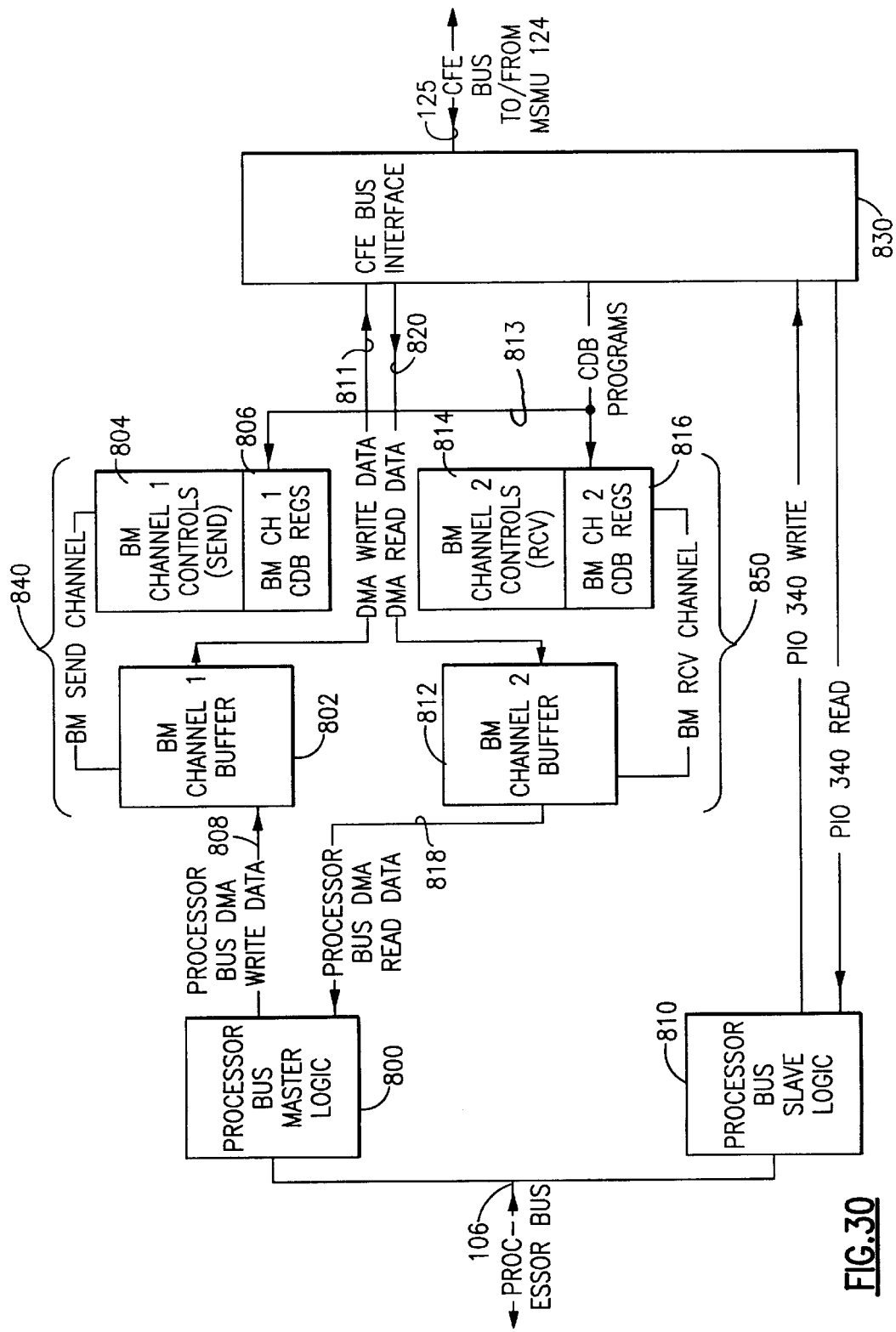
FIG. 30 is a block diagram for the bus master chip data flow.

Referring to FIG. 30, bus master 130 data flow is set forth. Bus master 130 includes processor bus master logic 800 and processor bus slave logic 810. Bus master 800 loads DMA write data on bus 808 to bus master channel 1 buffer 802, and thence to bus interface 830 on bus 811, and receives DMA read data on bus 818 from bus master channel 2 buffer 812, which was loaded thereto from read data bus 820. Slave logic 810 interfaces processor bus 106 and CFE bus interface 830 to CFE bus 125 for PIO read and write operations. Processor bus master logic 800 interfaces send channel 840 and receive channel 850 to/from bus interface 830 from/to processor bus 106, using buffers 802 and 812, and controls 804 and 814.

As noted, bus master 130 contains two bus master channels, channel 840 assigned to send messages and channel 850 assigned to read messages. Bus master channels 840 and 850 are only active when commanded to execute a CDB program 306. Bus master 130 BM channels 840 and 850 are each controlled by separate CDB programs 306 that must be loaded from MSMU SRAM 112 to the bus master CDB registers 806 for send and 816 for RCV, as is represented by line 813. MSMU 124 is in total control of loading and starting bus master 130 bus master channels. To do this, MSMU 124 becomes a master on CFE bus 125 and loads all five CDB 306 registers 806 or 816 in bus master 130 (the loading order is not relevant in this case, except CCR 314 must be last). MSMU 124 sends CCR 314 to bus master 130 last; this word should have bit 0 set to a 1. This will start the corresponding bus master 130 bus master channel processing the newly stored CDB program 306, as soon as CCR bit 0 is set to one.

Stopping the Bus Master (BM) Channels

Bus master 130 will stop after it has completed a CDB 306 successfully, or if it detects an error during its execution. Bus master 130 will issue an interrupt on CFE bus 125 to MSMU 124 to inform it that bus master 130 has completed CDB 306. If bus master 130 detects an error, it will also issue an interrupt to MSMU 124. In either case, MSMU 124 learns that bus master 130 has completed its work. In addition, when MSMU 124 completes the send CDB operation successfully, it advances to the idle state to wait for the next CDB program 306 to be executed.

CDB Card Address Register (CAR) 311 Address Definition

Referring further to FIG. 30 in connection with FIG. 7, CAR word 311 in CDB program 306 is used by bus master 130 as the starting address in MSMU 124 from which to start a transfer on CFE bus 125. Thus, it should specify the full MSMU 124 address including the correct high order bits—or MSMU 124 will not respond to the address. Bits 21–19 of CAR address 311 equal to 000 are used to specify that the DMA is to be stored to the MSMU control registers 160 or, if 100, direct MSMU memory 112. If neither of these patterns (000 or 100) are used, MSMU 124 assumes DMA message 320 is to be stored or read from FIFO buffers 103.

One Message 320 per One CDB Policy

The basic rule implemented by MSMU 124 is that there should be one CDB 306 used for each message 320 being sent or read from FIFO buffers 103. Normally, MSMU 124 when storing to or reading from FIFO buffers 103 will use the word count field 334 in the Allnode header 322 to determine message 320 size.

Use of Spare Memory Locations in MSMU SRAM 112

Spare memory 216 includes memory space for:

1. Send CDB programs 306—No hardware limit except for the size and apportionment of SRAM 112.
2. Receive CDB programs 306—No hardware limit except for the size and apportionment of SRAM 112.
3. 192 send CDB pointers 218–192 SRAM 112 words.
4. 128 receive CDB pointers 219–128 SRAM 112 words.

ADDRESS CONTROL OF OP CODE SELECTION

Referring again to FIG. 11, three different MSMU 124 operations are selected by the address issued on CFE bus 125 to MSMU 124. The three MSMU operations, FIFO buffers 103, Direct Memory Read/Write, or MSMU control registers 160, are selected by the OP CODE bits (21 to 19). Any of these three MSMU operations support both read and write options.

OP code bits (21 to 19) have the following meaning:

1. 000: MSMU control registers 160 read and write (or load).
2. 001: Write—write to send FIFO buffer 104 or read from FIFO buffer 105. FIFO buffer 103 addressing comes from write counter 258 for writes and read counter 257 for reads. OP codes 101–111 are reserved for adding more FIFO buffers 103. Address Bits 18 to 00 in address 350, when containing a special code of all zeroes, will cause MSMU 124 hardware to start a new message 320, and to automatically set the selected FIFO buffer 103 write counter (WC) 258 (FIG. 20) equal to the FIFO buffer 103 write pointer (WP) 253 (FIG. 15). When starting a new message 320, MSMU 124 also checks that no previous PIO write message 340 is in progress. If it is, an error will be detected. After a successful write of data to a FIFO buffer 104, MSMU 124 hardware will set WP 253 equal to WC 258 automatically. MSMU 124 knows when a write to a FIFO buffer 104 is completed by counting each word stored to FIFO buffer 104 based on the Allnode header 2 word count 334.
3. 100: Direct read/write of MSMU SRAM 112, directly using bit field 354 of address 350 in FIG. 11.

SEND FIFO 104 OPERATIONS

Figure 31:
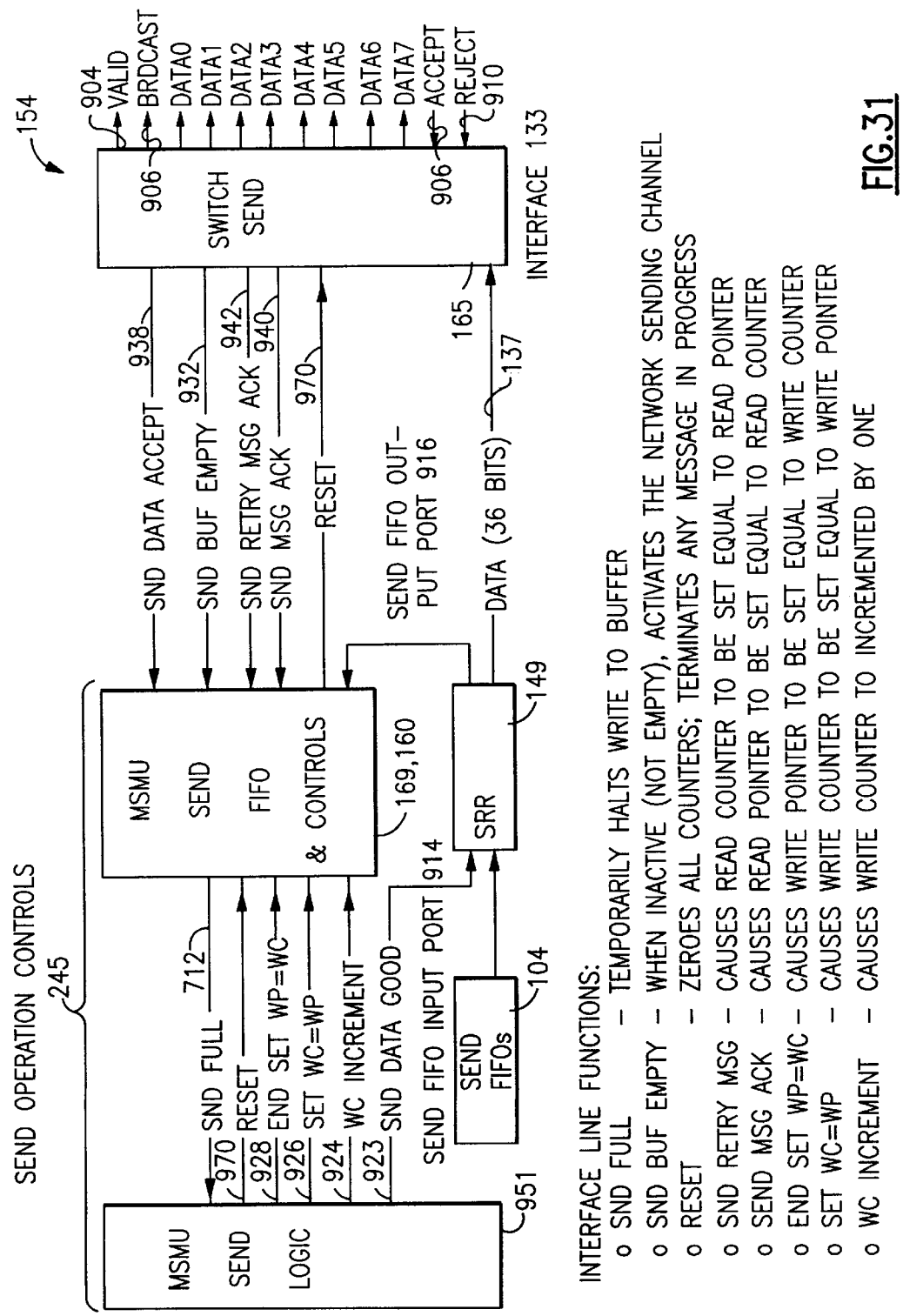
FIG. 31 is a block diagram of a typical send FIFO interface.

Referring to FIGS. 31 and 32, the 12 signal lines in each unidirectional switch port, input port 131 and output port 133, are the same for each, as follows:

DATA0 through DATA7: eight parallel signals used to command switch connections and transmit data messages. DATA 0 is the MSB.

VALID 904: when active, valid signal 904 indicates that a message is in the process of being transmitted. When VALID 904 and BRDCAST 906 are both inactive, it indicates a RESET command and causes the associated switch input port 131, 133 to reset to the IDLE state. VALID 904 going inactive before end of message while BRDCAST 906 is active commands a PAUSE in the data transfer and a resynchronization of the asynchronous data recovery logic at receiver 138. VALID 904 going inactive after end of message indicates the sender has ended the present transfer.

BRDCAST 906: when active indicates that switch interface connection 131, 133, generated by sending adapter at interface 133 and received by the receiving adapter at interface 131 are both held active during a PAUSE operation.

REJECT 910: a negative active signal which indicates that a blocked path in switch 121, 123 (FIG. 2) has been detected during path set-up or that the receiving node (100 or 119) has rejected the data transmission.

ACCEPT 908: a positive active signal which is in the active (high) state when idle. Receiving node (119 or 100) drives ACCEPT 908 low after starting to receive a valid data transmission and drives it high at the end of the data transmission as a positive indication that it has received the data successfully.

Send FIFO buffers 104 receive messages 320 from CFE bus 125, and store them temporarily in FIFO buffers 104 until they are forwarded to switch network 102, 121 and 123.

Send FIFO Buffer Write

Referring further to FIG. 31, MSMU 124 send logic 951 (which is part of send operation controls 245 in FIG. 4A) writes 36-bit words including parity from CFE bus 125 to send FIFO buffer 104 via registers MWR 156 and MEMWR 148 as shown in FIG. 4A. Send FIFO buffer write functions as follows:

1. Write operations to send FIFO buffers 104 are controlled by two MSMU control registers 160: write pointer 253 and write counter 258. Reset 970 initializes both write pointer 253 and write counter 258 to all zeroes. As MSMU 124 send logic 951 stores each data word into a FIFO buffer 104, say FIFO buffer 201, the corresponding write counter 258 is used to address FIFO buffer 201 and point to that FIFO buffer 201 location in MSMU SRAM 112 to be written.
2. After the write of the data word is performed, write counter 258 is incremented by WC increment signal 924, and then points to the next sequential location in FIFO buffer 201. This write and increment process continues for each word of message 320 as it is written to FIFO buffer 201. Before every DMA 342 transfer to write to FIFO buffer 104, MSMU send logic 245 makes sure the write counter 258 value and write pointer 253 value are equal by issuing SET WC=WP 926. They both then point to the tail (bottom) of FIFO buffer 201.
3. MSMU send logic 245, after checking and storing a valid message 320 to FIFO buffer 201, for example, activates the END SET WP=WC signal 928 to FIFO buffer 201. This causes write pointer 253 to be set equal to write counter 258, thus adding message 320 written to FIFO buffer 201 as a valid entry. Write pointer 253 always points one location past where the last valid message 320 ended and defines the tail (bottom) of FIFO buffer 201; thus, write pointer 253 points to the location where the next valid message 320 can start to be written.
4. If MSMU send logic 245 detects an error while writing a message 320 to FIFO buffer 201, it erases the erroneous message or partial message from FIFO buffer 201, by enabling SET WC=WP signal 926 to FIFO buffer 201. This causes write counter 258 to be set equal to write pointer 253, thus deleting the erroneous message 320 from FIFO buffer 201.
5. FIFO control logic 160, 169 generates full 712 and empty 716 signals based on the values in the read and write counters 658, 664 and pointers 596, 607 as previously shown in FIG. 22. The logic shown in FIG. 22 is a sub-function of and included in block 160, 169. When all the bits of write counter 258, 664, except the high order bit, are equal to all the bits of read pointer 252, 596, except the overflow bits 662 (FIG. 20) and 594 (FIG. 14) are opposite in value, FIFO buffer 201 is full and SND FULL signal 712 is activated until the condition subsides. As long as the full condition exists, MSMU send logic 245 is prevented from executing further writes to FIFO buffer 201.

Send FIFO 104 Read

Referring further to FIG. 31, message data 320 is read as data from send FIFO buffer 104 to SRR register 149 over buss 144. SND DATA GOOD signal 923 loads the data from buss 144 into SRR register 149. From SRR register 149, the data is sent to switch network 102, 121 and 123. The details of the read operation are as follows:

1. 32-bit words plus parity are read to SRR register 149 and bus 934 from a selected send FIFO buffer 104, for example FIFO buffer 201, and formatted by MSMU network sending channel 165 into byte-wide data on interface 133 to be sent to network 102. Odd byte parity is checked, but not transmitted to network 102. MSMU network sending channel 165 indicates that data has been read from send FIFO buffer 201 by activating SND DATA ACCEPT signal 938 to FIFO buffer 201.

2. Read operations to FIFO buffer 201 are controlled by two MSMU control registers 160: read pointer 252 and read counter 257. Reset 970 initializes read counter 257 and read pointer 252 to all zeroes.

3. The MSMU network sending channel 165 reads data from FIFO buffer 201 from the location pointed to by the read counter 257. After the read of the data word is performed, read counter 257 is incremented by the fall of SND DATA ACCEPT signal 938. Read counter 257 then points to the next sequential location in FIFO buffer 201. This read and increment process continues for each word of message 320 as it is read from FIFO buffer 201.

4. MSMU network sending channel 165, after sending the entire valid message 320 to network 102, activates SND MSG ACK signal 940 to FIFO buffer 201. This causes read pointer 252 to be set equal to read counter 257. Read pointer 252 always points to the next valid message 320 to be processed and defines the head (top) of FIFO buffer 201.

5. If MSMU network sending channel 165 detects an error or message 320 is rejected by Allnode network 102, 121, 123, it can roll back and retry message 320, by issuing SND RETRY MSG signal 942 to FIFO buffer 201. This causes read counter 257 to be set equal to read pointer 252, such that the beginning of the same message 320 is pointed to as the next message 320 to be sent to network 102 by read counter 257.

6. FIFO counter logic as shown in FIG. 22 generates full and empty signals in blocks 702 and 704, respectively, to keep track of FIFO buffer 103 status. When all the bits of write pointer 253 (FIG. 15) are equal to all the bits of read counter 257, including overflow bits 604 and 656, respectively, FIFO buffer 201 is empty and SND BUF EMPTY signal 716 is activated until the condition subsides. As long as the empty condition exists, MSMU network sending channel 165 is prevented from reading data from FIFO buffer 201.

Disabling Send FIFO Buffers 104

Send FIFO buffer 104 input 914 and output 916 ports are disabled by the following conditions:

1. When reset 970 is issued, normally during power-on.

2. Send FIFO buffer options register 256 bit field 646 being zeroes, indicating that a size has not been assigned to the corresponding FIFO buffer 104.

3. Send FIFO options registers 256 bit field 650 being zeroes, indicating that a priority has not been assigned to the corresponding FIFO buffer 104.

Send FIFO 104 Input Disabling

If messages 320 are present in any of send FIFO buffers 104 when any disable condition occurs, except for reset 970, any messages 320 previously stored to any of send FIFO buffers 104 will remain in FIFO buffers 104, and they will be sent to network 102 as long as the send messages 320 to network 102 over send FIFO output port 916 are not disabled. Any partial message 320 written to a send FIFO buffer 104 when its input becomes disabled will cause the partial message 320 to be erased from that FIFO buffer 104.

It is possible for send FIFO buffer 104 input on send FIFO input port 914 to be disabled separately from the send FIFO output 916. The additional condition that disables only send FIFO buffer 104 input is: send FIFO options register 256, SND FIFO input enable signal (bit field 644, FIG. 18) being zero (0).

Send FIFO Buffer 104 Output Disabling

MSMU network sending channel 165 will not send or process any messages 320 from a send FIFO buffer 104 that is disabled or empty. The additional conditions that disable only send FIFO buffer 104 output are: send FIFO options registers 256 SND FIFO output enable (bit field 642, FIG. 18) being 0.

RECEIVE FIFO BUFFER 105 OPERATIONS

Referring again to FIG. 32, receive FIFO buffers 105 receive messages 320 from switch network 102, which are stored temporarily in receive FIFO buffers 105 until they are forwarded to CFE bus 125.

Receive FIFO Buffer 105 Write

Message 320 as received from switch network 102 is the only data to be written to receive FIFO buffers 105. The details of the write operation are as follows:

1. The data received from network 102 into MSMU network receiving channel 166 is formed into 32-bit words on bus 955 and written into a selected receive FIFO buffer 105, say 211. Odd byte parity is added as the word is being stored. MSMU network receiving channel 166 indicates that data is ready to be stored to receive FIFO buffer 211 by activating RCV DATA VALID signal 946 to FIFO buffer, say 211, via SWR register 161 and MEMWR register 148 over bus 144.

2. Write operations to FIFO buffer 211 are controlled by two MSMU control registers 160: write pointer 253 and write counter 258. Reset 970 initializes both write pointer 253 and write counter 258 to all zeroes. As MSMU network receiving channel 166 presents each data word on bus 955 to be written into FIFO buffer 211, write counter 258 is used to address FIFO buffer 211 and point to the FIFO buffer 211 location to be written next. After the write of the data word is performed, write counter 258 increments with the fall of the RCV DATA VALID signal 946 and then points to the next sequential location in FIFO buffer 211. This write and increment process continues for each word of message 320 as it is written to FIFO buffer 211.

3. MSMU network receiving channel 166, after receiving, storing, and checking a valid message 320 over network 102 activates RCV END OF MSG signal 948 to FIFO buffer 211. This causes write pointer 253 to be set equal to write counter 258. Write pointer 253 always points one location past where the last valid message 320 ended and defines the tail (bottom) of FIFO buffer 211; i.e., write pointer 253 points to the location where the next valid message 320 can start to be written.

4. If MSMU network receiving channel 166 detects an error it can cancel a partial or erroneous message 320, by issuing RCV CANCEL MSG signal 952 to FIFO buffer 211. This causes write counter 258 to be set equal to write pointer 253, such that when the next message 320 arrives, it will be written over the cancelled message 320.

5. Referring to FIG. 22, FIFO counter logic 160 generates full and empty signals to keep track of FIFO buffer 211 status. When all the bits of write counter 258, except the overflow bits 662 and 594, respectively, are equal to all the bits of read pointer 252, except the overflow bits 604 and 656, respectively, are opposite in value, FIFO buffer 211 is full and RCV BUF FULL signal 714 is activated until the condition subsides. As long as the full condition exists, MSMU network receiving channel 166 is prevented from executing further writes to FIFO buffer 211. The full condition causes any message 320 in progress over network 102 to be rejected and the RCV CANCEL MSG signal 952 to be issued to erase partial message 320 from FIFO buffer 211 by setting write counter 258 (FIG. 20) equal to write pointer 253 (FIG. 15).

Receive FIFO Buffer 105 Read

Referring further to FIG. 32, MSMU receive logic 950 controls the reading of 36-bit words including parity over bus 144 from a receive FIFO buffer 105 and processes them by sending them to CFE bus 125. Receive FIFO buffer 105 read functions are as follows:

1. Read operations to a receive FIFO buffer 105, for example FIFO 211, are controlled by two MSMU control registers 160: read pointer 252 and read counter 257. Reset 970 initializes both read pointer 252 and read counter 257 to all zeroes. Before every FIFO buffer 211 read operation, MSMU receive logic always makes sure read counter 257 value and read pointer 252 value are equal by issuing a SET RC=RP 962 signal to FIFO buffer 211. This causes read counter 257 to be set equal to read pointer 252, and to point to the head (top) of FIFO buffer 211.

2. MSMU receive logic 950 reads data from FIFO buffer 211 from the location pointed to by read counter 257. After the read of the data word is performed, read counter 257 is incremented by a signal on line 963. Read counter 257 then points to the next sequential location in FIFO buffer 211. This read and increment process continues for each word of message 320 as it is read from FIFO buffer 211.

3. The MSMU receive logic 950, after reading, checking, and processing a valid message 320 activates END SET RP=RC signal 958 to FIFO buffer 211. This causes read pointer 252 to be set equal to read counter 257, thus erasing message 320 just read from FIFO buffer 211. Read pointer 252 always points to the next valid message 320 to be read and defines the head (top) of FIFO buffer 211.

4. If MSMU receive logic 950 detects an error while processing a receive message 320 from FIFO buffer 211, it leaves the erroneous message 320 in FIFO buffer 211 by activating the SET RC=RP signal 962 to FIFO buffer 211. This causes read counter 257 to be set equal to read pointer 252, and thus rolls back read counter 257 to also point to the head of the erroneous message 320 again.

5. Referring to FIG. 22, FIFO counter logic generates full signal 714 and empty signal 718 to keep track of FIFO buffer 211 status. When all the bits of read counter 257 are equal to all the bits of write pointer 253 including the overflow bits 656 and 604, respectively, FIFO buffer 211 is empty and RCV EMPTY signal 718 is activated until the condition subsides. As long as the empty condition exists, MSMU receive logic 950 is prevented from reading valid data from FIFO buffer 211. Any attempt from MC bus 126 or PCI bus 128 to read empty FIFO buffer 211 by a PIO 340 operation will be responded to with all zeroes data words.

Disabling Receive FIFO Buffers 105

RCV FIFO buffer 105 input and output ports 964, 966 are disabled by the following conditions:

1. When reset 970 is issued normally during power-on.

2. Receive FIFO options registers 256, bit field 646 being zeroes, indicating that a size has not been assigned to FIFO buffer 211.

3. Receive FIFO options registers 256, bit field 650 being zeroes, indicating that a priority has not been assigned to FIFO buffer 211.

Receive FIFO buffer 105 Input Disabling

Any message 320 being received from network 102 and specifying that it is to be received into a FIFO buffer 105 that is disabled, full, or becomes full, will be rejected 910 over network 102. It is possible for receive FIFO buffer 211, for example, input to be disabled separately from the receive FIFO buffer 211 output 964. The additional condition that disables only receive FIFO buffer 211 input 966 is: receive FIFO options register 256 receive FIFO input enable bit field 644 (FIG. 18) being 0.

Receive FIFO buffer 105 Output Disabling

MSMU receive logic 950 will not receive or process any messages 320 from a receive FIFO buffer 105 that is disabled or empty. The additional condition that disables only receive FIFO buffer 105 output is: receive FIFO options registers 256 receive FIFO output enable signal bit field 642 (FIG. 18) being 0.

FIFO COUNTER OVERFLOW

Referring to FIG. 4, FIFO counters 174, 175 (same as counters 658, 664 in FIG. 22, with bit fields shown as counters 304, 258 in FIGS. 19 and 20) are used to address MSMU SRAM 112 when performing FIFO operations; all read and write counters are 18 bits. The low-order 17 bits are used to define FIFO buffers 103 up to 256 KB in size. Bit 18 is always the overflow bit and used to distinguish whether a FIFO buffer 103 is full when write counter 258 and read pointer 252 low-order 17 bits are equal, or empty when read counter 257 and write pointer 253 low order 17 bits are equal. If the bit 18's are equal, related FIFO buffer 103 is empty; if the bit 18's are opposite, the FIFO buffer is full. Overflow occurs at the point where a FIFO buffer 103 wraps back from its highest memory address value to its lowest memory address value; counters 174, 175 (or 658, 664, or 257, 258) change the state of bit 18 each time they wrap.

SOFTWARE DESCRIPTION

The above described hardware is flexibly designed to meet a wide variety of possible uses; it is well-suited for multiple protocol applications and especially for the demanding area of multimedia serving applications.

By this invention, messages that are associated with a media that is real time, high speed, or high priority are stored in private FIFOs, which can by-pass and not be bogged down by traffic to other media. The software controls to which send and receive FIFO each individual message is assigned. The send FIFO selection is made by either the I/O bus addresses used by the software to send data to the network adapter or the DMA programs used by the network adapter to fetch data to be sent to the network. The receive FIFO is selected on an individual message basis by the command field in the message header.

In order to exploit the hardware features of the invention heretofor described, a suitable high level protocol is supported by a device driver that also provides access to a private, high throughput protocol. High level data communications protocols such as NETBIOS or TCP/IP are quite adequate for control programs that manage a multimedia service application. Under the IBM OS/2 operating system, for example, a network device interface specification (NDIS) driver is developed that gives immediate access to high level protocols (NETBIOS, TCP/IP, and IEEE 802.2). In one preferred embodiment of the invention, the NDIS driver component accesses a single FIFO on the bus master. All NDIS message traffic passes through this FIFO (either under PIO or DMA control). A priority is then selected for this FIFO. Standard LAN applications and protocols are thus enabled to utilize switches at this given priority level.

Dependent upon the specifics of the application, a private protocol is negotiated with the multimedia application developers. This may range from something as simple as a pair of ping-pong application buffers for message transfer, to more exotic peer-to-peer protocols between the network adapters and other custom adapters, such as an ATM network. This private protocol is accessed either via DosDEV-IOCtl calls (from an OS/2 application, for example) or via a Ring 0 (kernel) interface between the Allnode device driver and a peer device driver. This message traffic is assigned to a different FIFO on the network adapter than the high level protocol component and is given a higher priority. This results in a pair of available communication paths: a low priority interface with standard programming support, and a custom, high priority channel that provides the necessary bandwidth. The system control messages travel via the former, the system data (e.g., multimedia video) over the latter.

The multiple FIFO buffer 103 method and priority control logic 160 of the present invention is the key means for supporting the different types of message 320 traffic, both send and receive, that comprise a multimedia server system.

In such a system there can be many different types of traffic, including the following four:

1. Large, lower priority multimedia data messages 320.
2. Small, high priority multimedia control messages 320.
3. Medium sized, high priority messages 320 associated with high-level protocols such as TCP/IP.
4. Small, high priority messages 320 that the device drivers on the various nodes use for coordination of activities.

In a distributed multimedia server design, the dominant message flow is usually composed of small control messages 320 from a data consumer to a data provider which, in turn, responds with a large video (or audio) data block 320 back to the data consumer. Even at 25 megabytes per second a large piece of video data (64 KB or more) will take nearly 3 milliseconds to transmit. Under heavy server load conditions, with possible contention (blocking) in the switch 121, 123 fabric as well, it is important that large message 320 blocks do not impede the small, higher priority control messages 320 that should be sent and received expeditiously.

The previously described hardware 100 and the following software design maximize use of network 102 device for high performance multimedia serving applications and the various type of message 320 traffic it may employ.

Software Exploitation

In this preferred embodiment of the invention, the multiple FIFO buffer design is exploited to maximum advantage as follows:

1. A convention is established, a priori, and followed by all nodes 100, 119 on network 102, regarding which type of data moves through which FIFO buffers 103. In accordance with this convention, a priority is assigned to each FIFO buffer 103 during initialization. Also during initialization, the relative size and placement of FIFO buffers 103 in the available on-card adapter memory (SRAM) 112 is established.

2. The priority message 320 convention, and FIFO buffer 103 assignments to message 320 traffic types, leads to certain run-time considerations as well discussed hereafter.

Establishment of Protocol Conventions

Adapter 101 has three FIFO buffers for each direction, send and receive; there are six FIFO buffers 103 altogether.

Receive DMA operations are further subdivided into "buckets" which are equivalent to logical channels of operation. There are 128 buckets 116, 117 available, limited by a seven bit field 177 in a message header 322 present in all messages 320 sent on network 102. Each message 320 is thus directed to a bucket 116, 117 at the receiving node 100 or 119, as the case may be, according to the bucket number 177 placed in message header 322 by the sender. Bucket number 177 is used at the receiving node 100 or 119 to look up a DMA program 306 to be executed for that message 320, thereby directing it to a given location in physical system memory 114 of the receiving node 100 or 119. A side effect of the bucket methodology is that it results in message 320 being placed into a specific receive FIFO buffer 105 on the receiving node as follows:

Buckets    Receive FIFO
    Buffer Number
0 through 63
    211
64 through 95
    212
96 through 127
    213

Logical channels or buckets 116, 117 are useful for a specific thread of operation or a single video stream. Thus, the convention is established to make as many buckets 116, 117 available for large messages 320 as possible while retaining a separate FIFO buffer 105 for high-priority traffic. This results in placing large, lower priority data in FIFO buffers 211 and 212, making 96 total buckets available for use. High priority traffic is given its own FIFO buffer 213 and a total of 32 available data buckets 116, 117.

Though the bucket concept does not apply to the send FIFO buffer 104 side (buckets only distinguish the receive FIFO buffer 105 target and receive DMA operation), data traffic is assigned in a similar fashion. Large, outbound message 320 traffic uses send FIFO buffers 201 and 202 while smaller, high-priority messages 320 are granted exclusive use of send FIFO buffer 203.

FIFO Assignments: The data types are segregated into the various receive and send FIFO buffers 103 as follows:

1. Large Multimedia Data Messages 320: large blocks of multimedia data are always received into receive FIFO buffers 211 and 212 and sent via send FIFO buffers 201 and 202.

2. Small multimedia command messages 320: small, higher priority command messages 320 are always received into receive FIFO buffer 213 and are sent via send FIFO buffer 203.

3. High-level protocol messages 320: higher level protocol messages 320 (e.g. TCP/IP data packets) are always received into receive FIFO buffer 213 and sent via send FIFO buffer 203.

4. Low-level driver control message 320: small, usually high-priority command messages 320 among the various nodes are always received into receive FIFO buffer 213 and sent via send FIFO buffer 203.

Bucket Assignments: given the FIFO buffer assignments above, the buckets available for receive DMA programs are as follows:

1. Large multimedia data messages 320: large blocks of multimedia data can be received by DMA programs associated with buckets 116, 117, numbers 0 through 95.

2. Small multimedia command messages 320: small, higher-priority command messages 320 are assigned to bucket 116, 117, number 97.

3. High-level protocol messages 320: higher-level protocol messages 320 (e.g. TCP/IP data packets) are assigned to bucket 116, 117, number 127.

4. Low-level driver control message 320: small, usually high-priority command messages 320 among the various nodes are assigned to bucket 116, 117, number 96.

Initialization

Initialization of network adapter 101 includes programming of the FIFO option registers 256 to assign a number of operational parameters to each specific FIFO buffer 103. For the purposes of this embodiment of the invention, only the physical placement, size, and priority need be considered.

1. FIFO Buffer 103 Setup

Referring to FIG. 5A, each FIFO buffer 103 may be given a size of from 0 KB to 256 KB. There are 512 KB of SRAM 112 available on adapter 101 and some must be reserved as spare memory 216 for the DMA programs themselves and receive bucket lists 219. The device driver implementation for this embodiment of the invention uses an SRAM 112 layout as follows:

a) Receive FIFO buffers 105: Since receive FIFO buffer 211 has twice as many buckets (by hardware design) as any other receive FIFO buffer 105, it is made twice as large as the rest of the receive FIFO buffers. FIFO buffer 211 is thus assigned to be 128 KB in size with FIFO buffers 212 and 213 each assigned to be 64 KB in size. FIFO buffers 211 and 212 are assigned equal priority (medium), and the higher priority traffic in FIFO buffer 213 is assigned the highest priority (high).

b) Send FIFO buffers 104: All send FIFO buffers 104 are assigned the same size, 64 KB. Send FIFO buffers 201 and 202 are given medium priority with FIFO buffer 203 assigned high priority.

2. SRAM 112 Layout

Spare SRAM area 216 is configured at offset 0 in adapter memory 112—a convenient choice for using a structure template in order to access any data element contained in it (principally CDB programs 306).

The conventions above result in a memory map for the adapter SRAM that appears as in the diagram below.

| Address | | Size |
|---|---|---|
| 000 KB | | |
| | Spare SRAM 216 | 64 KB |
| 064 KB | | |
| | Receive FIFO 212 | 64 KB |
| 128 KB | | |
| | Receive FIFO 211 | 128 KB |
| 256 KB | | |
| | Receive FIFO 213 | 64 KB |
| 320 KB | | |
| | Send FIFO 201 | 64 KB |
| 384 KB | | |
| | Send FIFO 202 | 64 KB |
| 448 KB | | |
| | Send FIFO 203 | 64 KB |
| 512 KB | | |

Run-time Use

The final area of software exploitation of the multi-FIFO adapter is run time considerations that factor in the protocol convention established previously.

Message 320 Sending

Large Multimedia Data Messages 320: A large message 320 to be sent is always targeted to one of buckets 116, 117 (0 through 95) and is always sent via either send FIFO 201 or send FIFO 202. In order to maximize the potential of the multiple send FIFO buffers 104, outbound large messages 320 are distributed to the large FIFO buffers in such a way that messages 320 destined to the same node can never be in both send FIFO buffers 201 and 202. The distribution method implemented in this preferred embodiment is to place messages 320 bound to odd numbered nodes in send FIFO 201 and messages 320 bound to even numbered nodes in send FIFO 202. This ensures that if a particular node (e.g. node 5) temporarily has no receive FIFO 105 space available to receive a message 320, then the sending adapter can work on sending message 320 in send FIFO 202 instead. This helps to maximize the output rate onto network 102 by the sending adapter.

Small Multimedia Command Messages 320: Small multimedia control messages 320 are sent via FIFO 203.

High-Level Protocol Messages 320: Small multimedia control messages 320 are sent via FIFO 203.

Low-Level Driver Control Message 320: Small multimedia control messages 320 are sent via FIFO 203.

Message 320 Receiving

Large Multimedia Data Messages 320: When an application wishes to receive a large video message 320, a CDB program 306 is created and written to adapter 101. When the corresponding message 320 arrives (the bucket 116, 117 numbers match), CDB program 306 is executed and message 320 is transferred to the application program's target bucket 116 in system memory 114. By convention, if a large video data message 320 arrives and there is not a corresponding CDB 306 waiting to be executed for that bucket 116, 117, then message 320 is discarded (i.e. the system is a request-driven one for large data transfers).

Small Multimedia Command Messages 320: In order to maintain smooth flow of the high-priority traffic, and to ensure that no small, control messages 320 are lost, processor software always maintains an active CDB 306 for incoming multimedia control messages 320 on bucket 116 number 97. As each message 320 arrives, it is placed on a queue area of system memory 114 designated as bucket 116, number 97. The small multimedia command messages 320 are not discarded if not previously requested as is the case with the large data messages 320, and after each message 320 arrives to the queue (bucket 116, number 97) a new CDB program 306 is established to handle the next such message 320. When the processor 108 application program does request a small control message 320, it is provided out of the internal queue (bucket 116, number 97—unless the queue is empty, in which case the requesting thread is blocked until the requested message 320 is received.) These control messages 320 are never destroyed by network adapter 101 except under processor 108 application program control.

High-Level Protocol Messages 320: message 320 traffic received on bucket 116 number 127 that is bound for high level protocol processing. Bucket 116, number 127 comprises two queue areas in system memory 114. The first message 320 goes to queue area 1, and the second message goes to queue area 2. This pair of "ping-pong" queues is used to process all high-level protocol messages 320 and ensures that the processing of such messages 320 is as efficient as possible. The double buffering scheme makes the entire process run no slower than the rate at which processor 108 can consume (process) the incoming messages 320.

Low-Level Driver Control Message 320: These messages 320 are also double buffered as with the high-level Protocol messages 320, but they are handled on-demand by network adapter 101, are quite rare during normal system operation, and thus are not a significant factor in run-time processing.
Interrupt Processing The primary factor to consider in interrupt processing in a network adapter 101 is efficiency. Minimum execution time in processor 108 must be spent in interrupt state, and this is controlled primarily through programming.

For this preferred embodiment of adapter 101, a secondary concern is if priorities are assigned to processing performed by adapter 101, then those priorities should be mirrored in any processing performed in processor 108 in response to adapter 101 events.

Apart from hard error conditions, the main events reported by adapter 101 are 1) completion of a requested operation: a send CDB 306 has completed DMA 342 transfer of message 320 to adapter 101, or a receive DMA 342 has completed transfer of a message 320 from adapter 101; and 2) notification that an outbound message 320 from send node 100, for example, is "stuck". This latter condition, usually temporary, indicates possible contention in the network 102 or at target node 119. This condition is usually handled by commanding the hardware to commence another round of hardware message 320 "retries". Until this message 320 is sent or discarded, other message 320 in the same FIFO 201, 202, 203 cannot proceed.

Since conditions of type 1, above, represent completed operations, while conditions of type 2 represent operations not yet complete and that require actions in order to advance, Type 2 conditions are considered first when examining the status of adapter 120 on an interrupt.

Accordingly, Send FIFO 104 interrupts (which include type 2 conditions) are checked first, followed by receive interrupts. As with the priorities assigned to the FIFO buffers 104 in the hardware, FIFO 203 is examined first.

One sample flow for processing in response to an interrupt from the adapter is as follows:

1. If there is an interrupt from send FIFO 203, handle the send FIFO 203 interrupt condition(s).
2. If there is an interrupt from send FIFO 202, handle the send FIFO 202 interrupt condition(s).
3. If there is an interrupt from send FIFO 201, handle the send FIFO 201 interrupt condition(s).
4. If there is an interrupt from receive FIFO 213, handle the receive FIFO 213 interrupt condition(s).
5. If there is an interrupt from receive FIFO 212, handle the receive FIFO 212 interrupt condition(s).
6. If there is an interrupt from receive FIFO 211, handle the receive FIFO 211 interrupt condition(s).
7. If there is a general error interrupt from adapter 120, handle the general error interrupt condition(s).

ADVANTAGES OVER THE PRIOR ART

It is an advantage of the preferred embodiment of this invention that a communications adapter is provided which, under heavy server load conditions, with possible contention in the communications switch fabric as well, prevents large message blocks from impeding small, higher priority control messages that should be sent and received expeditiously.

It is a further advantage that multiple send and receive FIFO buffers are provided in a single adapter for handling multiple, high speed, logical connections through a single adapter to a single network.

It is a further advantage of the communications adapter of the invention that multiple processors are connected through a network which uses DMA, and avoids the use of slower multiplexing, or time-slotting, of data and control.

It is a further advantage that a communications adapter is provided which efficiently handles communications within a multimedia serving application.

It is a further advantage of the invention that a network adapter is provided which allows the selection of receive FIFO buffers on the basis of a command field in the message header.

It is a further advantage that the communications adapter of the invention that up to three concurrent functions share the available bandwidth.

It is a further advantage that the communications adapter of the invention supports the passing of messages between nodes of a parallel system through the Allnode switch, providing write only messages over the switch while supporting read and write operations over a processor bus.

It is a further advantage of the invention that a communication adapter provides a flexible set of FIFO options, under processor software control, including FIFO size, priority, and mode.

It is a further advantage of the communications adapter of the invention that, without requiring processor intervention, alternate paths are cycled through to deliver messages around blockages and failures in the switch network.

It is a further advantage of the invention that buckets are provided for distinguishing and tracking individual or groups of messages.

It is a further advantage of the invention that chaining, linking, and priority executing of multiple CDB programs is provided.

It is a further advantage of the invention that a communications adapter supporting DMA mode only, PIO mode only, or the inter-mixing of both modes is supported.

It is a further advantage of the invention that a communications adapter is provided which optimizes operations for multiple protocol applications, including multimedia serving applications.

It is a further advantage of the invention that a communications adapter is provided which, even if a particular receive node has no receive space available, maximizes the output rate onto a network from the sending node.

It is a further advantage of the communications adapter of the invention that minimum execution time in the processor must be spent in interrupt state.

It is a further advantage of the invention that processing priorities within the adapter are mirrored in any processing performed in the processor in response to adapter events.

It is a further advantage of the invention that in multimedia systems, messages used for different purposes and directed to different media having different speeds and priorities are provided without being combined and sent from the same send FIFO or all combined and received into the same receive FIFO, thus intermixing transfers to and from each media in the adapter FIFOs.

ALTERNATIVE EMBODIMENTS

It will be appreciated that, although specific embodiments of the invention have been described herein for purposes of illustration, various modifications may be made without departing from the spirit and scope of the invention.

Accordingly, the scope of protection of this invention is limited only by the following claims and their equivalents.

We claim:

1. A store-and-forward adapter for interconnecting a nodal processor to a network comprising:

communication means for communicating messages with respect to said network;

a plurality of addressable send FIFO buffers for storing and forwarding messages from said nodal processor to said communication means;

a plurality of addressable receive FIFO buffers for storing and forwarding messages from said communication means to said nodal processor;

priority means for assigning a priority level to each said FIFO buffer;

selection means responsive to said priority means for determining which send FIFO buffer is to forward a first next message to said communication means;

routing means responsive to said priority means for determining which said receive FIFO buffer is to store a second next message received at said communication means;

said send FIFO buffers and said receive FIFO buffers being implemented within an adapter memory separate from a nodal processor memory;

a plurality of sets of control registers programmable and readable by said nodal processor, one said set of control registers for controlling each said send and receive FIFO buffer;

each said send and receive FIFO buffer is programmable by said nodal processor to a unique size and priority, and to a specific location in said adapter memory;

said unique set of control registers including:
- an options register for defining for a given FIFO buffer its size, priority, and location in said adapter memory;
- a FIFO write pointer for defining the address in adapter memory where the next message is to be written;
- a FIFO write counter for defining the address in adapter memory where each subsequent word of said message is to be written;
- a FIFO read pointer for defining the address in adapter memory from where the next message is to be read;
- a FIFO read counter for defining the address in adapter memory from where each subsequent word of said message is to be read; and
- a FIFO status register for defining for said given FIFO buffer its interrupt, error, empty, full, and enabled conditions.

2. A store-and-forward adapter for interconnecting a nodal processor to a network comprising:

communication means for communicating messages with respect to said network;

a plurality of addressable send FIFO buffers for storing and forwarding messages from said nodal processor to said communication means;

a plurality of addressable receive FIFO buffers for storing and forwarding messages from said communication means to said nodal processor;

priority means for assigning a priority level to each said FIFO buffer;

selection means responsive to said priority means for determining which send FIFO buffer is to forward a first next message to said communication means;

routing means responsive to said priority means for determining which said receive FIFO buffer is to store a second next message received at said communication means;

said send FIFO buffers and said receive FIFO buffers being implemented within an adapter memory separate from a nodal processor memory;

a unique send and receive FIFO buffers pair being allocated to each of a plurality of software applications being executed on said nodal processor;

a different priority level being assigned to each of a plurality of said FIFO buffers pairs;

three send FIFO buffers and three receive FIFO buffers forming three FIFO buffers pairs for executing three software applications simultaneously on said nodal processor, said three FIFO buffers pairs including a first FIFO buffers pair assigned the highest priority for processing control messages for co-ordination of activities amongst a plurality of nodal processors connected to said network, a second FIFO buffers pair assigned the middle priority for processing medium-sized messages associated with high-level protocol communication amongst said plurality of nodal processors, and a third FIFO buffers pair assigned the lowest priority for processing multimedia data messages.

3. A store-and-forward adapter for interconnecting a nodal processor, responsive to two software applications executing simultaneously on said nodal processor, to a network, comprising:

communication means for communicating messages with respect to said network;

a plurality of addressable send FIFO buffers for storing and forwarding messages from said nodal processor to said communication means;

a plurality of addressable receive FIFO buffers for storing and forwarding messages from said communication means to said nodal processor;

priority means for assigning a priority level to each said FIFO buffer;

selection means responsive to said priority means for determining which send FIFO buffer is to forward a first next message to said communication means;

routing means responsive to said priority means for determining which said receive FIFO buffer is to store a second next message received at said communication means;

said send FIFO buffers and said receive FIFO buffers being implemented within an adapter memory separate from a nodal processor memory;

a unique send and receive FIFO buffers pair being allocated to each of a plurality of software applications being executed on said nodal processor;

a different priority level being assigned to each of a plurality of said FIFO buffers pairs;

said FIFO buffers pairs include a first FIFO buffers pair assigned the highest priority for processing small control messages associated with a first application and for processing medium-sized messages associated with a second application for high-level protocol communication amongst said plurality of nodal processors, and second and third FIFO buffer pairs assigned the lowest priority for processing multimedia data messages with respect to said first application.

4. A store-and-forward adapter for interconnecting a nodal processor to a network comprising:

communication means for communicating messages with respect to said network;

a plurality of addressable send FIFO buffers for storing and forwarding messages from said nodal processor to said communication means;

a plurality of addressable receive FIFO buffers for storing and forwarding messages from said communication means to said nodal processor;

priority means for assigning a priority level to each said FIFO buffer;

selection means responsive to said priority means for determining which send FIFO buffer is to forward a first next message to said communication means;

routing means responsive to said priority means for determining which said receive FIFO buffer is to store a second next message received at said communication means;

said send FIFO buffers and said receive FIFO buffers being implemented within an adapter memory separate from a nodal processor memory;

a unique send and receive FIFO buffers pair being allocated to each of a plurality of software applications being executed on said nodal processor;

each said receive FIFO buffer including a plurality of direct memory access (DMA) channels, each said DMA channel comprising:

a DMA control program stored to said adapter memory by said nodal processor for defining the address location in said nodal processor to receive said second next message, and further defining transfer control and program validity;

selection means associated with each received message for selecting and activating a DMA control program in one of said DMA channels; and alerting means to notify said nodal processor that said DMA channel has stored said second next message to nodal processor memory.

5. The adapter of claim 4, wherein said selection means for selecting and activating said DMA control program is provided by a control field in said received message.

6. The adapter of claim 5, wherein said control field includes indicia for (1) defining whether said message is to be processed by a DMA control program, (2) defining which one of the plurality of receive FIFO buffers is to store-and forward said message, and (3) selecting the DMA control program.

7. The adapter of claim 5, wherein said selection means comprises;

a plurality of pointers stored in said adapter memory, each said pointer pointing to the first word of a DMA control program;

address formation means for combining said control field with a preset base address to form a pointer address in said adapter memory;

access means responsive to said pointer address for accessing the pointer to the first word of a selected DMA control program; and incrementing means for incrementing said pointer to access successive words of said DMA control program.

8. The adapter of claim 5, said alerting means further comprising:

detection means for detecting the successful completion of a store-and-forward operation controlled by said DMA control program and subsequently posting a completion status;

a status register in said adapter containing a status bit for each said DMA channel, wherein each status bit is uniquely settable upon detection of a successful completion of a store-and-forward operation;

reading means operable under control of said nodal processor for reading a group of status bits from said status register; and resetting means operable under control of said nodal processor for resetting status bits individually in said group of status bits by performing a write operation to said status register.

9. The adapter of claim 8, wherein said detection means is further operable for posting an interrupt to said nodal processor concurrently with posting said completion status.

10. The adapter of claim 9, further comprising interrupt resetting means responsive to said nodal processor for resetting said posted interrupt concurrently with the resetting of said status bits.

11. The adapter of claim 8, wherein said detection means further modifies a first pointer in adapter memory to contain a new value as specified by said selected DMA control program.

12. The adapter of claim 11, wherein said first pointer is modified to a new value as specified by a control field of said DMA control program, and wherein a first new value disables further processing by said DMA channel until said nodal processor writes a second new value to adapter memory to enable said DMA channel.

13. The adapter of claim 11, wherein said first pointer is modified to a new value as specified by a control field of said DMA control program, and said new value enables further processing by said DMA channel by pointing to the same or a different DMA control program.

14. The adapter of claim 8, wherein said DMA control program comprises a plurality of linked DMA programs, each containing a different nodal processor address for defining where an associated received message is to be forwarded, for scattering said received message to a plurality of nodal processor addresses as defined by said plurality of linked DMA programs.

15. The adapter of claim 8, wherein a flag in said control field in said received message selects for processing said received message either (a) a DMA control program, or (b) a processing apparatus comprising posting means for posting an interrupt from said receive FIFO buffer to said nodal processor to alert said nodal processor that said received message is waiting in said adapter memory;

reading means at said nodal processor for reading said received message directly from said adapter memory; and interrupt resetting means at said nodal processor for deleting said received message from said receive FIFO buffer, resetting said interrupt, and enabling the receive FIFO buffer to process subsequent received messages.

16. The adapter of claim 8, including apparatus, responsive to said DMA control program indicating said DMA control program is not valid, for processing said received message, said apparatus comprising:

posting means for posting an interrupt from said receiving FIFO to said nodal processor to alert said processor that said received message is waiting in said adapter memory;

reading means at said processor for reading control fields from said received message directly from said adapter memory;

storing means at nodal processor for storing a valid DMA control program to said adapter memory; and resetting means at said nodal processor for resetting said interrupt, starting said DMA channel, and enabling said receive FIFO buffer to process said received message by DMA.

17. The adapter of claim 7, wherein said plurality of pointers are stored in a pointer area of adapter memory specified as separate from the FIFO buffer areas by a hardware control register.

18. A store-and-forward adapter for interconnecting a nodal processor to a network, comprising:

communication means for communicating messages with respect to said network;

a plurality of addressable send FIFO buffers for storing and forwarding messages from said nodal processor to said communication means;

a plurality of addressable receive FIFO buffers for storing and forwarding messages from said communication means to said nodal processor;

priority means for assigning a priority level to each said FIFO buffer;

selection means responsive to said priority means for determining which send FIFO buffer is to forward a first next message to said communication means;

routing means responsive to said priority means for determining which said receive FIFO buffer is to store a second next message received at said communication means;

said send FIFO buffers and said receive FIFO buffers being implemented within an adapter memory separate from a nodal processor memory;

a unique send and receive FIFO buffers pair being allocated to each of a plurality of software applications being executed on said nodal processor;

a plurality of Direct Memory Access (DMA) sending channels;

each said send FIFO further comprising a sending list of pointers to said DMA sending channels;

each said sending channel including:
  a DMA Control Program stored to said adapter memory by said nodal processor defining the nodal processor or system address from where the associated message is to be forwarded, and further defining transfer control and program validity;
  selection means associated with each said sending list for selecting and activating one of said plurality of DMA Control Programs; and
  alerting means for notifying said nodal processor that said DMA channel has completed forwarding said send message to said network.

19. The adapter of claim 18, wherein said sending list contains a plurality of pointers to DMA Control Programs stored individually to said sending list by said nodal processor writing to a preset listing area of adapter memory, such that the first pointer written becomes the top of said sending list, and the last pointer written becomes the bottom of said sending list.

20. The adapter of claim 19, further comprising a send locator register for specifying a location in adapter memory unique from the FIFO areas containing said preset listing area.

21. The adapter of claim 20, wherein said send locator register is programmable by said nodal processor.

22. The adapter of claim 21, wherein said send locator register is further programmable from an interface to said network.

23. The adapter of claim 22, wherein said sending list contains a stack of pending pointers to sending DMA Channel Programs issued by said nodal processor.

24. The adapter of claim 23, wherein said nodal processor stacks a plurality of pointers to said sending lists, and continues to stack further pointers to said sending lists prior to the completion of the previous stack of pending pointers.

25. The adapter of claim 24, wherein said adapter processes the top pointer of said sending list next, and upon successful completion of the DMA Channel Program pointed to by said top pointer, said adapter removes said top pointer from said sending list and moves the next sequential pointer in said sending list to the top.

26. The adapter of claim 25, wherein said nodal processor reads a hardware control register in said adapter to determine the status of said sending list, status indications including empty, full, or the number of pending pointers comprising said list sending list.

27. The adapter of claim 25, wherein said selection means selects the pointer at the top of said sending list from one of a plurality of sending lists based on the priority assigned to said sending lists.

28. The adapter of claim 25, wherein the priority assigned to each said sending list is different for each sending list, and the highest priority list is executed continually, one DMA Channel Program after another, until said list is empty, then the next highest priority list is executed continually until it is empty or until the higher priority list becomes not empty.

29. The adapter of claim 25, wherein the priority assigned to said sending lists are equal for some or all of said sending lists, and said sending lists having equal priority are executed using a round robin mechanism, where one DMA Channel Program is executed from each of said sending lists having the same priority before a second DMA Channel Program is executed from any of the lists having the same priority.

30. The adapter of claim 27, wherein said selection means comprises:
  means for reading a first pointer from the top of a selected list, said first pointer pointing to the first word of a selected DMA Control Program;
  access means responsive to said first pointer for accessing said first word of said selected DMA Control Program;
  address incrementing means responsive to said first pointer for incrementally addressing successive words of said selected DMA Control Program.

31. The adapter of claim 19, said alerting means further comprising:
  detection means for detecting the successful completion of a store-and-forward operation controlled by said DMA control program and subsequently posting a completion status;
  a status register in said adapter containing a status bit for each said DMA channel, wherein each status bit is uniquely settable upon detection of a successful completion of a store-and-forward operation;
  reading means operable under control of said nodal processor for reading a group of status bits from said status register; and
  resetting means operable under control of said nodal processor for resetting status bits individually in said group of status bits by performing a write operation to said status register.

32. The adapter of claim 31, wherein said detection means is further operable for posting an interrupt to said nodal processor concurrently with posting said completion status.

33. The adapter of claim 32, wherein an interrupt resetting means is provided whereby said nodal processor resets said posted interrupt simultaneously with said resetting means for resetting status bits.

34. The adapter of claim 20, said DMA Control Program comprising:
  a plurality of linked DMA Programs, each said linked DMA Program including address means for addressing a nodal processor or system from where an associated send message is to be read, and means responsive to said linked DMA Programs for gathering said associated send messages from a plurality of nodal processor or system addresses.

35. The adapter of claim 18, further comprising:
posting means responsive to said DMA Control Program indicating said DMA Control Program is not valid for posting an interrupt from said sending FIFO to said nodal processor alerting said processor that said send message is waiting in said adapter memory;
said nodal processor further including
storing means responsive to a posted interrupt for storing a valid DMA Control Program to said adapter memory; and
interrupt resetting means for resetting said posted interrupt, starting said DMA Channel, and enabling said send FIFO to process said send message by DMA.

36. The adapter of claim 31, wherein the status bits in said status register are settable as determined by control bits in said pointers to said DMA Control Program.

37. A store-and-forward adapter for interconnecting a nodal processor to a network, comprising
communication means for communicating messages with respect to said network;
a plurality of addressable send FIFO buffers for storing and forwarding messages from said nodal processor to said communication means;
a plurality of addressable receive FIFO buffers for storing and forwarding messages from said communication means to said nodal processor;
said adapter being operable to control said plurality of send FIFO buffers and said plurality of receive FIFO buffers;
priority means for assigning a priority level to each said FIFO buffer;
selection means responsive to said priority means for determining which send FIFO buffer is to forward a first next message to said communication means;
routing means responsive to said priority means for determining which said receive FIFO buffer is to store a second next message received at said communication means;
said send FIFO buffers and said receive FIFO buffers being implemented within an adapter memory separate from a nodal processor memory;
a plurality of sets of control registers programmable and readable by said nodal processor, one said set of control registers for controlling each said send and receive FIFO buffer;
nodal processor selectively reading and writing said control registers and adapter memory selectively directly or from an addressed FIFO buffer;
a plurality of address bits encoded in the address used by said nodal processor to address said adapter, said address bits being encoded selectively to define:
first, a read or write operation to said adapter hardware control registers, where the specific register is defined by the remainder of the address bits;
second, a read or write operation to a selected send FIFO buffer;
third, a read or write operation to said adapter memory directly, where the specific memory location is defined by the remainder of the address bits; and
fourth, a read or write operation to a selected receive FIFO buffer.

38. A store-and-forward adapter for interconnecting a nodal processor to a network, comprising:
communication means for communicating messages with respect to said network;
a plurality of addressable send FIFO buffers for storing and forwarding messages from said nodal processor to said communication means;
a plurality of addressable receive FIFO buffers for storing and forwarding messages from said communication means to said nodal processor;
selection means for determining which send FIFO buffer is to forward a first next message to said communication means;
routing means for determining which said receive FIFO buffer is to store a second next message received at said communication means;
a unique send and receive FIFO buffers pair being allocated to each of a plurality of software applications being executed on said nodal processor;
a different priority level being assigned to each of a plurality of said FIFO buffers pairs;
three send FIFO buffers and three receive FIFO buffers forming three FIFO buffers pairs for executing three software applications simultaneously on said nodal processor, wherein said three FIFO buffers pairs include a first FIFO buffers pair assigned the highest priority for processing control messages for co-ordination of activities amongst a plurality of nodal processors connected to said network, a second FIFO buffers pair assigned the middle priority for processing medium-sized messages associated with high-level protocol communication amongst said plurality of nodal processors, and a third FIFO buffers pair assigned the lowest priority for processing multimedia data messages.

39. A store-and-forward adapter responsive to two software applications executing simultaneously on a nodal processor for interconnecting said nodal processor to a network, comprising:
communication means for communicating messages with respect to said network;
a plurality of addressable send FIFO buffers for storing and forwarding messages from said nodal processor to said communication means;
a plurality of addressable receive FIFO buffers for storing and forwarding messages from said communication means to said nodal processor;
selection means for determining which send FIFO buffer is to forward a first next message to said communication means; and
routing means for determining which said receive FIFO buffer is to store a second next message received at said communication means;
a unique send and receive FIFO buffers pair being allocated to each of a plurality of software applications being executed on said nodal processor;
said FIFO buffers pairs include a first FIFO buffers pair assigned the highest priority for processing small control messages associated with a first application and for processing medium-sized messages associated with a second application for high-level protocol communication amongst said plurality of nodal processors, and second and third FIFO buffer pairs assigned the lowest priority for processing multimedia data messages with respect to said first application.

40. Method for interconnecting a nodal processor to a network, comprising the steps of:

storing a plurality of DMA control programs in respective DMA channels in a plurality of receive FIFO buffers in adapter memory;

responsive to a received message from said network, selecting one of said receive FIFO buffers and activating a DMA control program in one of said DMA channels;

storing said received message to nodal processor memory;

notifying said nodal processor that said DMA channel has stored said received message to nodal processor memory by posting a completion status to a status register;

reading to said nodal processor a croup of status bits from said status resister; and resetting individual status bits in said status register by writing from said nodal processor, responsive to a flag in a control field in said received message, selecting for processing said received message either (a) a DMA control program, or (b) a process including the steps of:

posting an interrupt from said receive FIFO buffer to said nodal processor to alert said nodal processor that said received message is waiting in said adapter memory;

reading said received message directly from said adapter memory to said nodal processor; and from said nodal processor, deleting said received message from said receive FIFO buffer, resetting said interrupt, and enabling the receive FIFO buffer to process subsequent received messages.

41. Method for interconnecting a nodal processor to a network, comprising the steps of:

storing a plurality of DMA control programs in respective DMA channels in a plurality of receive FIFO buffers in adapter memory;

responsive to a received message from said network, selecting one of said receive FIFO buffers and activating a DMA control program in one of said DMA channels;

storing said received message to nodal processor memory;

notifying said nodal processor that said DMA channel has stored said received message to nodal processor memory by posting a completion status to a status register;

reading to said nodal processor a group of status bits from said status register;

resetting individual status bits in said status register by writing from said nodal processor;

responsive to said DMA control program indicating said DMA control program is not valid, processing said received message according to the steps of:

posting an interrupt from said receiving FIFO to said nodal processor to alert said processor that said received message is waiting in said adapter memory;

reading control fields from said received message directly from said adapter memory;

for storing a valid DMA control program to said adapter memory; and resetting said interrupt, starting said DMA channel, and enabling said receive FIFO buffer to process said received message by DMA.

42. Method for interconnecting a nodal processor to a network comprising:

operating a plurality of addressable send FIFO buffers for storing and forwarding messages from said nodal processor to said communication means;

operating a plurality of addressable receive FIFO buffers for storing and forwarding messages from said network to said nodal processor;

assigning a priority level to each said FIFO buffer;

responsive to said priority level, determining which send FIFO buffer is to forward a first next message to network;

responsive to said priority level, determining which said receive FIFO buffer is to store a second next message received from said network;

allocating a unique send and receive FIFO buffers pair to each of a plurality of software applications being executed on said nodal processor;

operating three FIFO buffer pairs simultaneously, including:

coordinating activities amongst a plurality of nodal processors connected to said network by processing control messages in a first FIFO buffers pair assigned the highest priority;

processing medium-sized messages associated with high-level protocol communication amongst said plurality of nodal processors in a second FIFO buffers pair assigned the middle priority; and processing multimedia data messages in a third FIFO buffers pair assigned the lowest priority.

43. Method for interconnecting a nodal processor as a node via an adapter to a network wherein a sending node transmits a message from a first adapter across the network to a second adapter of a receiving node, comprising the steps of:

storing a plurality of DMA control programs in respective DMA channels in a plurality of receive FIFO buffers in memory in said second adapter at the receiving node;

commanding priority logic at said second at the receiving node adapter by the nodal processor to prioritize the sending of received messages from said plurality of receive buffers to the nodal processor;

receiving a receive message at said second adapter from the network and routing said message to one of the plurality of receive FIFO buffers at the receiving node, wherein the selection of which receive FIFO buffer is made at said second adapter is based on the header of the received message;

responsive to priority logic and a received message from said network, selecting one of said receive FIFO buffers at the receiving node and activating a DMA control program in one of said DMA channels based on snooping the message header of the receive message;

storing said received message to nodal processor memory at the receiving node;

notifying said nodal processor that said DMA channel has stored said received message to nodal processor memory by posting a completion status to a status register;

reading to said nodal processor a group of status bits from said status register; and resetting individual status bits in said status register by writing from said nodal processor.

\* \* \* \* \*